United States Patent
Ikeda

(10) Patent No.: US 8,032,007 B2
(45) Date of Patent: Oct. 4, 2011

(54) READING DEVICE, PROGRAM, AND READING METHOD

(75) Inventor: Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 1286 days.

(21) Appl. No.: 11/631,204

(22) PCT Filed: Feb. 2, 2006

(86) PCT No.: PCT/JP2006/301766
§ 371 (c)(1),
(2), (4) Date: Dec. 29, 2006

(87) PCT Pub. No.: WO2006/082892
PCT Pub. Date: Aug. 10, 2006

(65) Prior Publication Data
US 2008/0292270 A1    Nov. 27, 2008

(30) Foreign Application Priority Data
Feb. 4, 2005    (JP) ................. 2005-028748

(51) Int. Cl.
*H04N 9/80* (2006.01)
*H04N 5/84* (2006.01)
*G06F 3/06* (2006.01)
*G06F 13/00* (2006.01)
*G06Q 30/00* (2006.01)
*G11B 5/596* (2006.01)
*G11B 21/02* (2006.01)

(52) U.S. Cl. .......... 386/248; 386/241; 386/334; 360/75; 360/77.03; 705/26.8; 711/4; 711/100; 711/115; 711/154

(58) Field of Classification Search .................. 386/248, 386/241, 334, 336, E5.003, E5.064, E5.068, 386/E9.036; 360/75, 77.03; 711/4, 100, 711/115, 154; G9B/20.009, 20.015, 21.014, G9B/27.001, 27.019, 27.05; 707/999.009; 705/26.8
See application file for complete search history.

(56) References Cited

U.S. PATENT DOCUMENTS
5,907,658 A    5/1999    Murase et al.
(Continued)

FOREIGN PATENT DOCUMENTS
EP    1 672 637    6/2006
(Continued)

OTHER PUBLICATIONS
The extended European search report of EP application No. 06712909.8, dated Oct. 12, 2009.

*Primary Examiner* — Thai Tran
*Assistant Examiner* — Syed Hasan
(74) *Attorney, Agent, or Firm* — Panasonic Patent Center; Dhiren Odedra; Kerry Culpepper

(57) ABSTRACT

The application manager 37 conducts "application signaling" when a first disc is replaced with a second disc. At this point, an application is continued if it is written in an application management table assigned to a Title played last on a first disc and also written in an application management table assigned to a Title to be played first on a second disc. On the other hand, an application is ended is it is written in the application management table assigned to the Title played last on the first disc but not written in the application management table assigned to the Title to be played first on the second disc.

10 Claims, 36 Drawing Sheets

U.S. PATENT DOCUMENTS

| | | |
|---|---|---|
| 6,185,365 B1 | 2/2001 | Murase et al. |
| 6,226,446 B1 | 5/2001 | Murase et al. |
| 6,356,707 B1 | 3/2002 | Murase et al. |
| 6,453,379 B2 * | 9/2002 | Nishiumi et al. .................. 711/4 |
| 6,466,393 B1 * | 10/2002 | Mitani ............................ 360/75 |
| 2002/0116277 A1 * | 8/2002 | Kraft ............................... 705/26 |
| 2002/0194618 A1 | 12/2002 | Okada et al. |
| 2003/0161615 A1 | 8/2003 | Tsumagari et al. |
| 2005/0259968 A1 | 11/2005 | Tsumagari et al. |
| 2005/0262084 A1 * | 11/2005 | Tomita .............................. 707/9 |
| 2006/0143666 A1 | 6/2006 | Okada et al. |

FOREIGN PATENT DOCUMENTS

| | | |
|---|---|---|
| EP | 1 796 090 | 6/2007 |
| EP | 1 944 771 | 7/2008 |
| JP | 2813245 | 8/1998 |
| JP | 2002-369154 | 12/2002 |
| JP | 2003-249057 | 9/2003 |
| JP | 2005-332521 | 12/2005 |
| WO | 2004/025651 | 3/2004 |
| WO | 2005/036554 | 4/2005 |
| WO | 2006009305 | 1/2006 |
| WO | 2006075874 | 7/2006 |

* cited by examiner

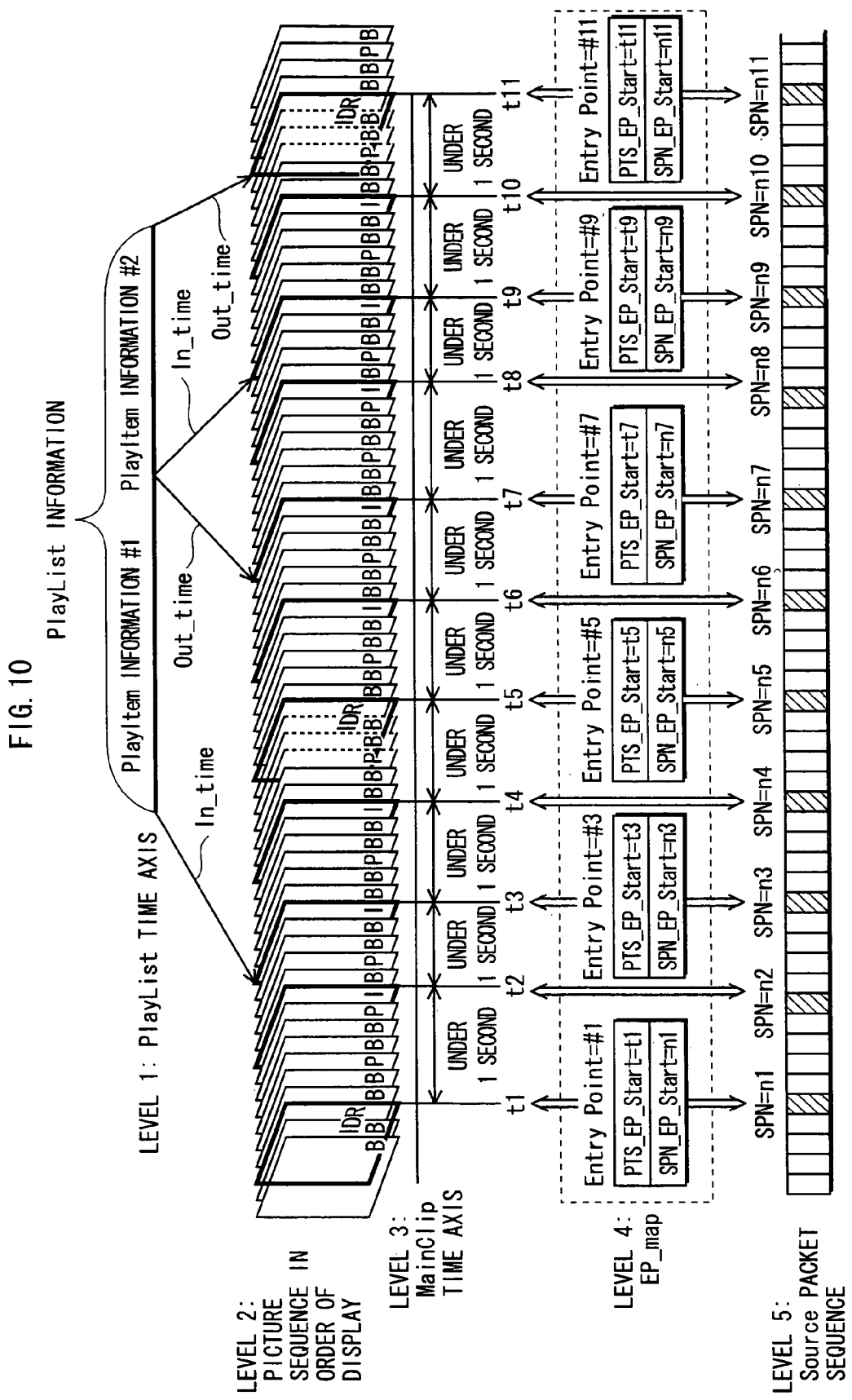

FIG. 11

INFORMATION FOR ASSOCIATING Java APPLICATION AND STREAM
···BD-JObject XXXXX.BOBJ

| | |
|---|---|
| Application Management Table (AMT) | ··· TO SPECIFY Java APPLICATION TO BE ACTIVATED DURING Title CORRESPONDING TO BD-JObject |
| PlayList Management Table (PLMT) | ··· TO INDICATE PlayList TO BE PLAYED SIMULTANEOUSLY WITH IMPLEMENTATION OF Java APPLICATION DURING Title CORRESPONDING TO.BD-JObject |

FIG. 13A  Application Management Table (AMT)

| life_cycle |
| apli_id_ref |
| run_attribute |
| run_priority |

FIG. 13B  Application Management Table (AMT)

| life_cycle | apli_id_ref | run_attribute | run_priority |
|---|---|---|---|
| "ACTIVATION PERIOD" OF APPLICATION WRITTEN USING title, PL, and Chapter | REFERENCE VALUE OF "APPLICATION ID", WHICH IS 5-DIGIT FIGURE ATTACHED TO FILE NAME OF JAR | "STARTUP ATTRIBUTE", ANY ONE OF:<br>• Auto Run<br>• Present (DEFAULT)<br>• Suspend | "STARTUP PRIORITY" REPRESENTED BY NUMBER BETWEEN 0 AND 255 |

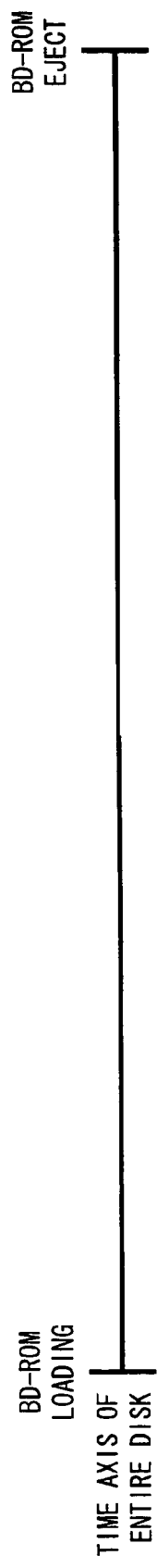
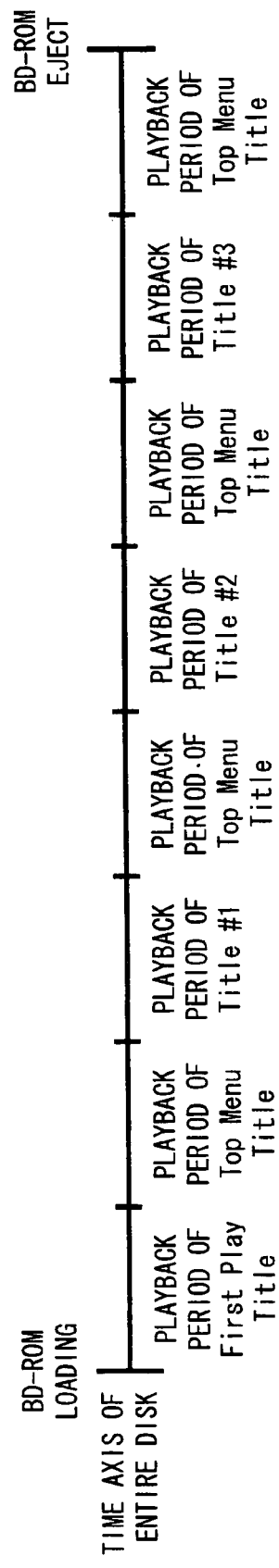
FIG. 15A
FIG. 15B

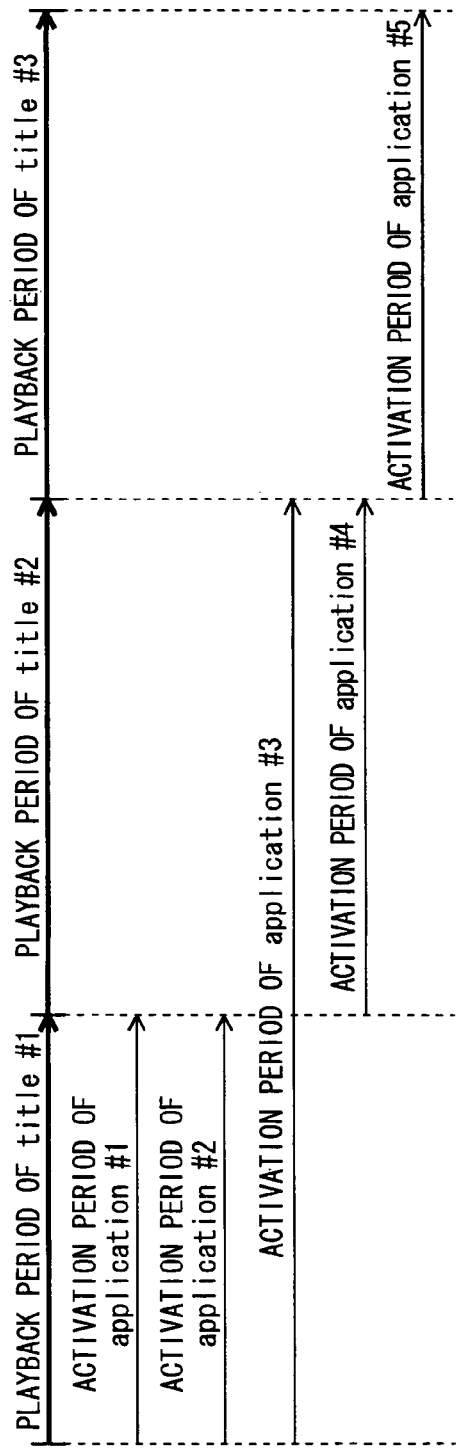

FIG. 20

MODE CHANGE OF APPLICATION BASED ON STARTUP ATTRIBUTE

| | | STARTUP ATTRIBUTE | | |
|---|---|---|---|---|
| | | Present | AutoRun | Suspend |
| MODE OF APPLICATION IN IMMEDIATELY PREVIOUS TITLE | NON-STARTUP | PERFORM NO OPERATION AND MAINTAIN THE MODE | START UP APPLICATION | PERFORM NO OPERATION AND MAINTAIN THE MODE |
| | STARTUP | PERFORM NO OPERATION AND MAINTAIN THE MODE | PERFORM NO OPERATION AND MAINTAIN THE MODE | SUSPEND |
| | Suspend | RESUME | RESUME | PERFORM NO OPERATION AND MAINTAIN THE MODE |

FIG. 21A Play List Management Table (PLMT)

| PL_id_ref |
|---|
| Playback_Attribute |

FIG. 21B Play List Management Table (PLMT)

| PL_id_ref | Playback_Attribute |
|---|---|
| "PlayList ID" WHICH IS 5-DIGIT FIGURE IN FILE NAME OF MPLS FILE | "PLAYBACK ATTRIBUTE" ANY ONE OF: · Auto Play · Present (DEFAULT) |

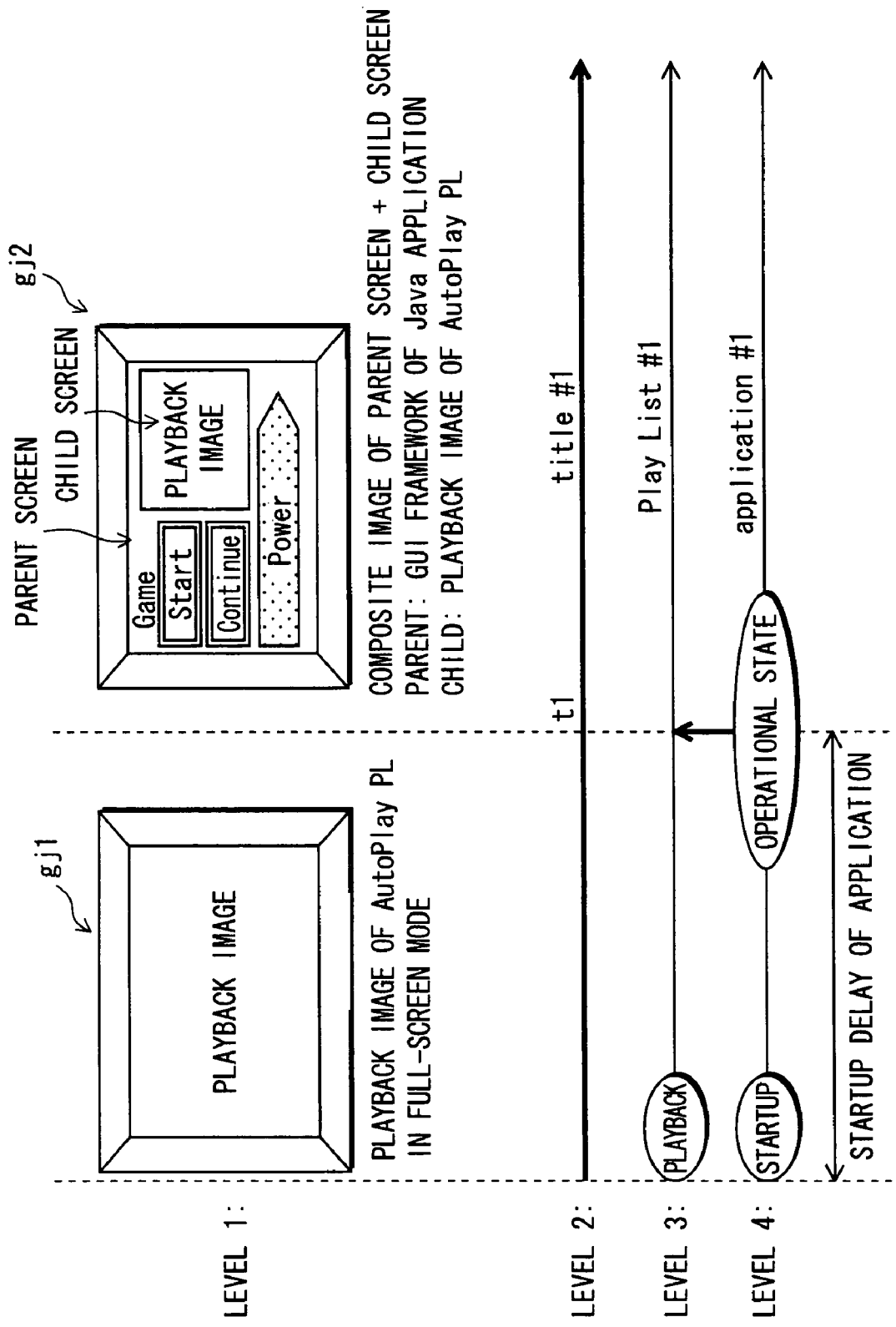

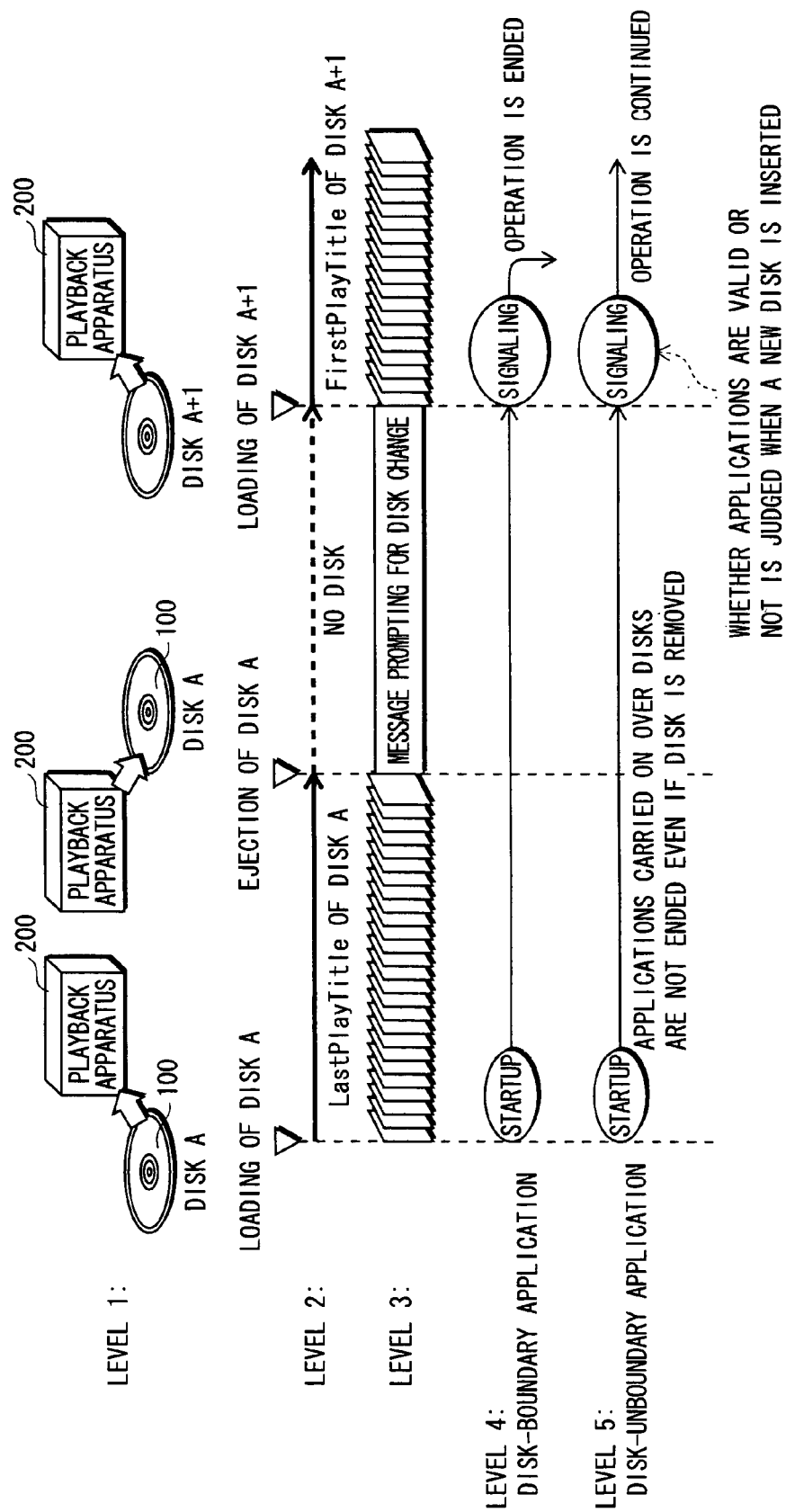

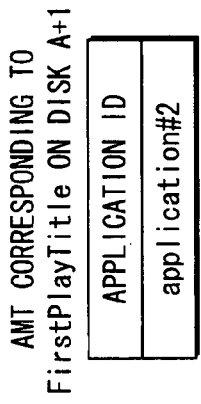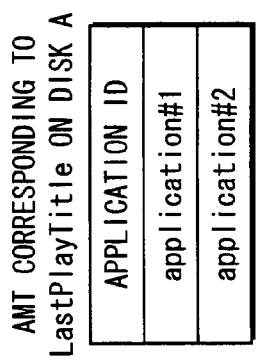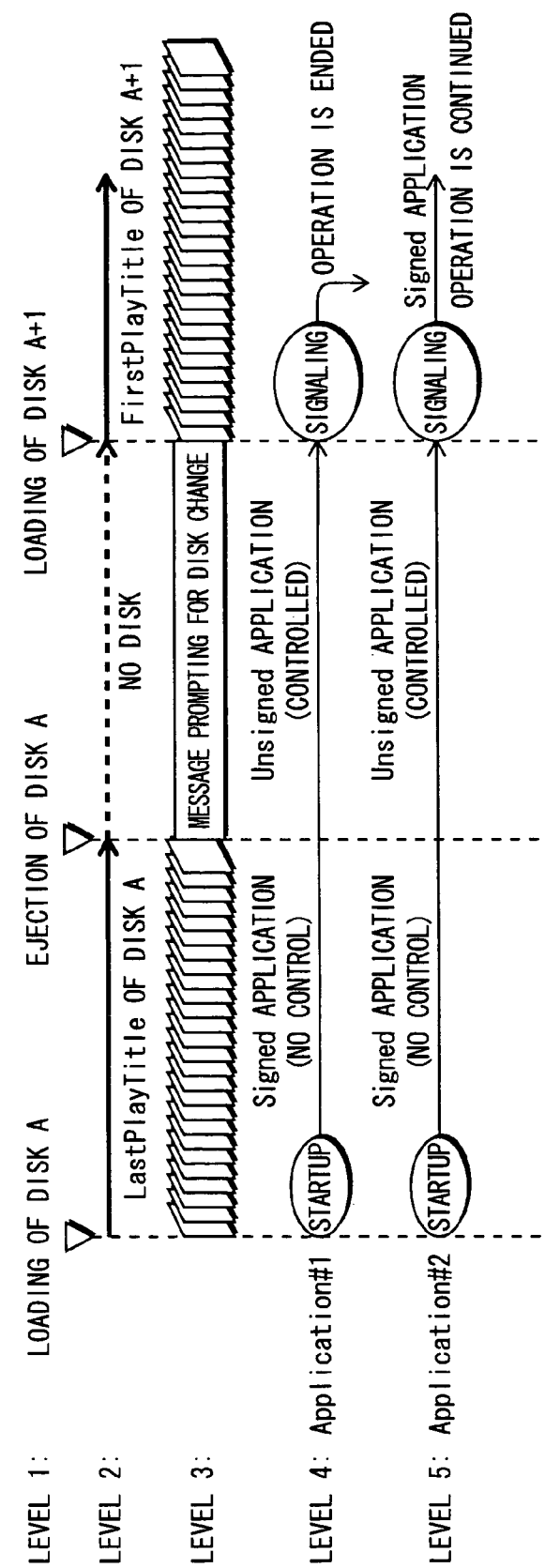
FIG. 30A
FIG. 30B

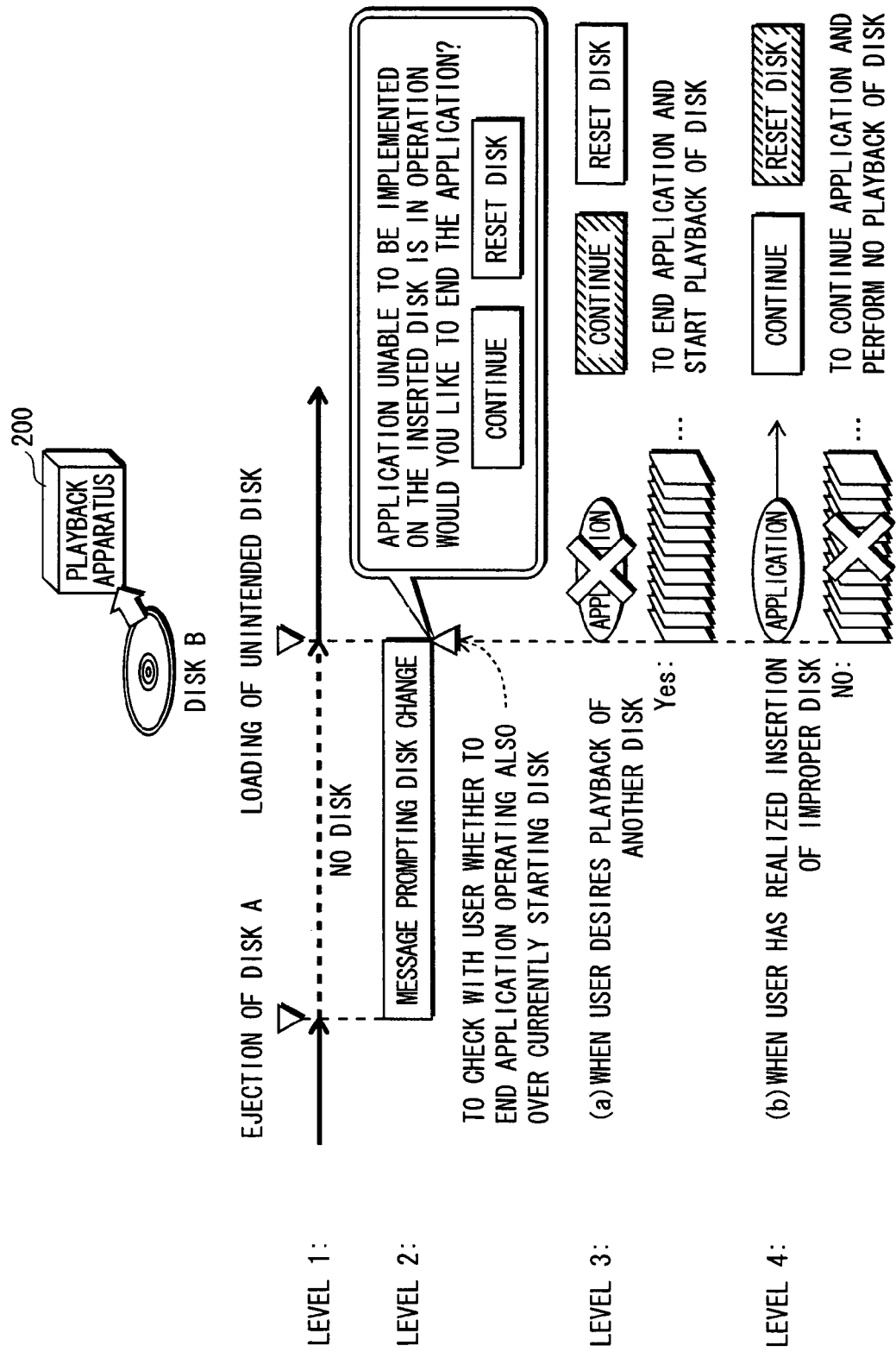

READING DEVICE, PROGRAM, AND READING METHOD

TECHNICAL FIELD

The present invention belongs to a technical field of playback control technology for simultaneously performing playback of a digitized movie and execution of an application.

BACKGROUND ART

The playback control technology above plays a very important role in realizing a media mix for sales—i.e. a single package where a digitized movie and a variety of applications are stored. Consider the case where one of the applications is, for example, a game-like program that uses characters appearing in the movie, and this application is executed simultaneously with a part of the digitized movie. This generates synergy effects between the video playback and the application execution, which will lead to the greater popularity of the movie.

The following patent reference 1 describes prior art of such playback control technology.

<Patent Reference 1> Japanese Patent Publication No. 2813245

DISCLOSURE OF THE INVENTION

Problem that the Invention is to Solve

It is often the case with movies of late years that, if they become hits, sequels of the movies are created. A series of the movies are then recorded over different optical discs, and they are marketed as "DVD-BOX" which is expensive merchandise. This is one of the established methods in the movie business. In such a case where interrelated movies are recorded over different optical discs, how to control the applications is an issue.

For example, if the execution of applications is limited to the time during which one optical disc is loaded, the ends and startup of applications are repeated each time when an optical disc is exchanged for another one. Accordingly, the startup delay of applications increases, resulting in a poor response to a user's operation.

Contrarily, if the execution of applications is not limited to the time during which an optical disc is loaded, the applications may be operating when no optical disc is loaded. Here, if a malicious program (virus, spyware or the like) has invaded a readout apparatus and this program is operating when no optical disc is loaded, it cannot be determined whether such a program is a malicious program or an application structuring the movie. Accordingly, the operation of the malicious program cannot be ended, which involuntarily creates an opportunity for such a malicious program to cause damage.

The present invention aims at offering a readout apparatus capable of appropriately ending applications unrelated to a movie at the time when an optical disc is exchanged for another one while eliminating a startup delay of applications.

Means to Solve the Problem

In order to achieve the above object, the readout apparatus of the present invention comprises: a playback unit operable to read and play contents recorded on a 1st disc; and an application management unit operable to execute one or more applications based on a management table corresponding to each of the contents. Here, when the 1st disc is exchanged for a 2nd disc, the application management unit (i) maintains execution of an application shown both in a management table corresponding to a content played last on the 1st disc and in a management table corresponding to a content to be played first on the 2nd disc, and (ii) terminates execution of an application shown in the management table corresponding to the content played last on the 1st disc but not shown in the management table corresponding to the content to be played first on the 2nd disc.

Advantageous Effects of the Invention

According to the above structure, the execution of an application shown both in the management table corresponding to the content played last on the 1st disc and in the management table corresponding to the content to be played first on the 2nd disc is maintained when the 1st disc is exchanged for the 2nd disc, which thereby eliminates the need to end the application once after the 1st disc is ejected and to start it up again when the 2nd disc is loaded. As a result, the present invention is capable of substantially eliminating a startup delay for starting the application.

Since the execution of an application shown in the management table corresponding to the content played last on the 1st disc but not shown in the management table corresponding to the content to be played first on the 2nd disc is terminated, the operation of applications not shown in the management table of the 2nd disc is finished when the 2nd disc is loaded. Even if a malicious program has invaded, the program can be terminated when the 2nd disc is loaded, and thus the present invention provides a countermeasure for malicious programs.

BRIEF DESCRIPTION OF THE DRAWINGS

FIG. 10 shows relationships between the AVClip and the PlayList information;

FIG. 11 shows an internal structure of a BD-J Object;

FIG. 13A shows an internal structure of an application management table;

FIG. 13B explains meanings of information elements constituting the application management table;

FIG. 15A shows a time axis of an entire BD-ROM;

FIG. 15B shows a structure of the time axis of the entire BD-ROM;

FIGS. 19A and 19B show examples of application management tables and activation periods;

FIG. 20 shows possible combinations of three modes for startup attributes (Present, AutoRun and Suspend) and three modes for an application in an immediately previous title (Non-startup, Startup and Suspend);

FIG. 21A shows the internal structure of a PlayList management table;

FIG. 21B explains meanings of information elements constituting the PlayList management table;

FIG. 22 shows a specific example of a Title specified by a PlayList management table and an application management table;

FIG. 29 shows operations of a disc-boundary application and a disc-unboundary application;

FIG. 30A shows AMTs corresponding to LastPlay Title on Disc A and to FirstPlay Title on Disc A+1;

FIG. 30B shows signaling when two AMTs are defined as shown in FIG. 30A;

FIG. 33 is a timing chart schematically showing a process performed by the application manager 37 when an unintended disc is loaded;

EXPLANATION OF REFERENCES

Figure 1:
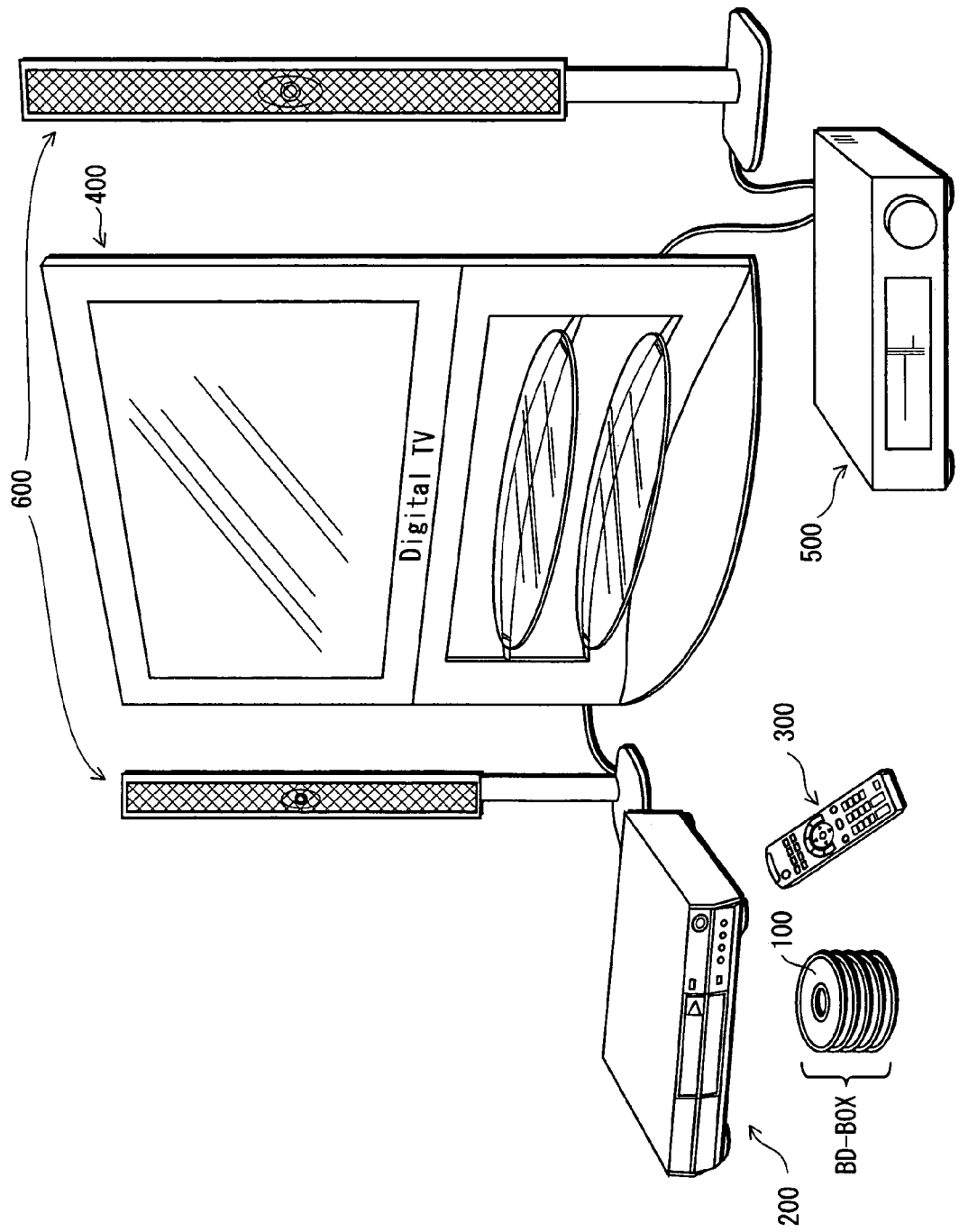
FIG. 1 shows a usage application of a readout apparatus of the present invention.

1 BD-ROM drive
2 read buffer
3 demultiplexer
4 video decoder
5 video plane
7 audio decoder
11 Interactive Graphics decoder
12 Interactive Graphics plane
13 Presentation Graphics decoder
14 Presentation Graphics plane
15 JPEG decoder
16 still plane
17 composing unit
18 STC generating unit
19 ATC generating unit
21 instruction ROM
22 scenario memory
23 PSR set
24 CPU
25 communication unit
26 operation receiving unit
30 Virtual File System
31 presentation engine
32 playback control engine
33 module manager
34 HDMV module
35 BD-J platform
36 Java™ virtual machine
37 application manager
38 function control unit

BEST MODE FOR CARRYING OUT THE INVENTION

Embodiment 1

The following describes an embodiment of a readout apparatus of the present invention. First, a usage application is described in relation to the implementation of the readout apparatus of the present invention. FIG. 1 shows a usage application of the readout apparatus of the present invention. A readout apparatus 200 in FIG. 1 is the readout apparatus of the present invention. The readout apparatus 200 is used in a home theater system composed of a BD-BOX made up of multiple BD-ROMs 100, a remote controller 300, a television 400, an AV amplifier, and speakers 600.

The readout apparatus 200 is a digital home electrical appliance supported for networks, and has a function to play the BD-ROM 100.

Thus concludes the description of the usage application of the recording medium of the present invention.

Figure 2:
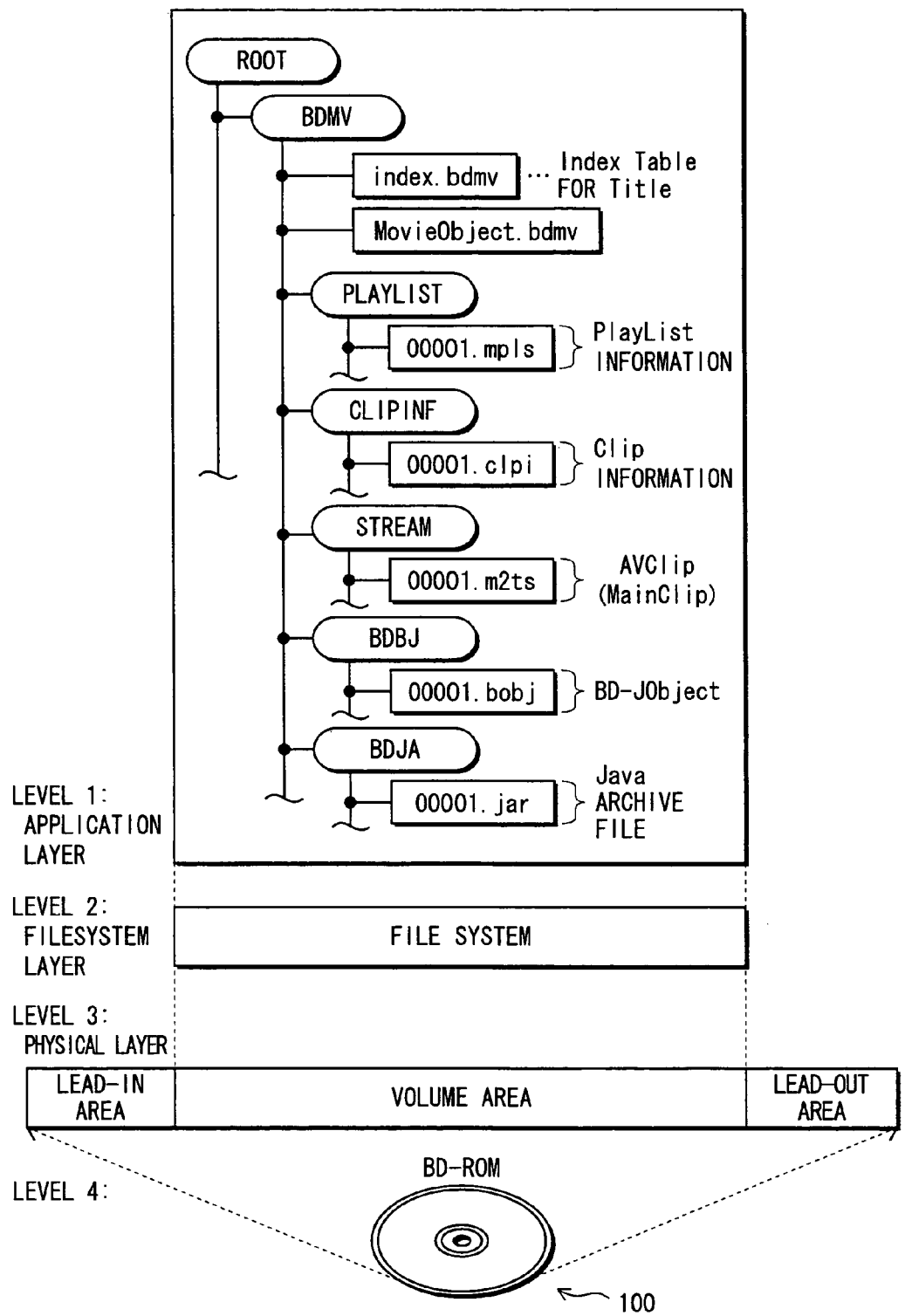
FIG. 2 shows an internal structure of a BD-ROM.

Next is described an internal structure of the BD-ROM 100. FIG. 2 shows a file directory structure of the BD-ROM. In the figure, the BD-ROM has a BDMV directory under a Root directory.

<General Description of BD-ROM>

FIG. 2 shows the internal structure of a BD-ROM. Level 4 in the figure shows the BD-ROM, and Level 3 shows a track on the BD-ROM. The figure depicts the track in a laterally drawn-out form, although the track is in fact formed in a spiral, winding from the inside toward the outside of the BD-ROM. The track is composed of a lead-in area, a volume area, and a lead-out area. The volume area in the figure has a layer model made up of a physical layer, a filesystem layer, and an application layer. Level 1 in the figure shows a format of the application layer of the BD-ROM by using a directory structure. In Level 1, BD-ROM has the BDMV directory under the Root directory.

The BDMV directory includes files to each of which an extension of bdmv is attached (index.bdmv and MovieObject.bdmv). Furthermore, six subdirectories are located under the BDMV directory: a PLAYLIST directory; a CLIPINF directory; a STREAM directory; a BDBJ directory; a BDJA directory; and an AUXDATA directory.

The PLAYLIST directory includes a file to which an extension of mpls is attached (00001.mpls).

The CLIPINF directory includes a file to which an extension of clpi is attached (00001.clip).

The STREAM directory includes a file to which an extension of m2ts is attached (00001.m2ts).

The BDBJ directory includes a file to which an extension of bobj is attached (00001.bobj).

The BDJA directory includes a file to which an extension of jar is attached (00001.jar).

Thus, it can be seen that multiple files of different types are arranged in the BD-ROM according to the directory structure above.

<BD-ROM Structure 1: AVClip>

Figure 3:
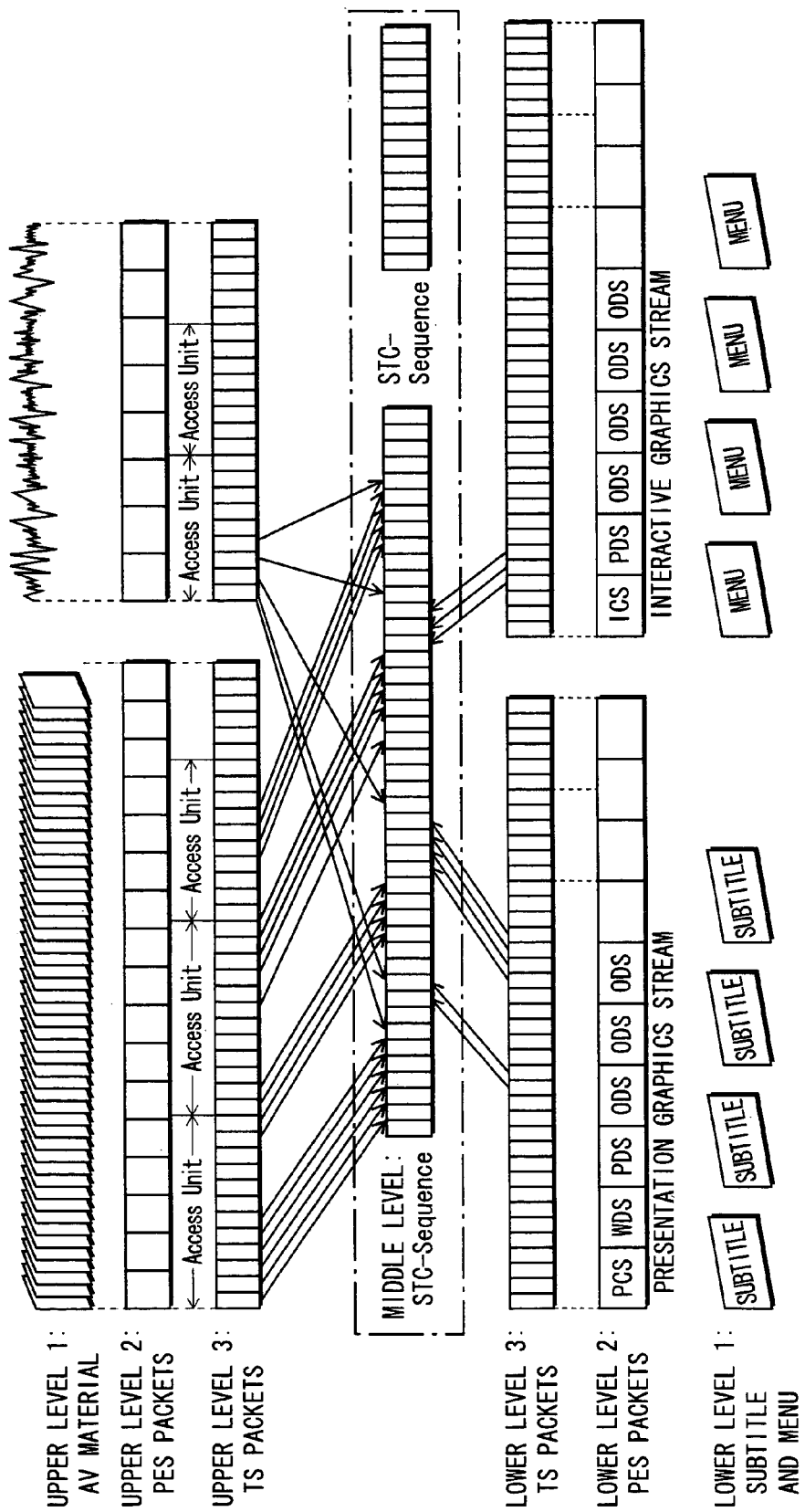
FIG. 3 schematically shows a structure of a file to which an extension of m2ts is attached.

First, a file to which the extension "m2ts" is attached is explained. FIG. 3 schematically shows a structure of a file to which the extension "m2ts" is attached. The file to which the extension "m2ts" is attached (00001.m2ts) stores an AVClip therein. The AVClip is a digital stream in the MPEG2-Transport Stream format. The digital stream is generated by converting digitized video and audio (upper Level 1), which are obtained by digitizing film video, NTSC video and PAL video, into an elementary stream composed of PES packets (upper Level 2), and converting the elementary stream into TS packets (upper Level 3), and similarly, converting the Presentation Graphics (PG) stream for the subtitles or the like and the Interactive Graphics (IG) stream for the interactive purposes (lower Level 1 and lower Level 2) into the TS packets (lower Level 3), and then finally multiplexing these TS packets.

A PG stream is an elementary stream that realizes display of subtitle in accordance with the progression of video playback. An IG stream is an elementary stream that realizes GUI in accordance with the progression of video playback.

Among video streams, a playback unit that is played with one PTS (a picture or the like) is called "Video Presentation Unit". Among audio streams, a playback unit that is played with one PTS is called "Audio Presentation Unit".

PES packets constituting an AVClip make up at least one "STC_Sequence". "STC_Sequence" is a sequence of PES packets, where System Time Clock (STC) referred to by the PTS and DTS contained in the STC_Sequence does not include a "system time-base discontinuity". Since not having a system time-base discontinuity is a requirement to be a STC_Sequence, one STC_Sequence is composed of a group of PES packets starting with one located immediately after a system time-base discontinuity, including a PCR (Program Clock Reference) and ending with one immediately before the next system time-base discontinuity.

Figure 4:
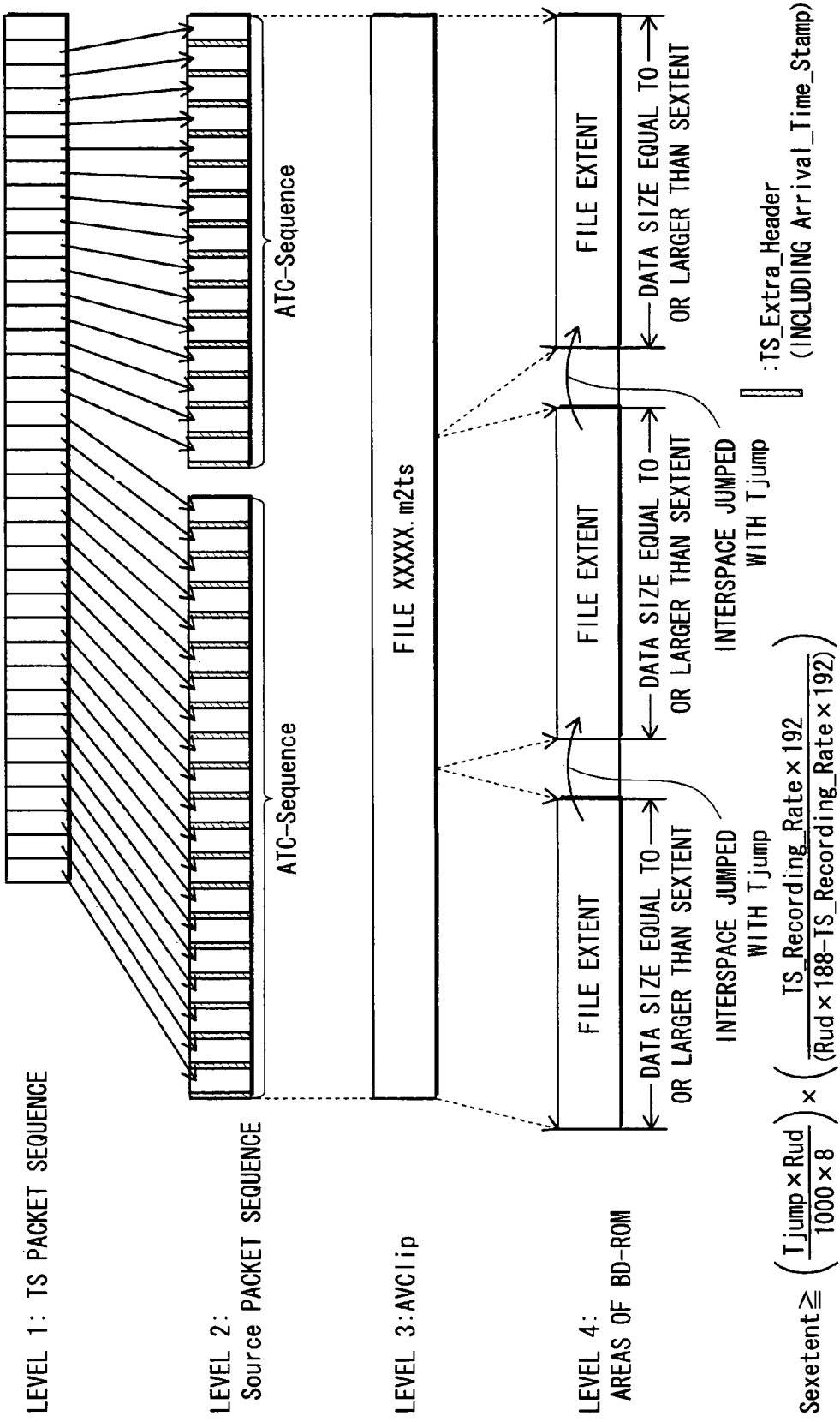
FIG. 4 shows processes that TS packets constituting an AVClip are subjected to before they are written to the BD-ROM.

Next, how an AVClip having the above-described structure is written to the BD-ROM is explained. FIG. 4 shows what processes TS packets constituting an AVClip are subjected to before they are written to the BD-ROM. Level 1 of the figure shows the TS packets constituting the AVClip.

As shown in Level 2 of FIG. 4, a 4-byte TS_extra_header (shaded portions in the figure) is attached to each 188-byte TS packet constituting the AVClip to generate each 192-byte Source packet. The TS_extra_header includes an Arrival_Time_Stamp.

The AVClip shown in Level 3 includes one or more "ATC_Sequences". An "ATC_Sequence" is a sequence of Source packets, where Arrival_Time_Clocks referred to by the Arrival_Time_Stamps included in the ATC_Sequence include no "arrival time-base discontinuity". In other words, the "ATC_Sequence" is a sequence of Source packets, where Arrival_Time_Clocks referred to by the Arrival_Time_Stamps in the ATC_Sequence are continuous.

Such ATC_Sequences constitute the AVClip, and are recorded on the BD-ROM with a file name "xxxxx.m2ts".

The AVClip is, as is the case with a normal computer file, divided into one or more file extents, which are then recorded in areas on the BD-ROM. Level 4 shows how the AVClip is recorded on a BD-ROM. In Level 4, each file extent constituting the file has a data length that is equal to or larger than a predetermined length called Sexetent.

Sexetent is a minimum data length of each file extent, where an AVClip is divided into a plurality of file extents to be recorded. Sexetent is examined here.

The time required for the optical pickup to jump to a location on the BD-ROM is obtained by the following equation:

$$T\text{jump}=T\text{access}+T\text{overhead}.$$

The "Taccess" is a time (msec) required that corresponds to a jump distance:

179 msec when the jump distance (the number of logical blocks) is 0 to 5000;

210 msec when the jump distance (the number of logical blocks) is 5001 to 10,000;

270 msec when the jump distance (the number of logical blocks) is 10,001 to 20,000;

990 msec when the jump distance is a half stroke; and 1220 msec when the jump distance is a full stroke.

The TS packets read out from the BD-ROM are stored in a buffer called read buffer, and then output to the decoder. The "Toverhead" is obtained by the following equation when the input to the read buffer is performed with a bit rate called "Rud" and the number of sectors in the ECC block is represented by Secc:

$$T\text{overhead} \leq (2 \times Secc \times 8)/Rud = 20 \text{ msec}.$$

TS packets read out from the BD-ROM are stored in the read buffer in the state of Source packets, and then supplied to the decoder at a transfer rate called "TS_Recording_rate".

To keep the transfer rate of the TS_Recording_rate while the TS packets are supplied to the decoder, it is necessary that, during Tjump, the TS packets are continuously output from the read buffer to the decoder. Here, Source packets, not TS packets, are output from the read buffer. As a result, when the ratio of the TS packet to the Source packet in size is 192/188, it is necessary that during Tjump, the Source packets are continuously output from the read buffer at a transfer rate of "192/188×TS_Recording_rate".

Accordingly, the amount of occupied buffer capacity of the read buffer that does not cause an underflow is represented by the following equation:

$$B\text{occupied} \geq (T\text{jump}/1000 \times 8) \times ((192/188) \times TS\_\text{Recording\_rate}).$$

The input rate to the read buffer is represented by Rud, and the output rate from the read buffer is represented by TS_Recording_rate×(192/188). Therefore, the occupation rate of the read buffer is obtained by performing "(input rate)−(output rate)", and thus obtained by "(Rud−TS_Recording_rate)×(192/188)".

The time "Tx" required to occupy the read buffer by "Boccupied" is obtained by the following equation:

$$Tx = B\text{occupied}/(Rud - TS\_\text{Recording\_rate} \times (192/188)).$$

When reading from the BD-ROM, it is necessary to continue to input TS packets with the bit rate Rud for the time period "Tx". As a result, the minimum data length Sextent per extent when the AVClip is divided into a plurality of file extents to be recorded is obtained by the following equations:

$$Sextent =$$
$$Rud \times Tx = Rud \times Boccupied / (Rud - TS\_Recording\_rate \times (192/188)) \geq$$
$$Rud \times (Tjump/1000 \times 8) \times ((192/188) \times TS\_Recording\_rate)/$$
$$(Rud - TS\_Recording\_rate \times (192/188)) \geq$$
$$(Rud \times Tjump/1000 \times 8) \times TS\_Recording\_rate \times$$
$$192/(Rud \times 188 - TS\_Recording\_rate \times 192).$$

Hence,
$$Sextent \geq (Tjump \times Rud/1000 \times 8) \times (TS\_Recording\_rate \times 192/(Rud \times 188 - TS\_Recording\_rate \times 192)).$$

When each file extent constituting the AVClip has the data length equal to or larger than Sextent calculated in this way, TS packets are continuously supplied to the decoder so that the data is read out continuously during the playback even if these file extents are located discretely on the BD-ROM.

Figure 5:
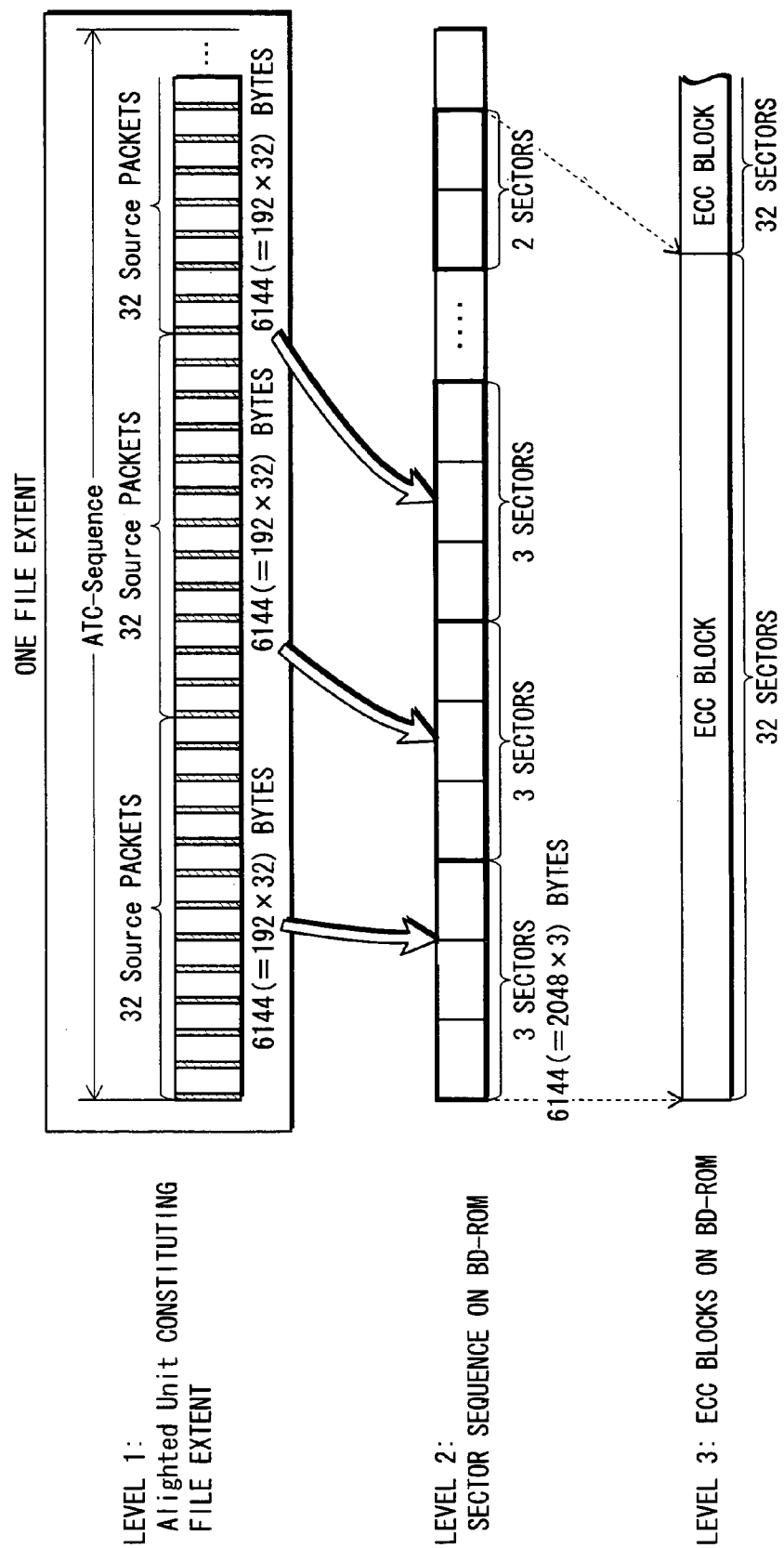
FIG. 5 shows relationships between a physical unit of the BD-ROM and Source packets constituting one file extent.

FIG. 5 shows relationships between the physical unit of the BD-ROM and the Source packets constituting one file extent. As shown in Level 2, a plurality of sectors are formed on the BD-ROM. The Source packets constituting the file extent are, as shown in Level 1, divided into groups, each of which is composed of 32 Source packets. Each group of Source packets is then written into a set of three consecutive sectors. The group of 32 Source packets is 6144 bytes (=32×192), which is equivalent to the size of three sectors (=2048×3). The group of 32 Source packets stored in the three sectors is called an "Aligned Unit". Writing to the BD-ROM is performed in units of Aligned Units.

In Level 3, an error correction code is attached to each block of 32 sectors. The block with the error correction code is referred to as an ECC block. As long as accessing the BD-ROM in units of Aligned Units, the readout apparatus can obtain 32 complete Source packets. Thus concludes the description of the writing process of the AVClip to the BD-ROM.

<Types of Elementary Streams>

Figure 6:
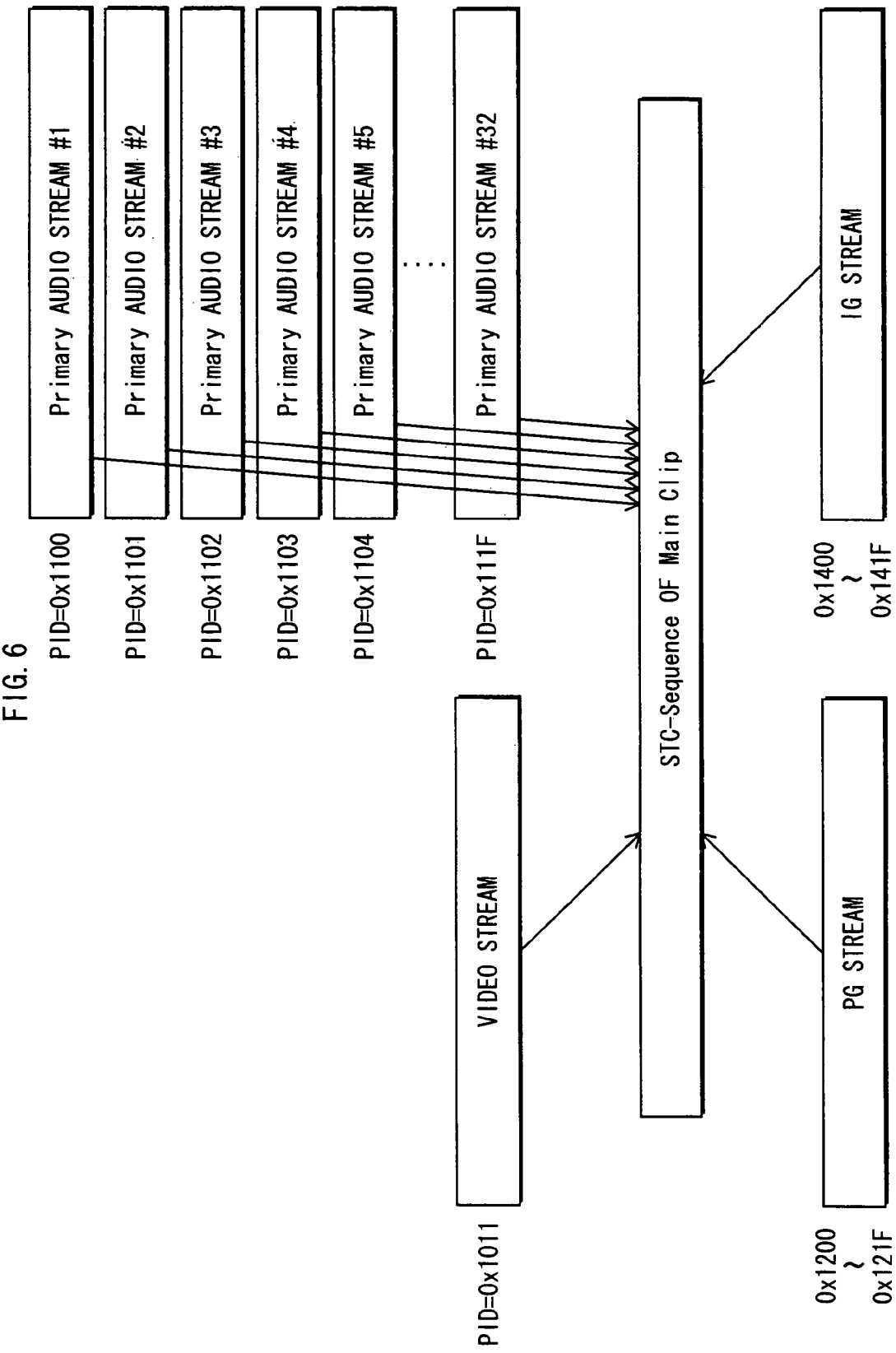
FIG. 6 shows what types of elementary streams are multiplexed into an AVClip.

FIG. 6 shows what types of elementary streams are multiplexed into an AVClip.

The AVClip is created, as shown in the figure, by multiplexing: a high-definition video stream having a PID of 0x1011; primary audio streams having PIDs of 0x1100 to 0x111F; a PG stream having PIDs of 0x1200 to 0x121F; and an IG stream having PIDs 0x1400 to 0x141F. Each packet constituting these elementary streams has a PID corresponding thereto, and demultiplexing is performed using the PIDs as aids.

<BD-ROM Structure 2: Clip Information>

Figure 7:
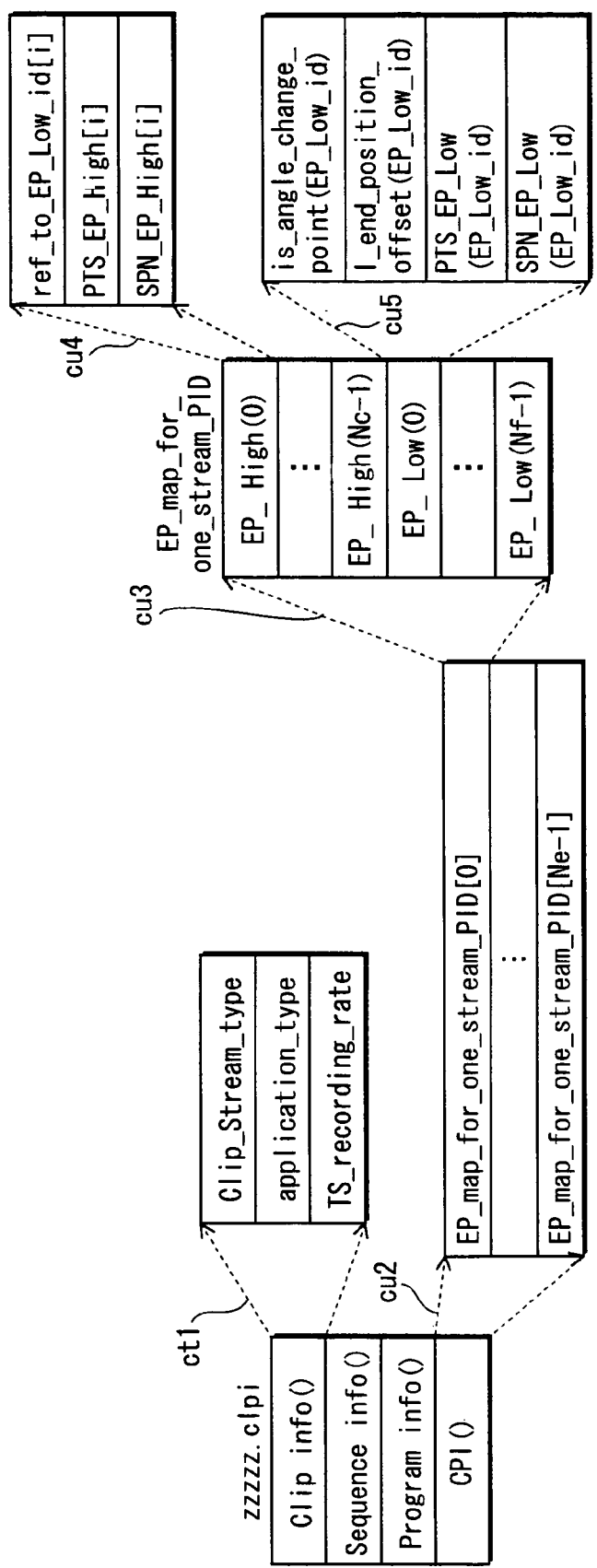
FIG. 7 shows an internal structure of Clip information.

Next are described files to which an extension "clpi" is attached. A file (00001.clpi) to which an extension "clpi" is attached stores Clip information therein. The Clip information is management information of each AVClip. FIG. 7 shows the internal structure of Clip information. As shown on the left-hand side of the figure, the Clip information includes:

i) "ClipInfo( )" storing therein information regarding the AVClip;

ii) "Sequence Info( )" storing therein information regarding the ATC Sequence and the STC Sequence;

iii) "Program Info( )" storing therein information regarding the Program Sequence; and iv) "Characteristic Point Info (CPI( ))".

The Sequence Info is information regarding one or more STC-Sequences and ATC-Sequences contained in the AVClip. The reason that these information are provided is to preliminarily notify the readout apparatus of the system time-base discontinuity and the arrival time-base discontinuity. That is to say, if such a discontinuity is present, there is a possibility that a PTS and an ATS that have the same value appear in the AVClip. This will cause defective playback. The Sequence Info is provided to indicate from where to where in the transport stream each STC or ATC is continuous.

The Program Info is information that indicates a section (called "Program Sequence") of the program where the contents are constant. Here, "Program" is a group of elementary streams that have in common a time axis for synchronous playback. The reason that the Program Info is provided is to preliminarily notify the readout apparatus of a point at which the Program contents change. It should be noted here that the point at which the Program contents change is, for example, a point at which the PID of the video stream changes, or a point at which the type of the video stream changes from SDTV to HDTV.

Next is described the Characteristic Point Info. The lead line cu2 in FIG. 7 indicates a close-up of the structure of the CPI. As indicated by the lead line cu2, the CPI is composed of Ne pieces of EP_map_for_one_stream_PIDs (EP_map_for_one_stream_PID(0) to EP_map_for_one_stream_PID(Ne-1)). These EP_map_for_one_stream_PIDs are EP_maps of the elementary streams that belong to the AVClip. EP_maps are information that indicates packet numbers (SPN_EP_start) at entry positions where Access Unit Delimiters are present on one elementary stream. Here, the packet numbers (SPN_EP_start) are associated with entry times (PTS_EP_start). The lead line cu3 in the figure indicates a close-up of the internal structure of EP_map_for_one_stream_PID.

According to the close-up, it can be seen that the EP_map_for_one_stream_PID is composed of Nc pieces of EP_Highs (EP_High(0) to EP_High(Nc−1)) and Nf pieces of EP_Lows (EP_Low(0) to EP_Low(Nf−1)). Here, the EP_High plays a role of indicating upper bits of the SPN_EP_start and the PTS_EP_start of the Access Unit (Non-IDR I-Picture, IDR-Picture), and the EP_Low plays a role of indicating lower bits of the SPN_EP_start and the PTS_EP_start of the Access Unit (Non-IDR I-Picture, IDR-Picture).

The lead line cu4 in the figure indicates a close-up of the internal structure of EP_High. As indicated by the lead line cu4, the EP_High(i) is composed of: "ref_to_EP_Low_id[i]" that is a reference value to EP_Low; "PTS_EP_High[i]" that indicates upper bits of the PTS of the Access Unit (Non-IDR I-Picture, IDR-Picture); and "SPN_EP_High[i]" that indicates upper bits of the SPN of the Access Unit (Non-IDR I-Picture, IDR-Picture). Here, "i" is an identifier of a given EP_High.

The lead line cu5 in the figure indicates a close-up of the structure of EP_Low. As indicated by the lead line cu5, the EP_Low(i) is composed of: "is_angle_change_point(EP_Low_id)" that indicates whether the corresponding Access Unit is an IDR picture; "I_end_position_offset(EP_Low_id)" that indicates the size of the corresponding Access Unit; "PTS_EP_Low(EP_Low_id)" that indicates lower bits of the PTS of the Access Unit (Non-IDR I-Picture, IDR-Picture); and "SPN_EP_Low(EP_Low_id)" that indicates lower bits of the SPN of the Access Unit (Non-IDR I-Picture, IDR-Picture). Here, "EP_Low_id" is an identifier for identifying a given EP_Low.

<Clip Information Explanation 2: EP_Map>

Figure 8:
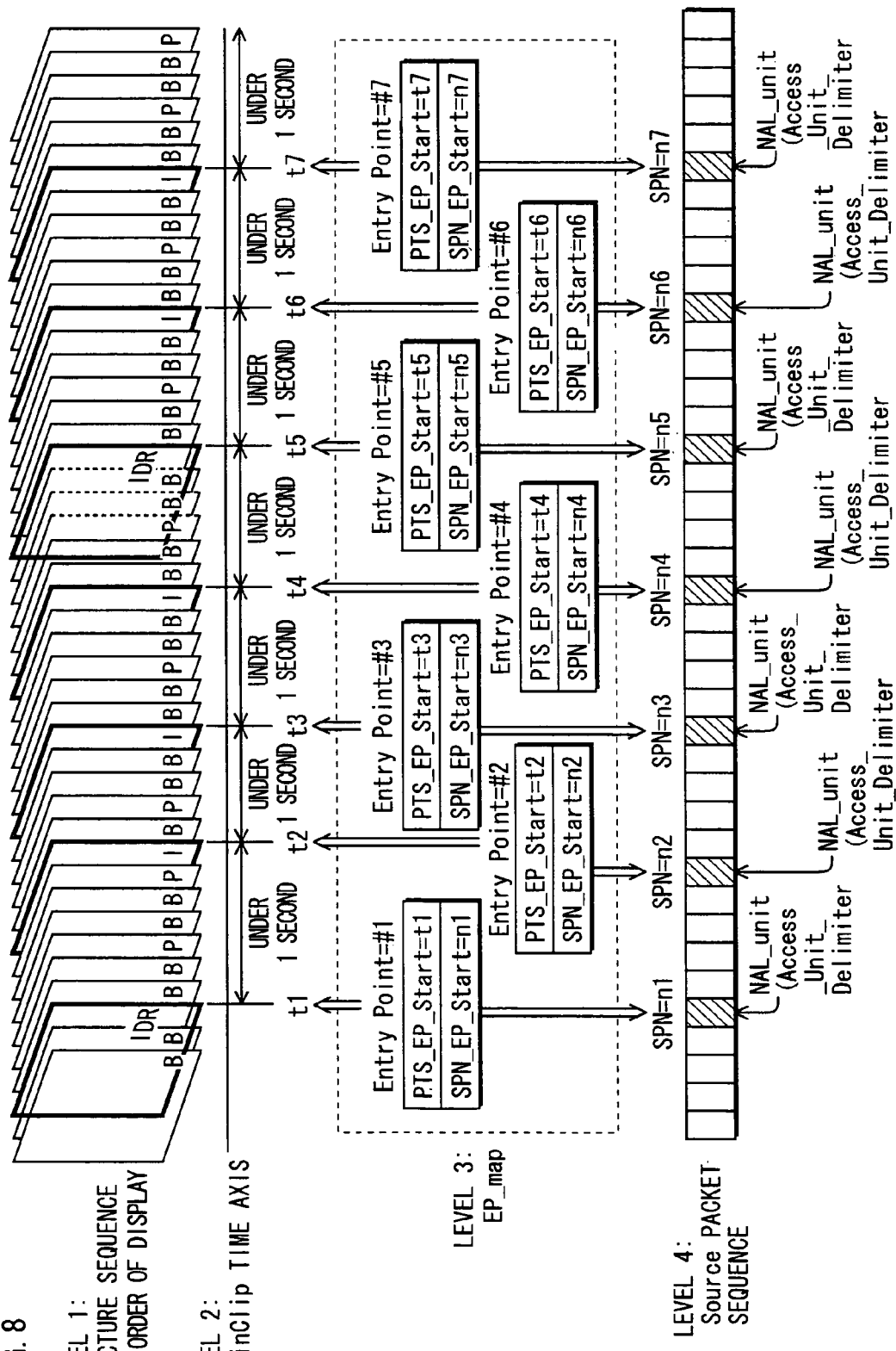
FIG. 8 shows EP_map settings for a video stream of a movie.

Here, the EP_map is explained using a specific example. FIG. 8 shows EP_map settings for a video stream of a movie. Level 1 shows a plurality of pictures (IDR pictures, I-Pictures, B-Pictures, and P-Pictures defined in MPEG4-AVC) arranged in the order of display. Level 2 shows the time axis for the pictures. Level 4 indicates a TS packet sequence on the BD-ROM, and Level 3 indicates settings of the EP_map.

Assume here that, in the time axis of Level 2, IDR pictures and I pictures to be Access Units are present at time points t1 to t7. The interval between adjacent ones of the time points t1 to t7 is approximately one second. The EP_maps used for a movie are set to indicate t1 to t7 as the entry times (PTS_EP_start), and to indicate entry positions (SPN_EP_start) in association with these entry times.

<PlayList Information>

Next is described the PlayList information. A file (00001.mpls) to which extension "mpls" is attached is a file storing therein PlayList (PL) information.

Figure 9:
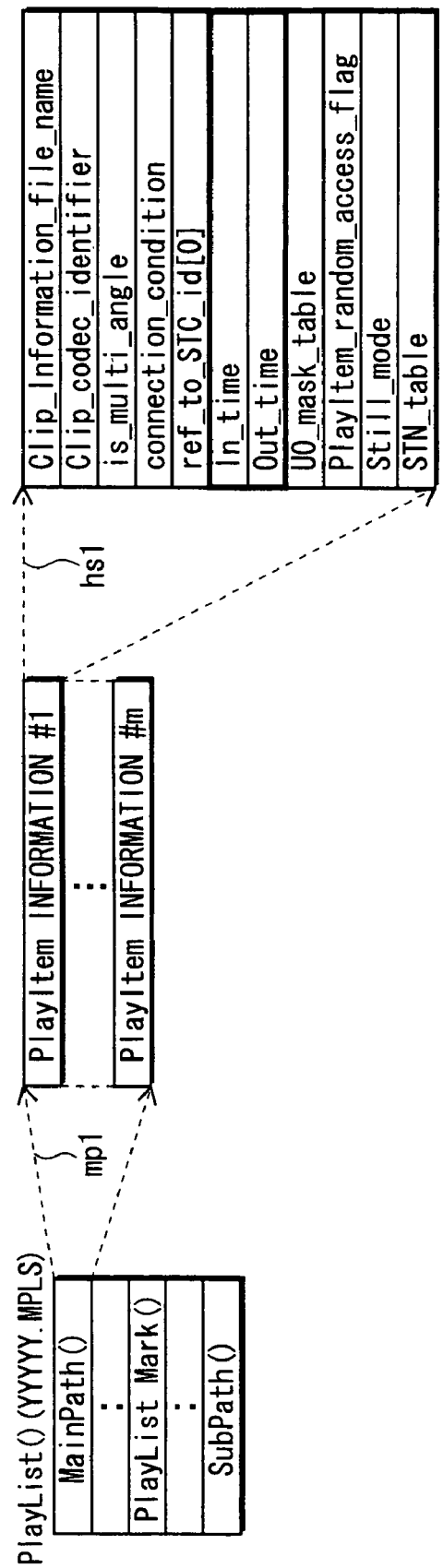
FIG. 9 shows a data structure of PlayList information.

FIG. 9 shows the data structure of the PlayList information. As indicated by the lead line mp1 in the figure, the PlayList information includes: MainPath information (MainPath( )) that defines MainPath; and PlayListMark information (PlayListMark( )) that defines chapter.

<PlayList Information Explanation 1: MainPath Information>

First, the MainPath is described. The MainPath is a playback path that is defined with respect to a video stream and an audio stream of the main movie.

As indicated by the arrow mp1, the MainPath is defined by a plurality of pieces of PlayItem information, i.e. PlayItem information #1 to PlayItem information #m. The PlayItem information defines one or more logical playback periods that constitute the MainPath. The lead line hs1 in the figure indicates a close-up of the structure of the PlayItem information. As indicated by the lead line hs1, the PlayItem information is composed of: "Clip_Information_file_name" that indicates a file name of playback period information of an AVClip to which an IN point and an Out point of the playback period belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id[0]" that indicates uniquely a STC_Sequence targeted by the PlayItem; "In_time" that is time information indicating a start point of the playback period; "Out_time" that is time information indicating an end point of the playback period; "U0_mask_table" that indicates which user operation should be masked by the PlayItem; "PlayItem_random_access_flag" that indicates whether to permit a random access to a midpoint in the PlayItem; "Still_mode" that indicates whether to continue a still display of the last picture after the playback of the PlayItem ends; and "STN_table".

FIG. 10 shows the relationships between the AVClip and the PlayList information. Level 1 shows the time axis of the PlayList information. Levels 2 to 5 show the video stream that is referenced by the EP_map (the same shown in FIG. 8).

The PlayList information includes two pieces of PlayItem information, PlayItem information #1 and PlayItem information #2. Two playback periods are defined by "In_time" and "Out_time" included in the PlayItem information #1 and PlayItem information #2, respectively. When these playback periods are arranged, a time axis that is different from the AVClip time axis is defined. This is the PlayList time axis shown in Level 1. Thus, it is possible to define a playback path that is different from the AVClip by defining the PlayItem information.

The above-mentioned Clip information and PlayList information are classified as "static scenarios". This is because Clip information and PlayList information define a PlayList which is a static playback unit. Thus concludes the description of the static scenarios.

"Dynamic scenarios" are explained next. A dynamic scenario is scenario data that dynamically defines playback control of an AVClip. Here, "dynamically" means that contents of the playback control change in response to a state change in the readout apparatus or a key event generated by the user. In a BD-ROM, two modes are assumed as the operating environments of the playback control. One is an operating environment fairly similar to that of a DVD readout apparatus, and is a command-based execution environment. The other mode is an operating environment for Java™ Virtual Machines. The former of the two operating environments is called HDMV mode, and the latter is called BD-J mode. Since these two operating environments exist, a dynamic scenario is described for either one of the operating environments. A dynamic scenario for HDMV mode is called a Movie Object. On the other hand, a dynamic scenario for BD-J mode is called a BD-J Object.

First, a Movie Object is Explained.

<Movie Object>

A Movie Object is stored in a file called MovieObject.bdmv. shown in FIG. 2, and includes a navigation command string.

A navigation command string is composed of command strings achieving conditional branching, status register settings in the readout apparatus, acquisition of a setting value for the status register and the like. The following shows commands that can be described in Movie Objects.

PlayPL Command

Format: PlayPL (First Argument, Second Argument)

The first argument can specify a PlayList to be played using the number of the playlist. The second argument can specify a playback start position using a PlayItem included in the PL, and a given time, a Chapter, or a Mark in the PL.

A PlayPL function specifying a playback start position on the PL time axis using a PlayItem is "PlayPLatItem( )";

a PlayPL function specifying a playback start position on the PL time axis using a Chapter is "PlayPLatChapter( )"; and a PlayPL function specifying a playback start position using time information is "PlayPLatSpecified Time( )".

JMP Command

Format: JMP Argument

The JMP command realizes branching in which the current dynamic scenario is discarded during the operation and a dynamic scenario of a branch destination specified by the argument is executed. JMP commands include direct reference commands that specify branch-destination dynamic scenarios directly and indirect reference commands that specify branch-destination dynamic scenarios indirectly.

Since the description format of navigation commands in a Movie Object is closely similar to that of navigation commands used in a DVD, disc contents on a DVD can be effectively transported to a BD-ROM. As to a Movie Object, there is prior art disclosed in a WO (World Intellectual Property Organization) publication. For more detail, refer to the WO publication.

WO publication: WO 2004/074976

Thus concludes the description of a Movie Object. Next is described a BD-J Object.

<BD-J Object>

BD-J Objects are BD-J mode dynamic scenarios described in a Java™ programming environment, and are stored in files called 00001.bobj to 00003.bobj.

FIG. 11 shows the internal structure of a BD-J Object, which is composed of an application management table (AMT) and a PlayList management table (PLMT). The difference of a BD-J Object from a Movie Object is that commands are not directly described. That is, in a Movie Object, the control procedure is directly written with navigation commands. On the other hand; in a BD-J Object, the control procedure is indirectly defined by writing a specification for a Java™ application in the application management table. According to such indirect specification, it is possible to provide efficient standardization of the control procedures over multiple dynamic scenarios.

Although PlayList playback of a MovieObject is achieved by description of a navigation command instructing PlayList playback (PlayPl command), PlayList playback of a BD-J Object can be described by incorporating a PlayList management table indicating a PlayList playback procedure into a BD-J Object.

Here, a Java™ application in BD-J mode is explained. An Java™ platform assumed for BD-J mode is one structured by fully mounting the Java™ 2 Micro_Edition(J2ME) Personal Basis Profile (PBP 1.0) and the Globally Executable MHP specification (GEM1.0.2) for package media targets.

A Java™ application in BD-J mode is controlled by an Application Manager via an xlet interface. The xlet interface has four statuses of "loaded", "paused", "active" and "destroyed".

The above-mentioned Java™ platform includes a standard Java™ library for displaying JFIF (JPEG), PNG and other image data. Herewith, a Java™ application can realize a different GUI framework from one realized by an IG stream in HDMV mode. The GUI framework in a Java™ application includes HAVi framework specified in the GEM 1.0.2 and a remote control navigation mechanism of the GEM 1.0.2.

Herewith, a Java™ application is able to realize screen display in which display based on the HAVi framework—such as button display, text display and online display (contents of BBS)—is incorporated with video display, and allows the user to operate on the screen display using a remote controller.

The entities of a Java™ application is a Java™ archive file (00001.jar) stored in the BDJA directory under the BDMV directory in FIG. 2. The following explains a Java™ archive file.

<Java™ Archive File>

A Java™ archive file (00001.jar in FIG. 2) is a file obtained by combining at least one class file, at least one data file and the like, and is composed of a Java™ application to operate in BD-J mode.

Figure 12:
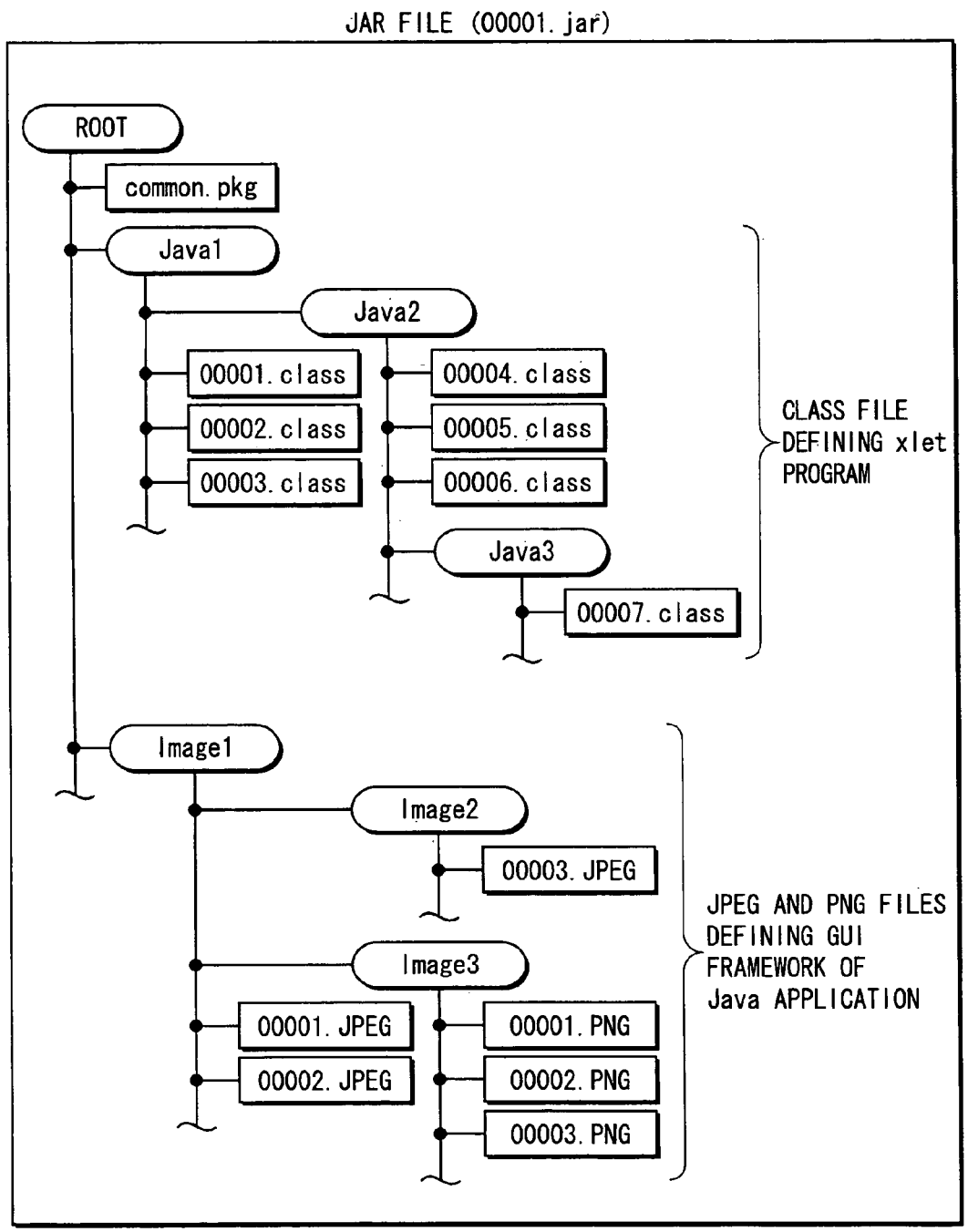
FIG. 12 shows programs and data stored in an archive file.

FIG. 12 shows programs and data stored in the archive file. The programs and data in the figure are such that multiple files arranged in the directory structure shown in the box are combined by the Java™ archiver. The directory structure shown in the box includes a Root directory, Java™ 1, 2 and 3 directories, and Image 1, 2 and 3 directories. common.pkg is placed in the Root directory, class files (00001.class to 00007.class) are in the Java™ 1, 2 and 3 directories, and 00001.JPEG to 00003.JPEG and 00001.PNG to 00003.PGN are in the Image 1, 2 and 3 directories. The Java™ archive file is obtained by combining these files by the Java™ archiver. These class files and data are expanded when read from a BD-ROM to cache, and are handled as multiple files placed in the directories in cache. A five-digit numeric figure in the file name of a Java™ archive file, "zzzzz", indicates an application ID. When a Java™ archive file is read to cache, programs and data of a given Java™ application can be taken out by referring to the numeric figure of the file name.

Note here that, although programs and data constituting an application in the present embodiment are combined as a Java™ archive file, they may be combined as an LZH file or a zip file.

Thus concludes the description of dynamic scenarios in BD-J mode.

<Index.bdmv>

Index.bdmv is a table showing Movie Objects/BD-J Objects that structure Titles. A Title is a playback unit including a Movie Objects/BD-J Object and a PlayList which is played according to the Movie Object/BD-J Object, and is handled as a single content in a BD-ROM. Index.bdmv defines which Movie Objects/BD-J Objects constitute given Titles.

As to Index.bdmv, the following WO publication describes the detail. For more detail, refer to the WO publication.

WO publication: WO 2004/025651

The following gives detailed descriptions of the application management table and PlayList management table of FIG. 11.

<Application Management Table>

The application management table (AMT) is described here. The application management table (AMT) is a table for executing "application signaling" described in the above-mentioned GEM 1.0.2 for package media targets. "Application signaling" is control over startup and execution of an application on the MHP (Multimedia Home Platform) specified in the GEM 1.0.2, using a "service" as an activation period. The application management table in the present embodiment realizes the control over startup and execution of an application, using not "service" but "Title" in the BD-ROM as an activation period.

FIG. 13A shows the internal structure of the application management table. As shown in the figure, the application management table is composed of "life_cycle", "apli_id_ref", "run_attribute" and "run_priority".

FIG. 13B explains meanings of information elements constituting the application management table.

"life_cycle" shows an "activation period" of an application.

"apli_id_ref" includes therein a reference value corresponding to an "application identifier", showing which application has the activation period written on its left side in the figure. The application identifier is represented by the 5-digit numeric figure, "zzzzz", attached as the file name to a Java™ archive file. This 5-digit numeric figure is written in "apli_id_ref".

Written in "run_attribute" is a "startup attribute" of the application for the activation period. There are different types of startup attributes: AutoRun, Present and Suspend.

Written in "run_priority" is a "startup priority" of the application for the activation period. A BD-J Object controls operations of an application using these information.

<Activation Period>

Among from information specified in the application management table, the "activation period" is described next.

The activation period is a period, on the time axis of the entire BD-ROM, during which an application can be active in the work memory of the virtual machine. Being "active" in the work memory refers to the state in which an xlet program making up the application has been read out to the work memory in the Java™ Virtual Machine and is ready for execution by the Java™Virtual Machine.

When an application is operated in the Java™ Virtual Machine, it is important to specify the "start and end points of a service" of the application—i.e. at which points on the time axis the service starts and ends. It is the activation period in the application management table that specifies the start and end points of a service.

Figure 14:
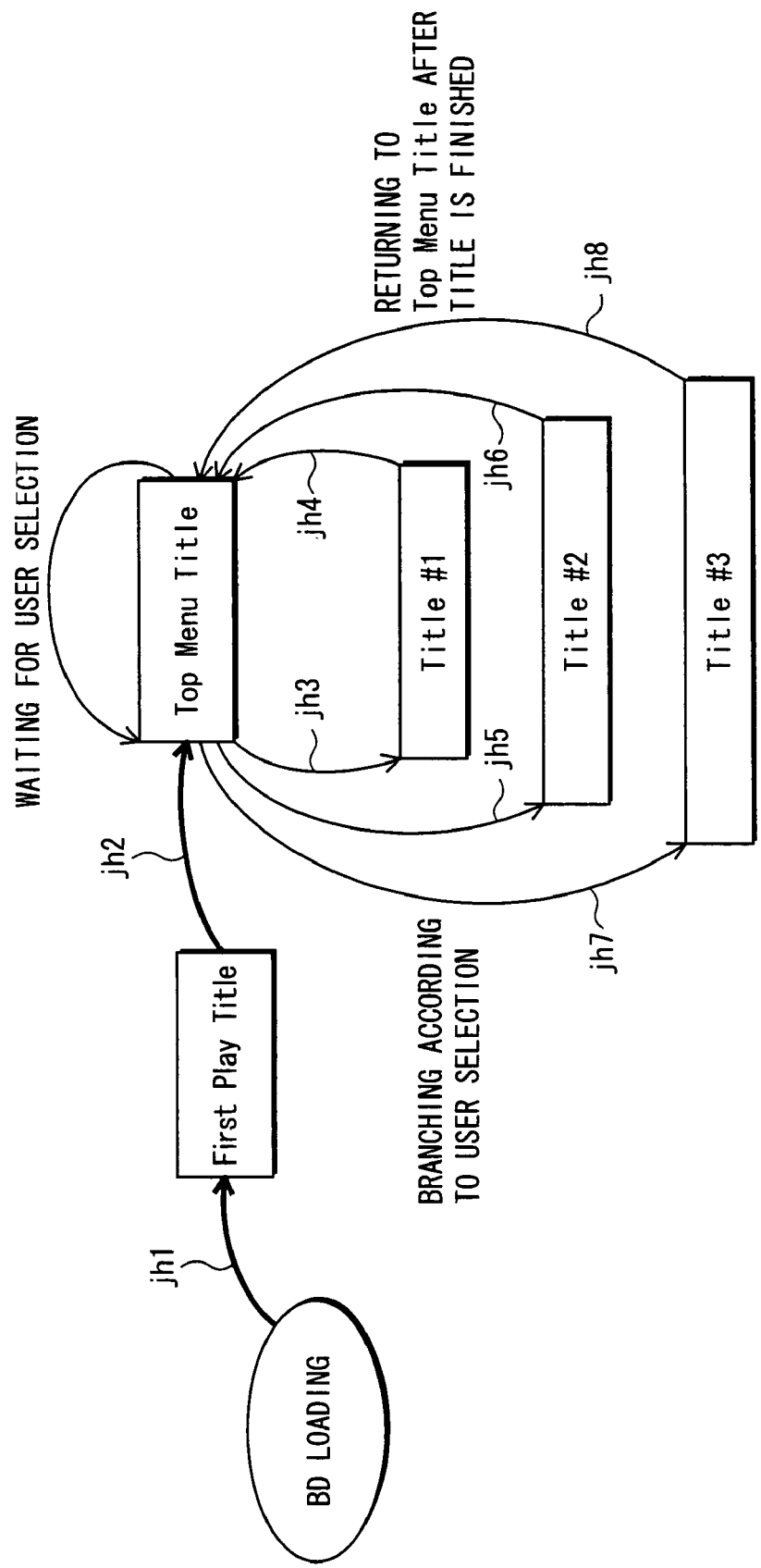
FIG. 14 shows state transition in a disc.

On the other hand, a read-only disc, like a DVD-Video, has a structure centering around the top menu title. With this structure, unique state transition is made such that playback is performed by branching from the top menu title to an individual copyrighted work, and subsequently the top menu title is brought up again. FIG. 14 shows state transition on the disc. Each of the boxes in the figure indicates a Title, which is a playback unit corresponding to one "state" in the state transition unique to the disc. Such a Title is treated as an activation period of a Java™ application.

There are different types of Titles: "FirstPlayTitle" that is played at the beginning when a BD-ROM is being loaded; "Top_menuTitle" structuring Top-Menu; and a common "Title" other than the first two. The arrows jh1, jh2, jh3, jh4, jh5, jh6, jh7 and jh8 in the figure symbolically indicate branching from a Title to another. The state transition shown in the figure is such that "FirstPlayTitle" is played when a BD-ROM is being loaded, branching to "Top_menuTitle" takes place, and then a standby state—waiting for a selection on the top menu to be made—is brought about.

It is the state transition unique to the disc that, when the user makes a selection on the top menu, the process of playing an appropriate Title based on the selection and then returning again to TopMenu Title is endlessly repeated until the BD-ROM is ejected.

How is a Title specified as an activation period in a disc that operates state transition as shown in FIG. 14? Assume here that, after a BD-ROM is loaded, branching is made in numerical order of the reference marks of the arrow jh1, jh2, jh3, jh4 . . . shown in FIG. 14, and then the BD-ROM is ejected. In this case, the continuous time period from the point at which the BD-ROM is loaded to the point at which it is ejected can be treated as a single time axis. Let us regard this time axis as a time axis of the entire disc. FIG. 15A shows the time axis of the entire disc, and FIG. 15B shows the structure of the time axis. The time axis of the entire disc is, as shown in the FIG. 15B, composed of: a period during which FirstPlay Title is being played; periods during which TopMenu Title is being played; periods during which each of title#1 to #3 is being played. Since each Title is made up with only one BD-J Object, a period during which the BD-J Object is activated can be considered as a playback period of the Title. Similarly, since a Title is made up with one or more HDMV Objects, a period during which the HDMV Objects are activated can be considered as a playback period of the Title.

Figure 16A:
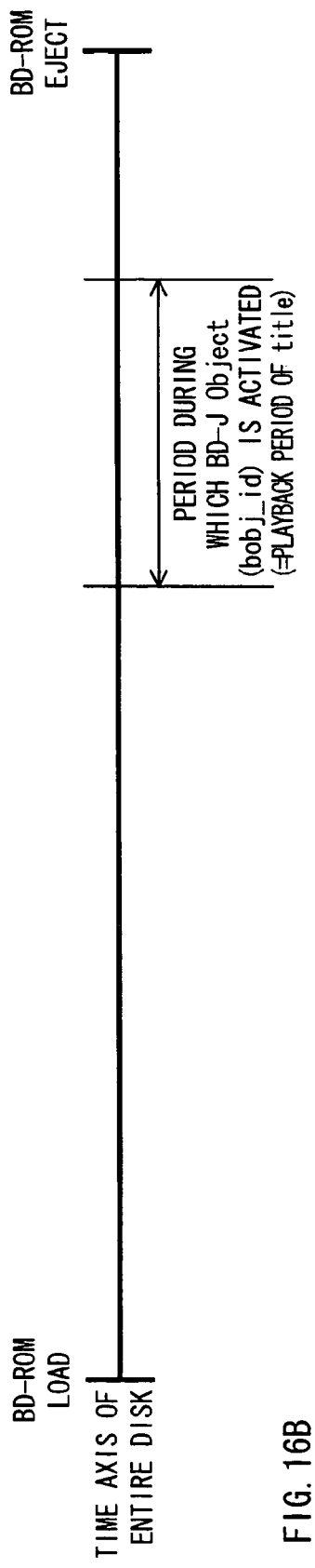
FIGS. 16A and 16B show a playback period of a title specified by a BD-J Object on the time axis of the entire BD-ROM.

That is, FirstPlay Title, TopMenu Title, and other Titles are all made up with dynamic scenarios, and therefore a period during which one of BD-J Objects making up these Titles is activated as a current BD-J Object and undergoes decoding and execution in the readout apparatus can be defined as a playback period of a corresponding Title. FIG. 16A shows a playback period of a title specified by a BD-J Object, which is specified by an identifier bobj_id, on the time axis of the entire BD-ROM. Here, if the BD-J Object specified by the identifier bobj_id makes up one Title, a time period on the BD-ROM time axis, during which this BD-J Object is activated can be deemed as the playback period of the Title.

Here, the period during which a BD-J Object is activated ends when Title branching is made. That is to say, a dynamic scenario being executed is treated as a current BD-J Object until Title branching is performed. Accordingly, a stretch of time period until a JumpTitle occurs in the BD-J Object is treated as a Title period.

Figure 16B:
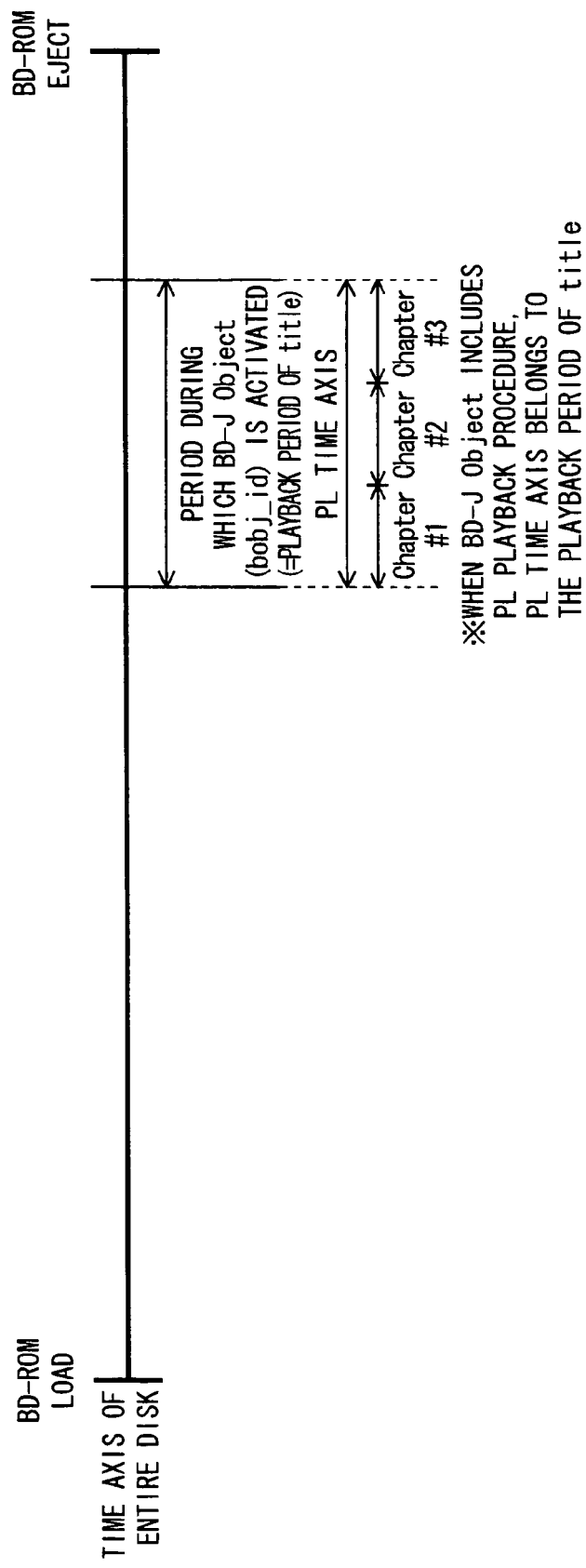

The following explains a relationship between a Title period and a PL time axis. In a MovieObject/BD-J Object, a procedure of PlayList playback can be described as a single processing procedure as described above. If there is a description of a PlayList playback procedure, all or part of the above-mentioned PL time axis belongs to the Title period. In the example shown in FIG. 16A, assume that a playlist management table is written in the BD-J Object. In this case, a PL time axis belongs to a Title period corresponding to the BD-J Object, as shown in FIG. 16B. On the PL time axis, multiple chapters (Chapters #1, #2 and #3) could be further defined. Accordingly, domains of the "entire BD-ROM", "Title", "PlayList", and "chapter" are present on the BD-ROM time axis. An activation period of an application can be described using these domains. Note here that, since PlayList playback is not performed together with the execution of an application, Title branching may take place during the PlayList playback. In this case, not the entire PlayList time axis but only a part of the PlayList time axis belongs to the playback period of one Title. That is, whether the entire PlayList time axis or a part of the PlayList time axis belongs to the playback period of one Title depends on when Title branching takes place.

Figure 17:
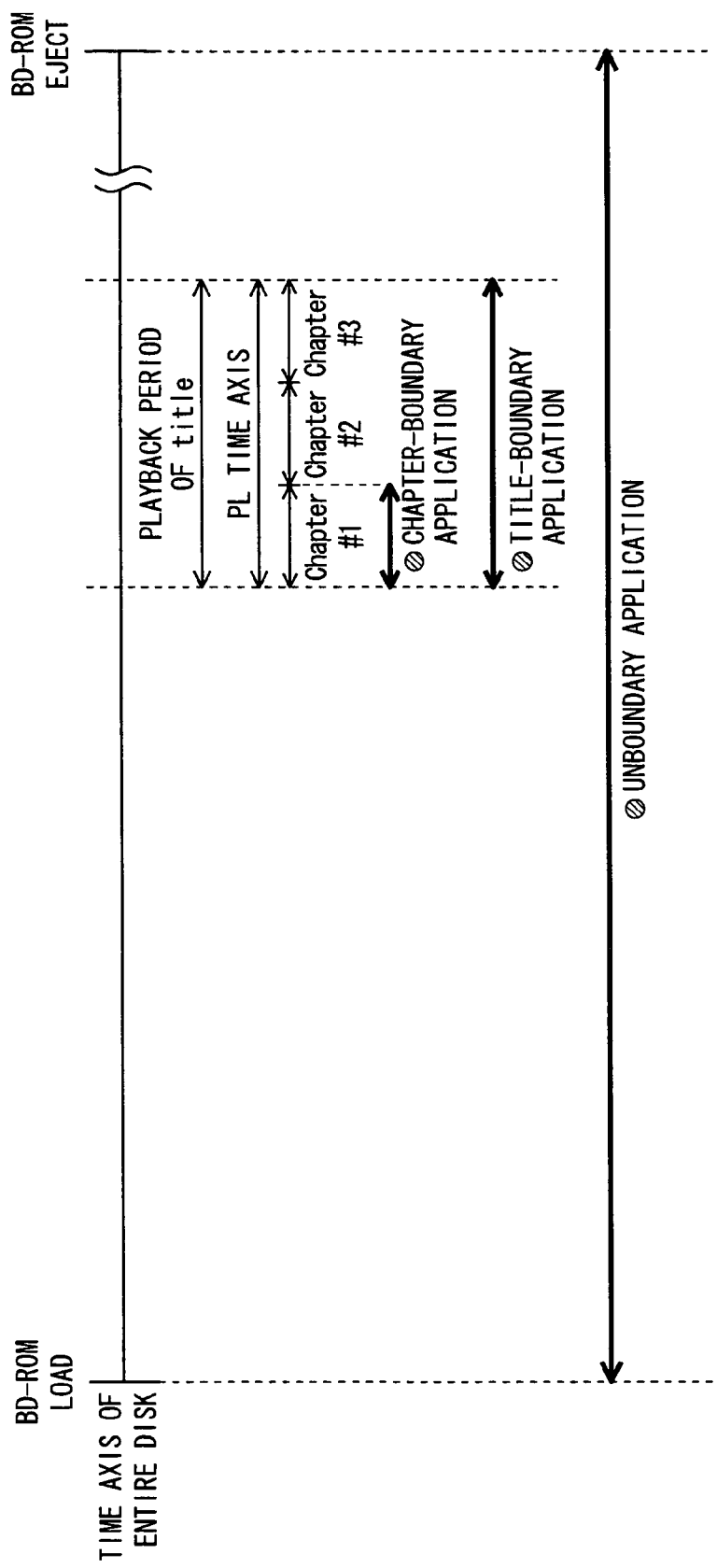
FIG. 17 shows a typical activation period that is defined on the time axis of FIG. 16B.

FIG. 17 shows a typical activation period that is defined on the time axis of FIG. 16B. As shown in the figure, there are three typical types of applications: a "Title boundary application" whose activation period is a Title; a "chapter boundary application" whose activation period is a chapter in a Title; and a "Title-unboundary application" whose activation period is the entire BD-ROM time axis.

Among them, the activation period of a Title boundary application can be defined using an identifier of the Title. The activation period of a chapter boundary application can be defined using a set of an identifier of a Title to which the chapter belongs and an identifier of the chapter.

Even if the platform is in operation, the resources can be retrieved from the application once the activation period of a Title or a chapter is finished. Since an opportunity to retrieve the resources is assured, the platform operations.

Figure 18:
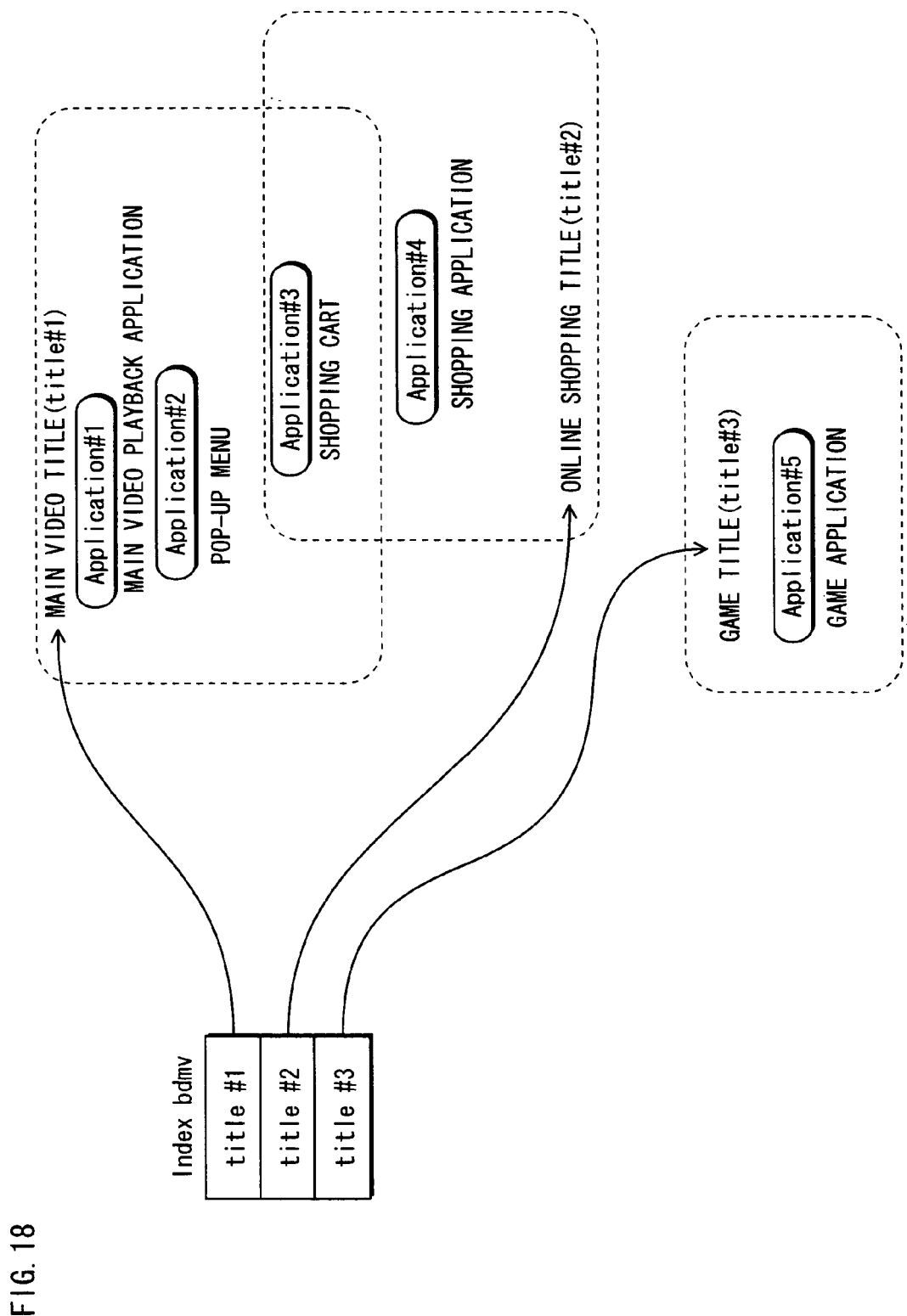
FIG. 18 shows three titles of a main video title, an online shopping title and a game title.

The description of activation periods in an application management table is explained next, giving a specific example with disc contents that will be implemented in the near future. The disc contents here include three Titles with different characters: a main video title (title #1) making up a main video; an online shopping title (title #2) making up online shopping; and a game title (title #3) making up a game application. FIG. 18 shows the disc contents including the three titles of the main video title, the online shopping title and the game title. Index.bdmv is shown on the right hand side of the figure, and the three titles are shown in the left hand side.

The boxes with dotted line on the right hand side show which application belongs to which title. Of the three titles, the title #1 includes three applications of applications #1, #2 and #3. The title #2 includes two applications of applications #3 and #4, and the title #3 includes application #5. In the example of FIG. 21, the application #3 is started up in both titles #1 and #2.

FIG. 19A is obtained by putting the activation periods of the individual applications in a graph based on the belonging relationships indicated by the dotted lines of FIG. 18. The horizontal axis in the figure represents title playback periods, and the vertical axis represents the activation period of each application. Here, the applications #1 and #2 belong only to the title #1, and therefore their activation periods are over the title #1. Since the application #4 belongs only to the title #2, the activation period is over the title #2. Since the application #5 belongs only to the title #3, the activation period is over the title #3. The application #3 belongs to the titles #1 and #2, and the activation period therefore spans the titles #1 and #2. FIG. 19B shows application management tables of the title #1, #2 and #3, which are written based on the activation periods. Thus, once the application management tables are written, the applications #1, #2 and #3 are loaded in the work memory at the start of the playback of the title #1. Then, the applications #1 and #2 are deleted from the work memory at the playback start of the title #2 to thereby leave the application #3 only. Similarly, the application #4 is loaded into the work memory at the playback start of the title #2, and the applications #3 and #4 are then deleted from the work memory at the playback start of the title #3.

Subsequently, the application #5 is loaded into the work memory during the playback of the title #3, and then the application #5 is deleted from the work memory when the playback of the title #3 is finished.

Even when title-to-title branching takes place, only an application not included in the branch source but included in the branch destination is read into the work memory while an application included in both the branch source and destination is stored in the work memory. This reduces the number of times that applications are read into the work memory to the minimum necessary. By thus reducing the number of the read-in times, applications which are free from boundaries of titles, i.e. unboundary applications, can be realized.

The following gives detailed explanation of the startup attributes of applications. The startup attributes include: "AutoRun" indicating an automatic startup; "Present" indicating that the application is not started up automatically but can be stored in the work memory of the virtual machine; and "Suspend" indicating that the application is stored in the work memory of the virtual machine but the CPU power is not allocated to the application.

"AutoRun" is an attribute indicating that the application is read into the work memory and executed at the same time when branching to the corresponding title is performed. When branching is made from one title to another, the management body dealing with the application management (i.e. application manager) reads, into the work memory of the virtual machine, an application which is included in the branch-destination title and whose startup attribute is set to "AutoRun", and executes the read application. Herewith, the application will be automatically started up when the title branching is made.

The startup attribute of "Present" is a continuance attribute which indicates that the state of an application in the branch-source title is maintained in the branch-destination title. In addition, this attribute indicates that a corresponding application can be executed. An application whose startup attribute is "Present" can be called up from another application. When receiving a call-up from an application in the startup, the management body dealing with the application management (i.e. application manager) judges whether the ID of the application is written in the application management table and whether the startup attribute is "Present". When it is "Present", the management body loads the application into the work memory. On the other hand, when the ID of the called application is not written in the application management table, the application will not be loaded into the work memory. A call-up from another application can be made only for applications with the startup attribute of "Present" attached thereto. "Present" is a default startup attribute assigned to an application when the startup attribute is not explicitly specified. Namely, the startup attribute of an application is "Present" when being unspecified "-".

"Suspend" indicates that the application is in the state where a resource is allocated but the CPU power is not allocated. The startup attribute "Suspend" is useful, for example, for realizing a process of going through a side path during the execution of a game title.

FIG. 20 shows possible combinations of the three modes for the startup attributes (Present, AutoRun and Suspend) and three modes for an application in the immediately previous title (Non-startup, Startup and Suspend). If an application having a startup attribute of "AutoRun" was placed in the "Non-startup" mode in the immediately previous title, the application will be started up in the branch-destination title.

When an application having a startup attribute of "Present" or "Suspend" was placed in the "Non-startup" mode in the immediately previous title, the application will not operate in the branch-destination title, maintaining the mode.

When an application having a startup attribute of "Present" or "AutoRun" was placed in the "Startup" mode in the immediately previous title, the application will not operate in the branch-destination title, maintaining the mode.

If an application having a startup attribute of "Suspend" was placed in the "Startup" mode in the immediately previous title, the application will be suspended in the branch-destination title. When an application has a startup attribute of "Suspend" in the branch-destination title while placed in the "Suspend" mode in the immediately previous title, the application will remain as suspended. When an application having a startup attribute of "Present" or "AutoRun" was placed in the "Suspend" mode in the immediately previous title, the application will resume in the branch-destination title. By defining the activation periods and startup attributes in the application management table, it is possible to perform synchronous control of operating Java™ applications along the progression of title playback periods. As a result, various applications involving video playback and program execution can be created.

Note that, when an application having a startup attribute of "Present" was placed in the "Suspend" mode in the immediately previous title, the application may remain as suspended in the branch-destination title.

Finally, "startup priority" for each application is explained.

The startup priority takes a value between 0 and 255, and is used by the application manager as information for making a decision on which application to be forcibly terminated or which application a resource is taken away from when the memory resources are depleted or when the CPU load increases. In this case, the application manager terminates the operation of an application having a low startup priority while maintaining the operation of an application having a high priority.

In addition, the startup priorities are used for adjustment of applications when a conflicting request is made for a PlayList being played back. Here, assume that a given application is fast-forwarding a PlayList. Then, another application makes a request to pause the same PlayList. The application manager compares the startup priorities assigned to these applications. When the application fast-forwarding the PlayList has a higher startup priority, the application manager lets the fast-forwarding by the application continue. Contrarily, the application which requested pausing the PlayList has a higher startup priority, the application manager pauses the PlayList being fast-forwarded.

With these activation periods, startup attributes and startup priorities, it is possible to establish, at the authoring stage, specifications for controlling the number of applications allowed to operate on the virtual machine to be a predetermined number or less. Accordingly, stabilization of the application operations can be assured.

<PlayList Management Table>

Thus concludes the description of the application management table. The PlayList management table (PLMT) is described next. The PlayList management table is a table showing playback control to be performed with each application during the activation period of the application. The operations of applications are unstable and may cause startup failures and abnormal ends. Given this factor, in the present embodiment, a PlayList management table is provided for each activation period of an application as a fail-safe mechanism that functions when a startup failure or an abnormal end occurs. The PlayList management table shows information that specifies playback control to be performed when an activation period of an application starts. The playback control means AVClip playback based on PlayList information. By performing the playback control based on PlayList information at the same time, application execution and PlayList playback are simultaneously carried out.

FIG. 21A shows the internal structure of a PlayList management table. As shown in the figure, the PlayList management table is composed of "PL_id_ref" and "Playback_Attribute".

FIG. 21B explains meanings of information elements constituting the PlayList management table.

Written in the "PL_id_ref" is a "reference value" corresponding to a PlayList identifier, which indicates a PlayList that becomes playable in the activation period of a corresponding application. The PlayList identifier is represented by the 5-digit numeric figure, "YYYYY", attached to a file "YYYYY.MPLS" as the file name. The YYYYY is written in the "PL_id_ref", which thereby shows which PlayList is playable in a corresponding Title.

Being similar to the startup attribute in the application management table, the "Playback_Attribute" is a playback attribute specifying how to play a PlayList written in the "PL_id_ref" at the start of a corresponding Title. There are two types of playback attributes of PlayLists, "AutoPlay" and "Present".

"AutoPlay" is an attribute indicating that the PlayList is to be played at the same time when branching to the corresponding title is performed. When branching is made from one title to another, the management body dealing with the application management (i.e. application manager) starts playback of a PlayList which is playable in the branch-destination title and whose playback attribute is set to "AutoPlay". Herewith, the PlayList whose playback attribute is set to "AutoPlay" will be automatically played when the title branching is made.

"Present" is a continuance attribute, similarly to "Present" of the startup attribute, and indicates that the mode of the PlayList in the branch-source title will be maintained. It also shows that the corresponding PlayList can be played. For example, there are two Titles (previous and current Titles) to be sequentially played. Here, the playback attribute of a given PlayList is set to "AutoPlay" in the PlayList management table of the previous Title while the playback attribute of the PlayList is set to "Present" in the PlayList management table of the current Title. Assume that the playback period of the PlayList is two hours and branching takes place after one hour of the playback of the PlayList. In this case, since the playback attribute of the PlayList is set to "Present" in the current Title, the PlayList is played in the current Title from immediately after the already played one-hour section of the PlayList. Thus, to set the playback attribute to "Present" allows for starting the PlayList playback from the remaining section even if Title-to-Title branching takes place. Herewith, it is possible to readily realize "sharing of the playback of the same PlayList over Titles" in which the common PlayList is played in sequenced branch-source and branch-destination Titles. Additionally, in the case when there are multiple branch-destination Titles, if the playback attributes of all the Titles are set to "Present", the playback of a single, common PlayList can be continued even when branching is made to any of these Titles.

Note that the seamless playback between Titles does not have to be guaranteed. Therefore, when one PlayList is to be played over multiple Titles as described above, it is allowable to have a disruption in the PlayList playback, around the branching.

A PlayList having a playback attribute of "Present" will be played in response to a playback request from another application. When receiving a PlayList playback request from an application in the startup, the management body dealing with the application management (i.e. application manager) judges whether the PL_id_ref of the requested PlayList is written in the PlayList management table and whether the playback attribute is "AutoPlay"/"Present" or not. When the playback attribute is either "AutoPlay" or "Present", the application manager plays the PlayList. On the other hand, when the PL_id_ref of the requested PlayList is not written in the PlayList management table, the PlayList will not be played. Thus, PlayList playback in response to a request from an application is limited to PlayLists having a playback attribute of "AutoPlay" or "Present". "Present" is a default playback attribute assigned to a PlayList when the playback attribute is not explicitly specified. Namely, the playback attribute of a PlayList is "Present" when being unspecified as "-".

FIG. 22 shows a specific example of a Title specified by a PlayList management table and an application management table. Level 1 of FIG. 22 shows a playback video of the Title, and Level 2 shows a time axis of the Title. Level 3 shows a PlayList for playback, which is specified by the PLMT, and Level 4 shows the execution of the application. As shown in Level 4, application #1 is started up together with the start of the Title, and brought into an operational state at a time point t1. On the other hand, the playback of PlayList #1 is started together with the start of the Title. Thus, since the playback of PlayList #1 is started together with the start of the Title, a playback image gj1 of the PlayList is displayed in full-screen mode during the startup delay immediately after the playback start of the Title until the application being brought into an operational state, as shown on the left hand side of Level 1. By setting the playback attribute of the PlayList in the PlayList management table to "AutoPlay", some sort of image is displayed until the Java™ application is set into an operational state even if it takes five to ten seconds. The state in which "some sort of image is displayed" compensates the startup delay at the start of the Title execution.

On the other hand, since the application #1 is brought into an operational state at the time point t1, a composite image gj2, in which a PlayList playback image is set in a child screen and an image for the application execution is set in a parent screen, is displayed at the time point t1. The image for the application execution is a GUI framework for a game, and a Start button, a continue button, and a POWER indicator are arranged therein. The image for the application execution is created by the Java™ application carrying out a drawing process of such a GUI framework.

It is a character of the PLMT that being able to configure a Title with a playback video, in which a playback video of a PlayList and a GUI framework of a Java™ application are combined.

Figure 23:
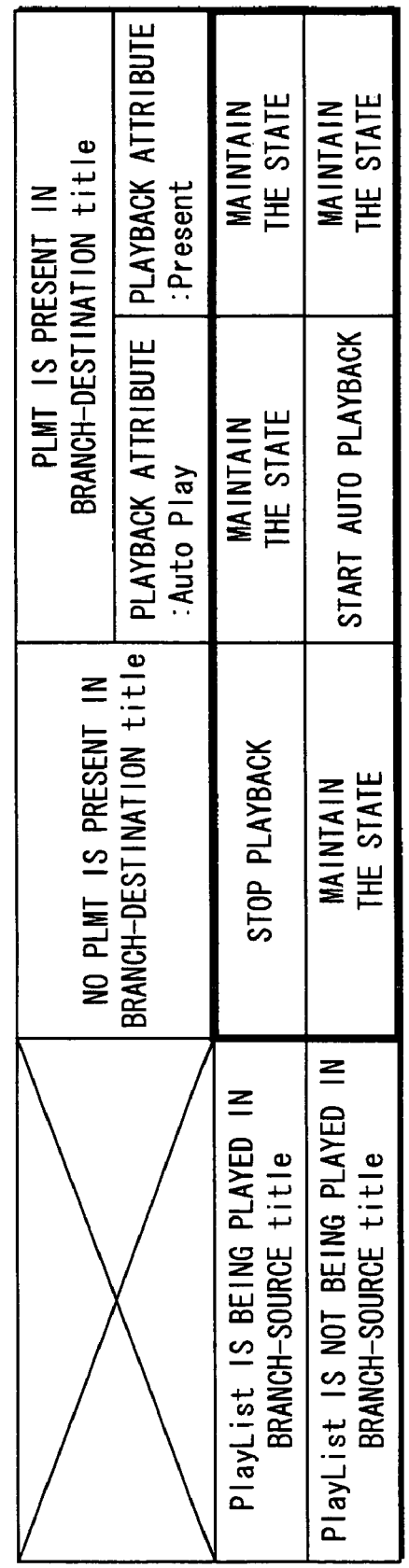
FIG. 23 shows possible combinations of three modes for the current Title (no PLMT, PLMT is present and the playback attribute is unspecified, and PLMT is present and the playback attribute is AutoPlay) and states of the PlayList in the immediately previous Title ("not being played" and "being played")

FIG. 23 shows possible combinations of three modes for the current Title ((i) no PLMT, (ii) PLMT is present and the playback attribute is AutoPlay, and (iii) PLMT is present and the playback attribute is unspecified) and states of the PlayList in the immediately previous Title ("not being played" and "being played").

Among the six combinations in the figure, the combination "a PlayList is not being played in the immediately previous Title" and "a PLMT is present in the current Title and the playback attribute of the current Title is AutoPlay" means that the playback of the PlayList in the branch-destination Title starts automatically.

With the combination of "a PlayList is being played in the immediately previous Title" and "no PLMT is present in the current Title", the playback of the PlayList in the branch-destination Title stops automatically.

With the combinations other than these two, the state in the immediately previous Title is maintained in the branch-destination Title. The start of PlayList playback based on a PLMT happens only when a PlayList is not being played in the branch-source Title and the playback attribute of the PlayList in the branch-destination Title is AutoPlay, and therefore the PlayList playback does not have to be started each time when Title-to-Title branching takes place. As a result, even if Title-to-Title branching takes place a number of times, the number of times the PlayList playback is started can be kept to minimum necessary.

Thus concludes the description of the recording medium. The readout apparatus of the present invention is described next.

Figure 24:
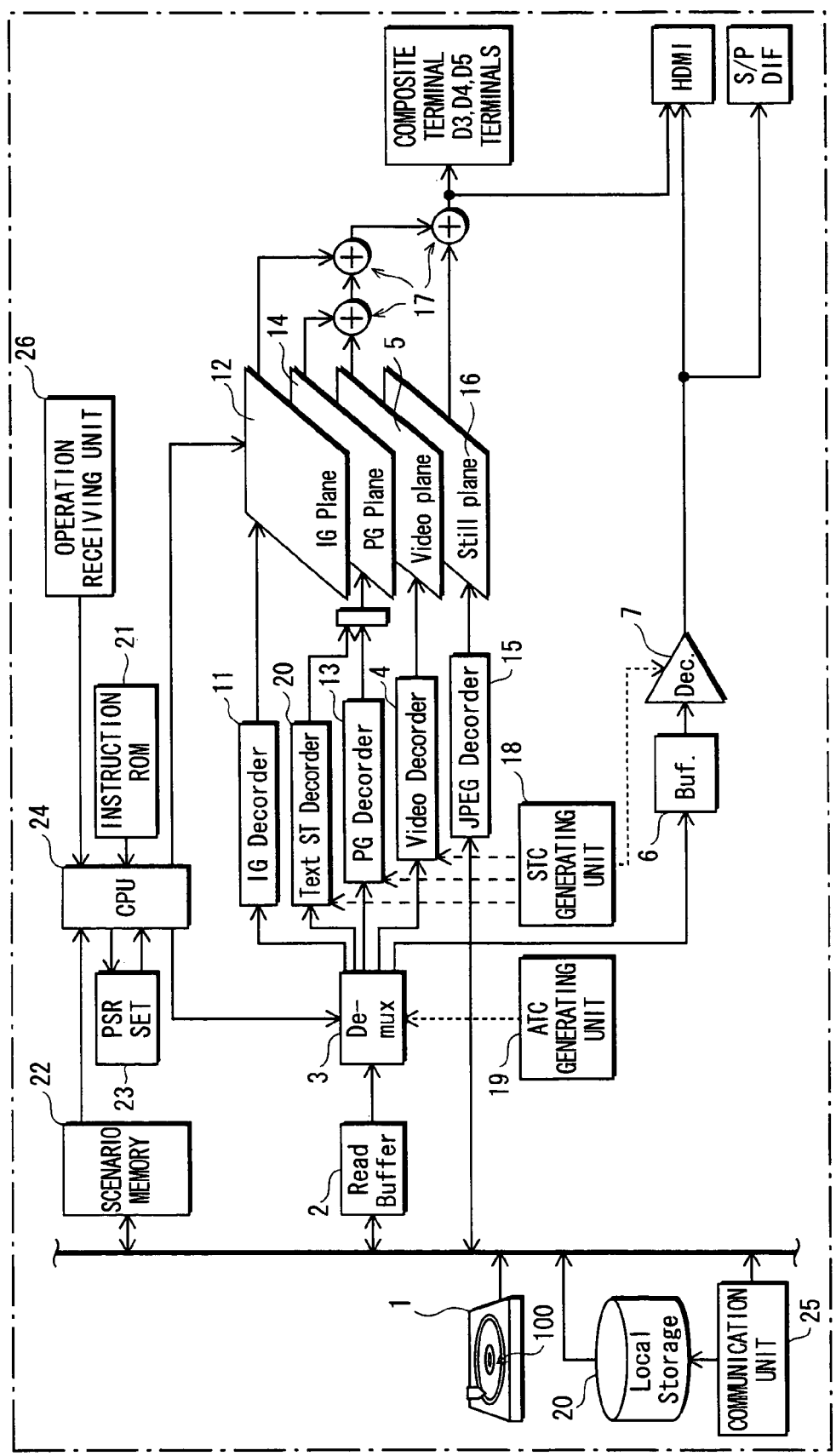
FIG. 24 shows the internal structure of the readout apparatus of the present invention.

FIG. 24 shows the internal structure of the readout apparatus of the present invention. The readout apparatus of the present invention is commercially manufactured based on the internal structure shown in the figure. The readout apparatus of the present invention is mainly composed of two parts—a system LSI and a drive device, and can be produced commercially by mounting these parts on the cabinet and substrate of the device. The system LSI is an integrated circuit in which various processing units for carrying out functions of the readout apparatus are incorporated. The readout apparatus manufactured in this way comprises: a BD-ROM drive 1; a read buffer 2; a demultiplexer 3; a video decoder 4; a video plane 5; a buffer 6; an audio decoder 7; an Interactive Graphics decoder 11; an Interactive Graphics plane 12; a Presentation Graphics decoder 13; a Presentation Graphics plane 14; a JPEG decoder 15; a Still plane 16; a composing unit 17; a STC generating unit 18; an ATC generating unit 19; a local storage 20; an instruction ROM 21; a scenario memory 22; a PSR set 23; a CPU 24; a communication unit 25; and an operation receiving unit 26.

The BD-ROM drive 1 loads/ejects a BD-ROM, and executes access to the BD-ROM.

The read buffer 2 is a FIFO memory, and TS packets read from the BD-ROM are stored therein in a first-in first-out manner.

The demultiplexer (De-MUX) 3 takes out TS packets from the read buffer 2, and converts the TS packets into PES packets. Then, the demultiplexer 3 outputs, among the PES packets obtained by the conversion, ones having PID written in the STN_Table to any one of the video decoder 4, the audio decoder 7, the Interactive Graphics decoder 11 and the Presentation Graphics decoder 13.

The video decoder 4 decodes multiple PES packets output from the demultiplexer 3, obtains uncompressed pictures and writes the pictures to the video plane 5.

The video plane 5 is a plane for storing therein uncompressed pictures. A plane is a memory area of the readout apparatus for storing pixel data of a single screen capacity. The resolution of the video plane 5 is 1920×1080, and the picture data stored in the video plane 5 is composed of pixel data represented by a 16-bit YUV. On the video plane 5, scaling can be performed on playback video for each frame of a video stream. Scaling is to change a playback image for each frame into either ¼ (a quarter) or ⅟₁ (full scale) of the entire video plane 5. Such scaling is executed in BD-J mode according to instruction from the CPU 24, which thereby allows for screen presentations such as moving the playback images of the video stream to a corner of the screen and bringing up the playback images in full screen.

The buffer 6 stores TS packets output from the demultiplexer 3 therein in a first-in first-out manner, and sends the TS packets to the audio decoder 7.

The audio decoder 7 decodes Primary audio streams.

The Interactive Graphics (IG) decoder 11 decodes an IG stream read from a BD-ROM or the local storage 20, and writes the uncompressed graphics to the Interactive Graphics plane 12.

To the Interactive Graphics (IG) plane 12, in HDMV mode, uncompressed graphics obtained by decode processing of the IG decoder 11 are written. In BD-J mode, characters and graphics drawn by an application are also written to the Interactive Graphics plane 12.

The Presentation Graphics (PG) decoder 13 decodes a PG stream read from a BD-ROM or the local storage 20 and writes the uncompressed graphics to the Presentation Graphics plane 11. The subtitle appears on the screen by decode processing of the PG decoder 13.

The Presentation Graphics (PG) plane 14 is a memory having a single screen capacity area, and is able to store therein uncompressed graphics of a single screen capacity.

The JPEG decoder 15 decodes JPEG data stored in a BD-ROM or the local storage 20 and writes the decoded data to the Still plane 16.

The Still plane 16 is a plane in which uncompressed graphics data obtained by expanding JPEG data is stored. The graphics data is used as a so-called "wallpaper" of the GUI framework, which is drawn by a Java™ application.

The composing unit 17 obtains a composite image created by composing the storage contents of the Interactive Graphics plane 12, Presentation Graphics plane 14, video plane 5 and Still plane 16.

The STC generating unit 18 generates a System Time Clock (STC). When a STC_Sequence is switched to another, a STC value (STC2) of the new STC_Sequence is obtained by adding an offset value called STC_delta to a STC value (STC1) of the previous STC_Sequence. The STC_delta is calculated using the following equation:

$$STC\_delta = PTS1(1stEND) + Tpp - PTS2(2ndSTART)$$

where PTS1 (1stEND) is a display start time of a picture to be played at the last in the previous STC_Sequence; Tpp is a display period of the picture; and PTS2(2ndSTART) is a start time of a picture to be displayed first in the following STC_Sequence. The STC_delta is obtained in this manner, and the clock's countable value obtained by adding this STC_delta is output to each decoder. Herewith, the individual decoders are able to play a stream made up of two STC_Sequences without a break. As a result, even if two or more STC_Sequences are present in one AVClip, or two or more AVClips to be sequentially played respectively have different STC_Sequences, these STC_Sequences are decoded seamlessly.

The ATC generating unit 19 generates an Arrival Time Clock (ATC). When an ATC_Sequence is switched to another, an ATC value (ATC1) of the previous ATC_Sequence and an ATC value (ATC2) of the new ATC_Sequence are made to be continuous values by adding an offset value called ATC_delta to the ATC1. With this addition, ATC2=ATC1+ATC_delta. The ATC_delta is an offset value between an input point T1 of the last TS packet of the previously readout transport stream (TS1) and an input point T2 of the first TS packet of the newly readout transport stream (TS2), and is approximated by: "ATC_delta≧N1/TS_recording_rate". Here, the input point T2 is obtained by placing the input point of the first TS packet of the TS2 on the time axis of the TS1. N1 is the number of TS packets following the last video PES packet of the TS1. In a BD-ROM, this ATC_delta is written in Clip information, and the ATC_delta can be therefore calculated using the Clip information. According to the calculations above, the ATC value (ATC1) of the previous ATC_Sequence and the ATC value (ATC2) of the new ATC_Sequence can be made to be continuous values. A clock's countable value obtained by adding the ATC_delta is output to the demultiplexer (De-MUX) 3, and whereby seamless buffer control can be realized.

In order to establish buffering continuity, the following 1) and 2) should be satisfied.

1) STC2(2ndSTART)>STC2(1stEND)

Here, STC2(1stEND) is a value obtained by positioning STC1(1stEND) on the STC2 time axis, and calculated by the equation "STC2(1stEND)=STC1(1stEND)−STC_delta.

2) The takeout of TS packets from TS1 and the takeout of TS packets from TS2 are defined by STC1 and STC2 which are positioned on the same time axis, and the buffer does not cause an underflow or overflow.

The local storage 20 is a hard disc for therein storing, together with metadata, contents supplied by communication media and recording media other than BD-ROMs—such as contents downloaded from web sites. The metadata is information for managing download contents by binding them to the local storage 20. By accessing the local storage 20, an application in BD-J mode is able to perform various processes using the download contents.

The instruction ROM 21 stores therein software that defines control of the readout apparatus.

The scenario memory 22 is memory for storing current PL information and current Clip information. The current PL information is, among multiple pieces of PL information recorded on a BD-ROM, a PL information piece currently targeted for processing. The current Clip information is, among multiple pieces of Clip information recorded on a BD-ROM, a Clip information piece currently targeted for processing.

The PSR set 23 is a built-in register of the readout apparatus, and is made up of 64 Player Status/Setting Registers (PSR) and 4096 General Purpose Registers (GPR). Among the setting values of the Player Status/Setting Registers (PSR), PSR4 to PSR8 are used for describing the current playback time point.

When set to a value in the range of 1 to 100, PSR4 indicates a Title to which the current playback point belongs. When set to 0, PSR4 indicates that the current playback time point belongs to the top menu.

PSR5, when set to a value in the range of 1 to 999, indicates a chapter number to which the current playback time point belongs. When set to 0xFFFF, PSR5 indicates that the chapter number is invalid in the readout apparatus.

PSR6, when set to a value in the range of 1 to 999, indicates a number of a PL to which the current playback time point belongs (i.e. current PL).

PSR7, when set to a value in the range of 0 to 255, indicates a number of a PlayItem (current PlayItem) to which the current playback point belongs (i.e. current PlayItem).

PSR8, when set to a value in the range of 0 to 0xFFFFFFFF, indicates the current playback time point (current PTM (Presentation TiMe)) using a time accuracy of 45 KHz. PSR4 to PSR8 above identify where on the time axis of the entire BD-ROM in FIG. 16A the current playback time point is located.

The CPU 24 executes software stored in the instruction ROM 21 and controls the entire readout apparatus. The contents of the control dynamically change according to information indicating a user event output from the operation receiving unit 26 and a setting value of each PSR in the PSR set 23.

The communication unit 25 conducts the communication function of the readout apparatus, and establishes a TCP connection, an FTP connection or the like to the web site of a URL when being in BD-J mode and if receiving the URL specification from a Java™ application. Such connection establishment enables a Java™ application to perform download from a web site.

The operation receiving unit 26 receives an operation made by the user on the remote controller, and informs the CPU 24 of such an operation, i.e. information indicating a user event.

Thus concludes a hardware structure of the readout apparatus of the present embodiment. Next is described a software structure of the readout apparatus of the present embodiment.

Figure 25:
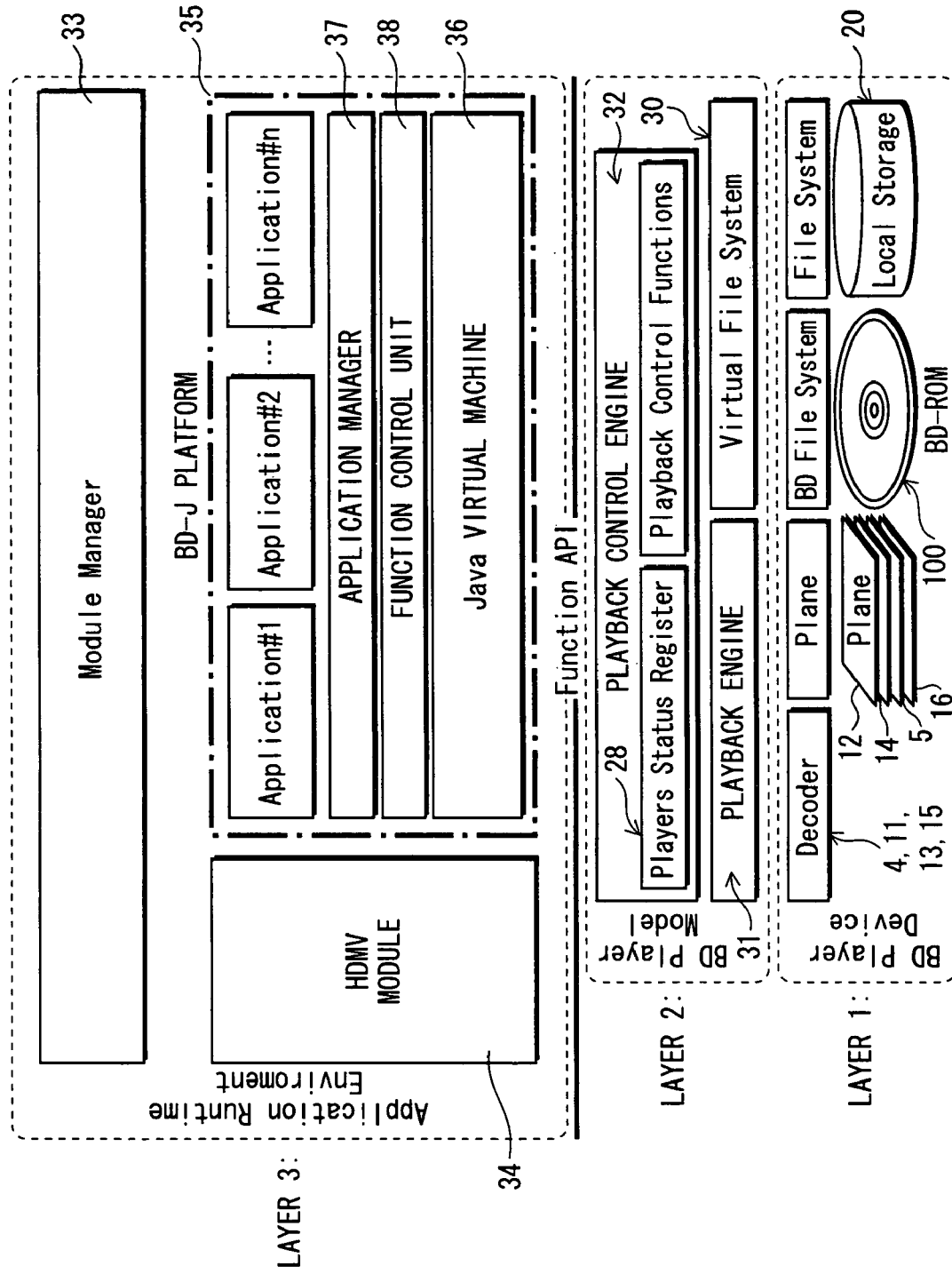
FIG. 25 shows software and hardware components contained in a ROM 24, which are depicted in a layer model.

FIG. 25 shows software and hardware components contained in the ROM 21, which are depicted in a layer model. The layer model of the readout apparatus is composed of a), b) and c) below, as shown in the figure:
 a) Layer 1: BD Player Device;
 b) Layer 2: BD Player Model; and
 c) Layer 3: Application Runtime Environment.

Among these layers, the hardware structure of the readout apparatus belongs to Layer 1. The BD Player Device of Layer 1 in the figure includes, out of the hardware components: "decoders" composed of the video decoder 4, the audio decoder 7, the IG decoder 11, and a PG decoder 13; "planes" composed of the video plane 5, the IG plane 12, and the PG plane 14; a BD-ROM and the file system thereof; and the local storage 20 and the file system thereof.

Layer 2 of "BD Player Model" is composed of the layers b1) and b2) below. That is,
 b1) Layer of a Playback Control Engine 32; and
 b2) Layer of a Virtual File System 30 and a presentation engine 31.
Layer 2 offers function APIs to the upper levels.

Layer 3 of "Application Runtime Environment" is composed of the layers c1) and c2) below. That is,
 c1) Layer on which the module manager 33 is present; and
 c2) Layer on which the BD-J platform 35 is present.

First, the Virtual File System 30 to the HDMV module 34 belonging to Layers 2 and 3 are described.

The virtual File System 30 is a virtual file system for integrally handling the download contents stored in the local storage 20 and the disc contents of a BD-ROM. Here, the download contents stored in the local storage 20 include SubClip, Clip information and playlist information. The playlist information included in the download contents is different from the playlist information of a BD-ROM in being able to specify Clip information of either the BD-ROM or the local storage 20. To make such specification, the playlist information of the Virtual File System 30 need not specify a file on the BD-ROM or the local storage 20 with a full path name. This is because the file system of the BD-ROM and that of the local storage 20 are recognized as a single virtual file system (Virtual File System 30). Accordingly, PlayItem information is able to specify a playback period on either an AVClip on the Virtual File System 30 or an AVClip on the BD-ROM. By reading the contents recorded on the local storage 20 via the Virtual File System 30 and dynamically combining the read contents and the contents recorded on the BD-ROM, it is possible to create a wide range of playback variations. The disc contents formed by combining the local storage 20 and the BD-ROM are handled on an equal basis as the disc contents of the BD-ROM, and therefore, the "BD-ROM" of the present application shall include a virtual recording medium formed by combining the local storage 20 and a BD-ROM.

The presentation engine 31 executes AV playback functions. The AV playback functions in the readout apparatus consist of a conventional function group similar to that found in DVD and CD players, such as starting playback (Play); stopping playback (Stop); pausing (Pause-On); releasing a pause (Pause-Off); releasing a still (Still-Off); speed specified fast-forwarding (Forward Play (speed)); speed specified fast-rewinding (Backward Play (speed)); changing audio settings (Audio Change); changing subtitle settings (Subtitle Change); and changing angle settings (Angle Change). In order to realize the AV playback functions, the presentation engine 31 controls the video decoder 4, PG decoder 13, IG decoder 11 and audio decoder 7 so as to decode, within AVClips read to the read buffer 2, a portion corresponding to a desired time. Decoding a portion corresponding to a desired time that is indicated by PSR8 (current PTM) enables playback of a given time point of an AVClip.

The playback control engine (PCE) 32 executes various functions, such as (i) playback control functions for PlayLists and (ii) state acquisition/setting functions for the PSR set 23. The playback control functions for PlayLists involve causing the presentation engine 31 to carry out, among the AV playback functions performed by the presentation engine 31, the functions of playback start and playback stop according to the current PL information and Clip information. These functions (i) and (ii) are executed according to function calls from the HDMV module 34 and the BD-J module 35.

The module manager 33 holds Index.bdmv read from the BD-ROM and performs branch control. The branch control is made by issuing a Terminate event to a dynamic scenario constituting the current title and by issuing an Activate event to a dynamic scenario constituting the branch-destination title.

The HDMV module 34 is the main execution body of the HDMV mode. The HDMV module 33 reads a MovieObject into the memory, decodes a navigation command described in the Movie Object, and executes a function call to the playback control engine 32 based on the result of the decoding.

Thus concludes the descriptions of the presentation engine 31 to the HDMV module 34. The BD-J platform 35 is described next.

The BD-J platform 35 is a so-called Java™ platform, and has a Java™ Virtual Machine 36 at the core of the structure. The BD-J Extension is mounted on the BD-J platform 35, in addition to the above-mentioned Java™ 2 Micro_Edition (J2ME) Personal Basis Profile (PBP 1.0) and the Globally Executable MHP specification (GEM[1.0.2]) for package media targets. The BD-J Extension includes various specialized packages for providing the functionality exceeding the GEM[1.0.2] to the BD-J platform.

The following describes the internal structure of the BD-J platform 35. First, the Java™ Virtual Machine 36, which is a core of the BD-J platform 35, is explained.

<Java™ Virtual Machine 36>

Figure 26:
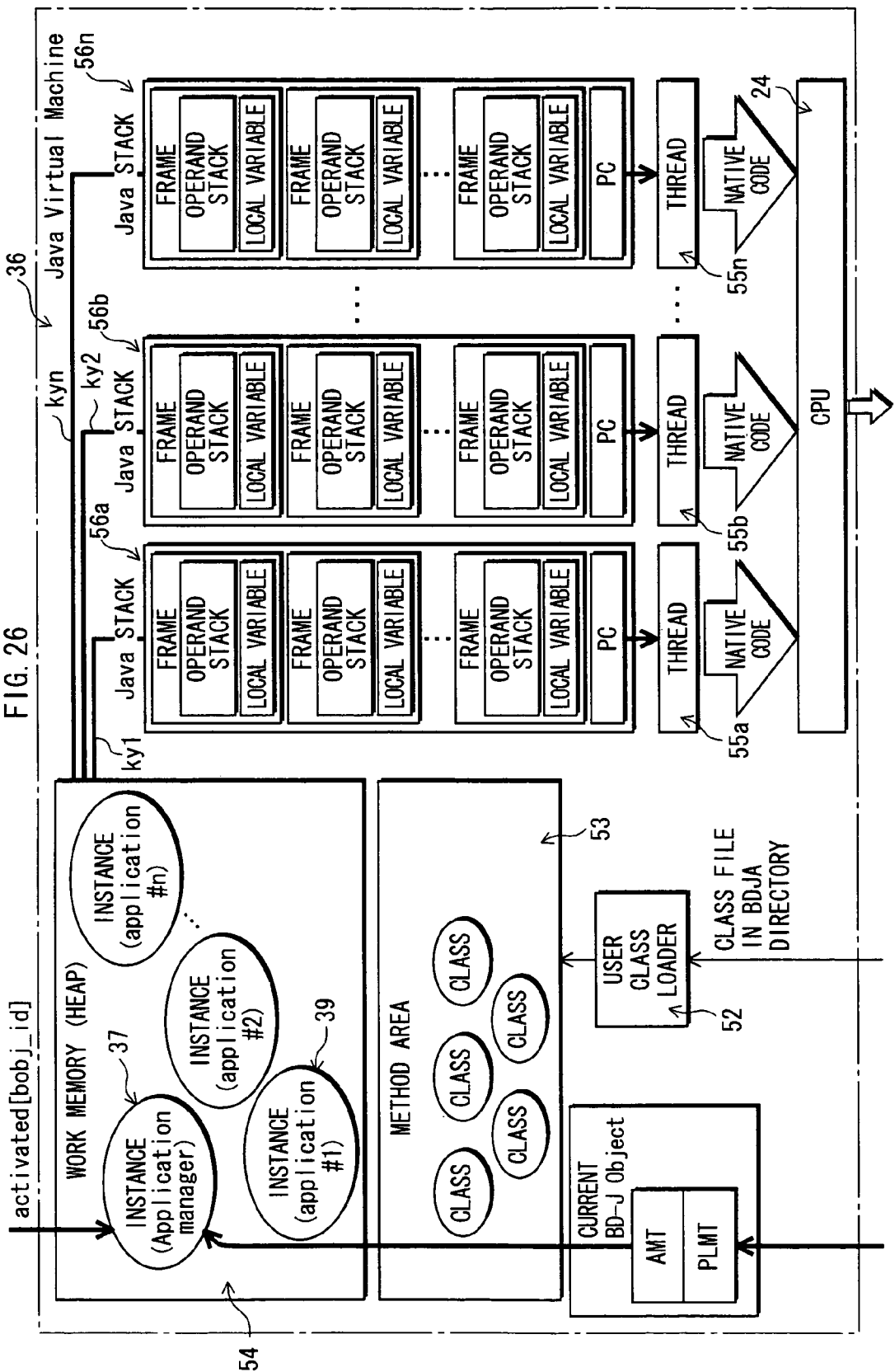
FIG. 26 shows the internal structure of the Java™ Virtual Machine 36.

FIG. 26 shows the internal structure of the Java™ Virtual Machine 36. As shown in the figure, the Java™ Virtual Machine 36 is composed of the CPU 24 shown in FIG. 24, a user class loader 52, a method area 53, a work memory 54, threads 55a, 55b, . . . , and 55n, and Java™ stacks 56a, 56b, . . . , and 56n.

The user class loader 52 reads out class files in the Java™ archive file in the BDJA directory from the scenario memory 22 or the like, and stores the read class files in the method area 53. The readout of class files by the user class loader 52 is realized by the application manager 37 specifying a file path and instructing the user class loader 52 to perform the readout. When the file path indicates the scenario memory 22, the user class loader 52 reads out class files in the Java™ archive file structuring an application from the scenario memory 22 to the work memory 54. If the file path indicates a directory in the Virtual File System 30, the user class loader 52 reads out the those class files from the BD-ROM or the local storage 20 to the work memory 54. The startup control of the application is realized by the readout of the class files performed by the user class loader 52. If the class files that the user class loader 52 was instructed to read out are not in the scenario memory 22, the user class loader 52 informs the application manager 37 of the readout failure.

The method area 53 stores therein class files read by the user class loader 52 from the scenario memory 22.

The work memory 54 is a so-called heap area, and instances of various class files are stored therein. The application manager 37 shown in FIG. 25 is a resident application that always remains in the work memory 54. In addition to the resident instances, instances corresponding to class files read to the method area 53 are also stored in the work memory 54. These instances are an xlet program structuring an application. The application becomes executable by disposing the xlet program in the work memory 54.

Although the layer model in FIG. 25 depicts that the application manager 37 in the work memory 54 is located above the Java Virtual Machine 36, this depiction is provided only to make it easily understandable. In a practical sense, the application manager 37 and the application are executed by threads 55a, 55b, . . . , and 55n as instances.

The threads 55a, 55b, . . . , and 55n are logical execution bodies that execute methods stored in the work memory 54. These threads perform calculation using local variables and arguments stored in the operand stacks as operands, and store the results in the local variables or operand stacks. The arrows ky1, ky2 and kyn in the figure symbolically show the supply of methods from the work memory 54 to the threads 55a, 55b, . . . , and 55n. Whereas the CPU is the only physical execution body, up to 64 threads, which are logical execution bodies, can exist in the Java™ Virtual Machine 36. With limits of no more than 64, new thread can be created and/or existing threads can be deleted, and the number of operating threads can be increase and decrease during operations of the Java™ Virtual Machine 36. Since the number of threads can be increased accordingly, it is possible to speed up instances by performing parallel execution of an instance by multiple threads. FIG. 26 depicts that the CPU 24 and the threads correspond to each other in a one-to-many manner. However, when there are multiple CPUs, the CPUs and threads could correspond to each other in a many-to-many manner. The method execution by the threads 55a, 55b, . . . , and 55n is realized by converting a bytecode structuring a method into a native code of the CPU 24 and issuing the native code to the CPU 24. Since the native code conversion is not the main focus of the present invention, the description is left out here.

The Java™ stacks 56a, 56b, ..., and 56n exist in a 1:1 ratio with the threads 55a, 55b, ..., and 55n, and each Java™ stack has a program counter (PC in the figure) and one or more frames therein. The "program counter" indicates which part of an instance is currently being executed. The "frame" is a stack area allocated to one call for a method, and is composed of: an "operand stack" in which an argument of the call is stored; and a "local variable stack (local variable in the figure)" used by the called method. Since a frame is put up on the Java™ stacks 56a, 56b, ..., and 56n each time a call is made, a frame is added to a Java stack also when a method calls itself recursively.

Thus concludes the description of the Java™ Virtual Machine.

<Application Manager 37>

The application manager 37 is system software operating in the work memory of the Java™ Virtual Machine 36, and performs signaling, when Title-to-Title branching takes place, by using AMTs corresponding to the previous and current Titles. The signaling is control in which the operation of an application is ended when the application is written in the AMT of the previous Title but not written in the AMT of the current Title while the operation of an application is started when the application is not written in the AMT of the previous Title but written in the AMT of the current Title.

Figure 27:
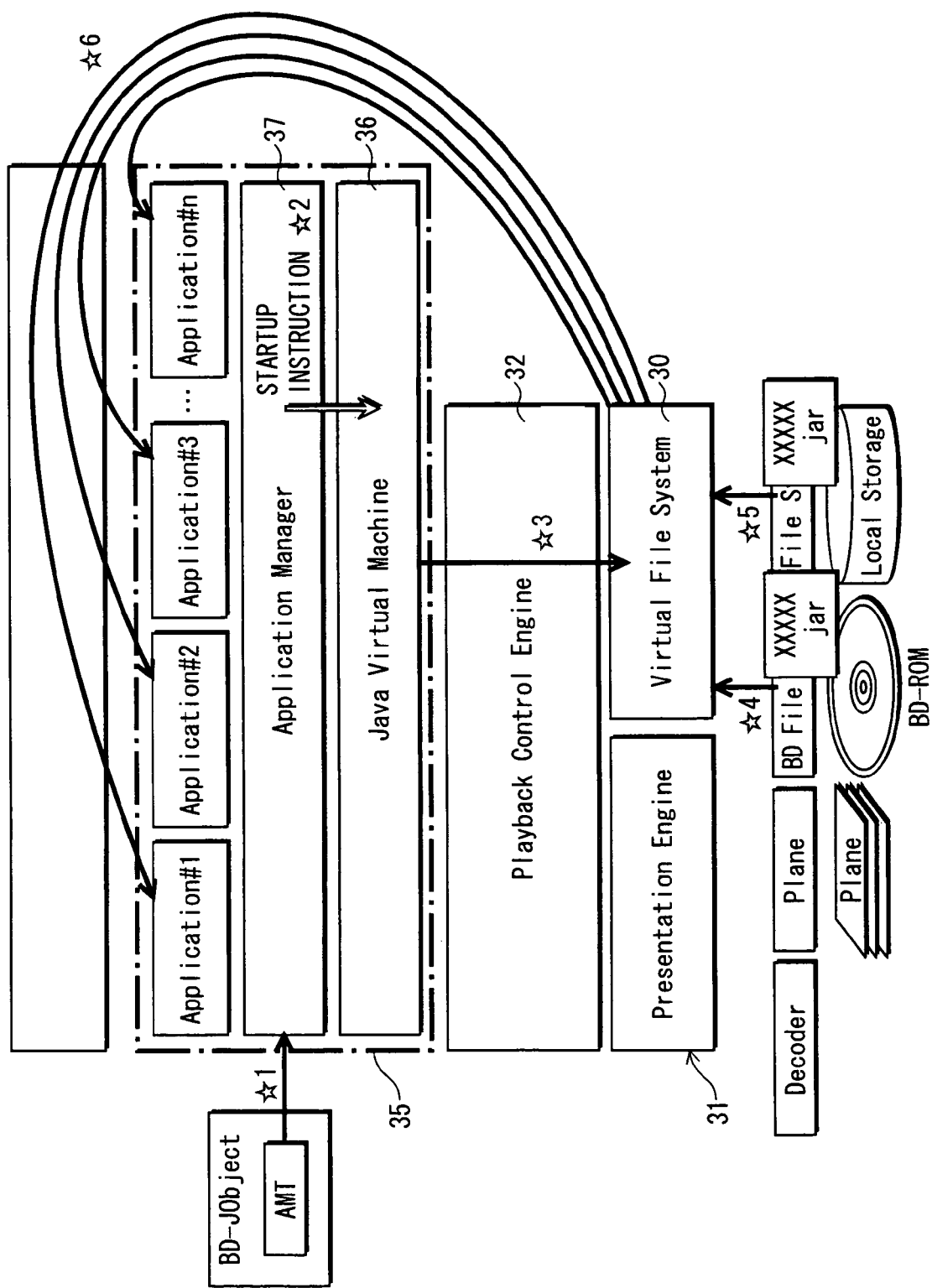
FIG. 27 schematically shows processing of a presentation engine 31, a playback control engine 32 and a module manager 33.

FIG. 27 shows processing of the application manager 37 based on an application management table of a BD-J Object.

FIG. 27 schematically illustrates a series of processing: reference to the application management table (★1) ;an application startup instruction to the Java™ Virtual Machine 36 (★2) ;an instruction of the Java™ Virtual Machine 36 for reading out a Java™ archive file (★3) ;and class loading of class files which define a Java™ application (★4, ★5, ★6). With the startup instruction, the Java™ Virtual Machine 36 reads out an xlet program from the scenario memory 22 to the work memory.

Figure 28:
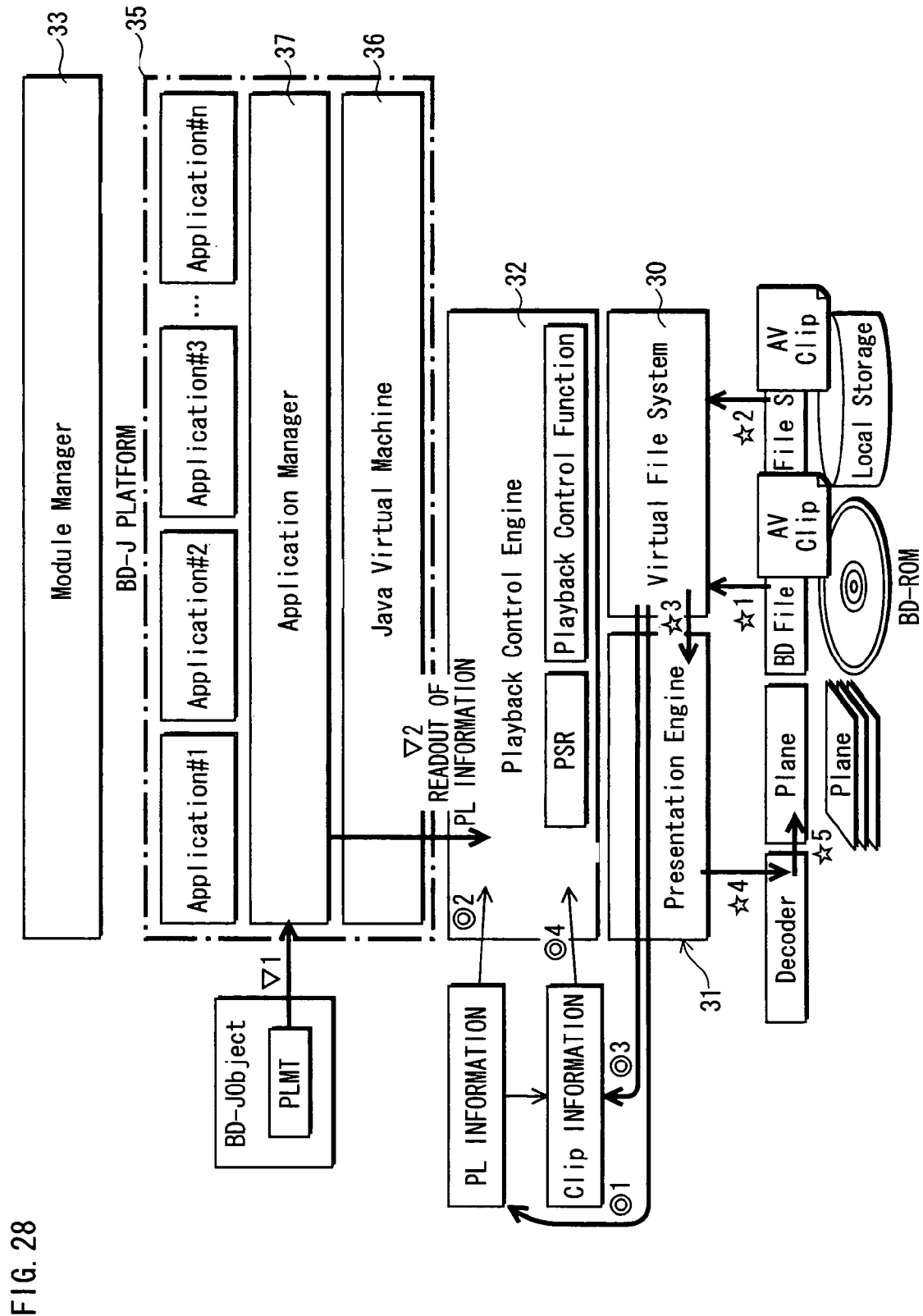
FIG. 28 shows processing of an application manager 37 based on a PLMT of a BD-J Object.

FIG. 28 shows processing of the application manager 37 based on a PLMT of a BD-J. Object. ∇1 represents reference to the PLMT, and ∇2 represents readout of PlayList information to the presentation engine 31.

◎1, 2, 3, and 4 in FIG. 28 schematically show: readout of PlayList information via the Virtual File System 30 (◎1); decoding of PlayItem information made up of the PlayList information (◎2); readout of Clip information via the Virtual File System 30 (◎3); and decoding of the Clip information (◎4). Once the Clip information and PlayList information are decoded after the above processing, the application manager 37 sends TS packets constituting the AVClip to the presentation engine 31 via the Virtual File System 30. The TS packets are sequentially sent to the presentation engine 31 in this way, and the presentation engine 31 then outputs the TS packets to the decoder and causes the plane to display them. ★1,2, 3, and 4 in the figure schematically show: readout of the TS packets constituting the AVClip (★1 and 2); sending out of the TS packets to the presentation engine 31 from the Virtual File System 30 (★3) ;input of the TS packets to the decoder (★4) ;and output of decoding results to various planes from the decoder (★5).

Thus concludes the description of the application manager 37.

<Function Control Unit 38>

The function control unit 38 is a component corresponding to the JSSE optional package of the J2ME PBP 1.0, and imposes restrictions on functions to be provided for an application or removes the restrictions. The JSSE optional package of the J2ME PBP 1.0 is a package necessary for the implementation of the BD-J platform, and the JSSE realizes the Java™ 2 security model. The Java™ 2 security model authenticates a Signed application and grants functions which exceed core functions to the authenticated application. The functions exceeding core functions include the following.

reading and writing from/to the local storage
use of network connection
access to the BD-ROM
selection of another Title on the BD-ROM
control over the implementation of another BD-J platform In order to obtain permission for these functions, the application must use a permission request file. The permission can be thus obtained from the permission request file.

The JSSE includes "Java™ Package for secure connection" which is a package for establishing a secure connection.

Using this package, the BD-J platform is able to make a connection with a server on the Internet. A physical connection may be different for Ethernet™ and for a telephone. Supporting TCP/IP and being able to use the HTTP protocol are the requirements for the connection. The BD-J platform has to be authenticated before the use of the network connection, and an appropriate permission for the network connection must be obtained.

The function control unit 38 is characterized by imposing restrictions on functions that an application can execute or removing the restrictions in accordance with the Java™ 2 security model.

Thus concludes the description of the internal structure of the BD-J platform 35.

<Application Signaling Over Multiple Discs>

The above has described application signaling where playback switches from one Title to another within one BD-ROM. The following describes application signaling in which playback switches from a Title on one BD-ROM to a Title on another BD-ROM.

The case in which playback switches from a Title on one BD-ROM (Disc A) to a Title on another BD-ROM (Disc A+1) is, for example, when a full-length movie or a series of movies are compiled on multiple BD-ROMs of a BD-BOX. This is assuming the case in which, since the content is a full-length movie or a series of movies, it does not fit on one disc. Here, because a single movie is recorded over multiple BD-ROMs as multiple Titles, discs need to be changed. In relation to such disc replacement, signaling must be carried out based on an AMT corresponding to a Title played at the end (LastPlay Title) on the Disc A, and an AMT corresponding to a Title to be played first (FirstPlay Title) on the Disc A+1.

Such signaling controls the start and end of applications when a new disc is loaded, and there are therefore some applications operating before and after disc change. Such an application operating before and after disc change is called a "disc-unboundary application". On the other hand, an application that ends the operation after disc change is called a "disc-boundary application".

It is desirable to define, as a disc-unboundary application, an application which displays a message prompting the user to change a disc when the first part of a movie is finished and performs processing so that playback can be immediately started when a disc including the second part of the movie is inserted.

The following is the reason why signaling is carried out when a new disc is loaded.

It is usually easier for the user to understand if all applications end when a disc is ejected. Playback control on DVD-Videos is defined in this manner. An application that defines such playback control is generally bound to a disc, and the application is preferably finished with the detection of the removal of the disc to which the application is bound when the disc is ejected. However, in a special case where a full-length movie or a series of movies are compiled on multiple BD-ROMs of a BD-BOX, it would be very convenient if an application performs processing to prompt the user to change discs. It is for this reason that a disc-unboundary application is introduced.

FIG. 29 shows operations of a disc-boundary application and a disc-unboundary application. Level 1 shows a series of events including: loading of Disc A; playback of a Title on Disc A; ejection of Disc A; loading of Disc A+1; and playback of a Title on Disc A+1.

Level 2 shows: a period during which LastPlay Title of Disc A is being played; a period during which no disc is loaded; and a period during which FirstPlay Title of Disc A+1 is being played.

Level 3 shows: playback content of LastPlay Title; a message prompting for disc change; and playback content of FirstPlay Title. Levels 4 and 5 show activation periods of the disc-boundary application and disc-unboundary application, respectively. According to Level 4, the disc-boundary application starts the operation during Disc A being loaded. The activation period of the disc-boundary application continues during when Disc A is loaded and no disc is loaded. Once Disc A+1 is loaded and playback of FirstPlay Title starts, signaling is carried out by checking the AMT corresponding to LastPlay Title against the AMT corresponding to FirstPlay Title. With this control, the operation of the disc-boundary application is ended.

According to Level 5 of FIG. 29, on the other hand, the disc-unboundary application starts the operation during when Disc A is loaded. The activation period of the disc-unboundary application continues during when Disc A is loaded and no disc is loaded. Once Disc A+1 is loaded and playback of FirstPlay Title starts, the startup-end control over applications is carried out by checking the AMT corresponding to LastPlay Title against the AMT corresponding to FirstPlay Title. With this control, the operation of the disc-unboundary application is continued.

FIG. 30A shows the AMTs corresponding to LastPlay Title on Disc A and to FirstPlay Title on Disc A+1; FIG. 30B shows signaling when the two AMTs are defined as shown in FIG. 30A.

It can be seen that, in FIG. 30A, the IDs of Applications #1 and #2 are written in the AMT corresponding to LastPlay Title on Disc A and the ID of Application #2 is written in the AMT corresponding to FirstPlay Title on Disc A+1.

Level 1 of FIG. 30B shows a series of events including: loading of Disc A; playback of a Title on Disc A; ejection of Disc A; loading of Disc A+1; and playback of a Title on Disc A+1.

Level 2 shows: a period during which LastPlay Title of Disc A is being played; a period during which no disc is loaded; and a period during which FirstPlay Title of Disc A+1 is being played.

Level 3 shows: playback contents of LastPlay Title; a message prompting for disc change; and playback contents of FirstPlay Title. Levels 4 and 5 show control over Applications #1 and #2, respectively.

As can be seen in Level 4, Application #1 is not written in the AMT of FirstPlay Title on Disc A+1 although written in the AMT of LastPlay Title on Disc A. Therefore, the application manager 37 ends Application #1.

As can be seen in Level 5, Application #2 is written in the AMT of LastPlay Title on Disc A as well as written in the AMT of FirstPlay Title on Disc A+1. Therefore, the application manager 37 does not end Application #2, which is thereby able to continue the operation.

Assume here that a malicious application is recorded on Disc A and the application is started. Although the malicious program is being executed, if Disc A is ejected and Disc A+1 is then loaded, an unexpected situation such as contents of Disc A+1 being copied could occur. In order to prevent the operation of such a malicious program, the application manager 37 instructs the function control unit 38 to change, during the period when no disc is loaded, an application which is continuously operating from a Signed application to an Unsigned application. With the signaling at the time when Disc A+1 is loaded, if the application manager 37 determines that the operation of the application should be continued, then the application manager 37 changes the continuously operating application from an Unsigned application to a Signed application. With the change, even if a malicious program is present on Disc A, the function of the program is restricted, which eliminates the above-mentioned fears of the contents of Disc A+1 being copied.

In addition, in the case when the ID of the application which is currently executed is not registered to the AMT corresponding to FirstPlay Title of Disc A+1, or when an improper disc is mistakenly inserted, the application manager 37 finishes the currently operating application. This mechanism eliminates concerns about a malicious program operating with the disc.

Figure 31:
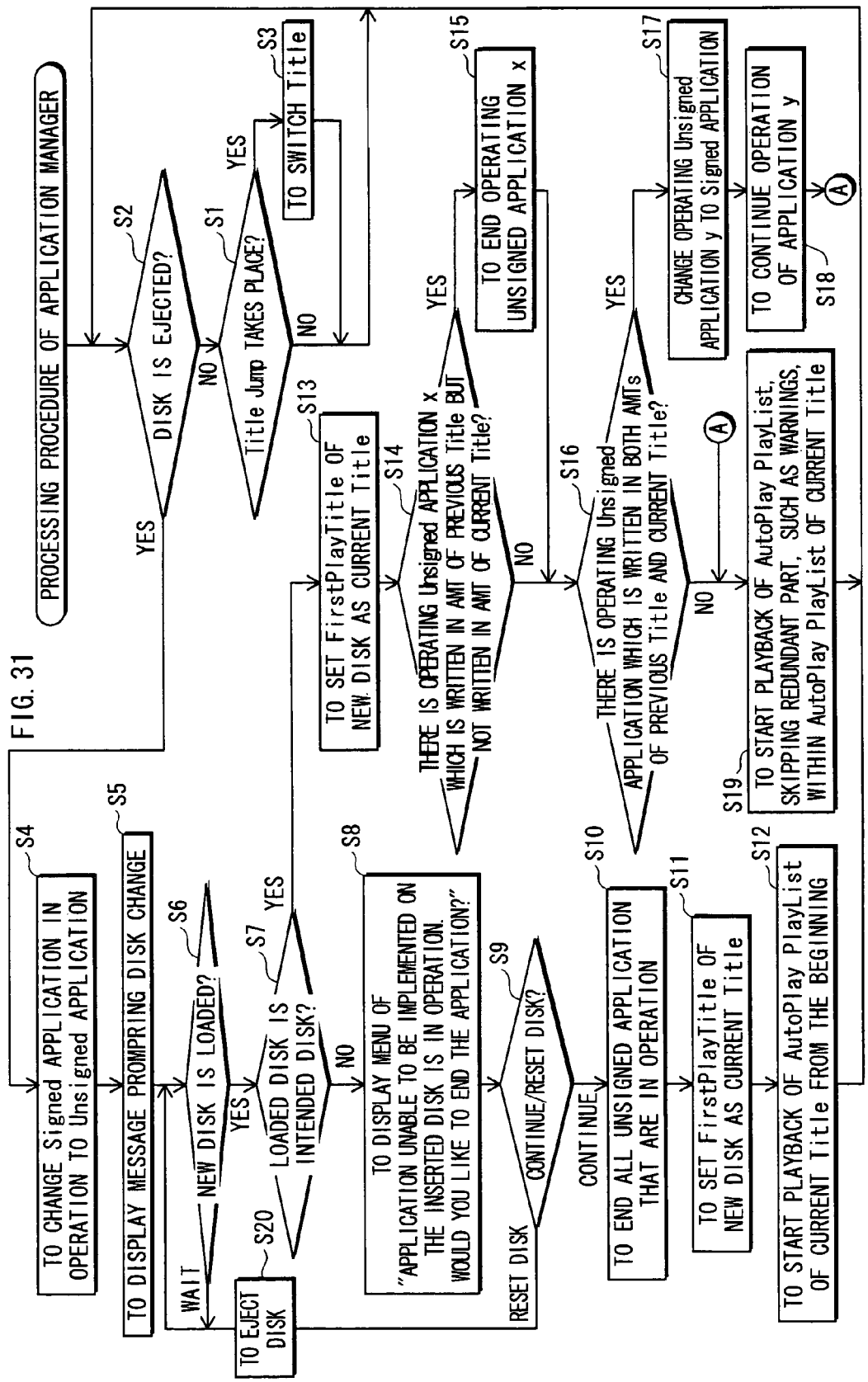
FIG. 31 is a flowchart showing a processing procedure of the application manager.

FIG. 31 is a flowchart showing a processing procedure of the application manager 37.

As can be seen in the flowchart, the loop process of Steps S1 and S2 is first carried out. Step S1 is a judgment of whether a Title jump has taken place. If a Title jump occurs, Title change is made in Step s3.

Step S2 is a judgment of whether the disc is ejected. If the disc is ejected, the application manager 37 instructs the function control unit 38 to change the Signed application in operation to an Unsigned application (Step S4), displays a message prompting for disc change (Step S5), and waits for a new disc to be loaded (Step S6). If a new disc is loaded, the application manager 37 judges whether it is an intended disc (Step S7). If not, the procedure moves to Step S8.

Here, a judgment of whether an intended disc is loaded is performed in the following procedure. Each BD-ROM of the BD-BOX has an "identifier of a disc to be loaded next" recorded thereon. The application manager 37 reads the "identifier of a disc to be loaded next" recorded on Disc A when Disc A is loaded. Then if a new BD-ROM is loaded after ejection of Disc A, the application manager 37 reads the disc's identifier, and judges whether the identifier read from the new BD-ROM matches the Disc A's "identifier of a disc to be loaded next". If they match, the newly loaded BD-ROM is1 among multiple BD-ROMs of the BD-BOX, one including the sequel of Disc A's contents. In this case, the application manager 37 determines that "the intended disc has been loaded".

If the identifiers do not match, the newly loaded BD-ROM is not the one in the BD-BOX, including the sequel, and the application manager 37 determines that "an unintended disc has been loaded". This judging procedure allows for determining whether Disc A+1 is accordingly loaded or a completely different disc is loaded.

Figure 32B:
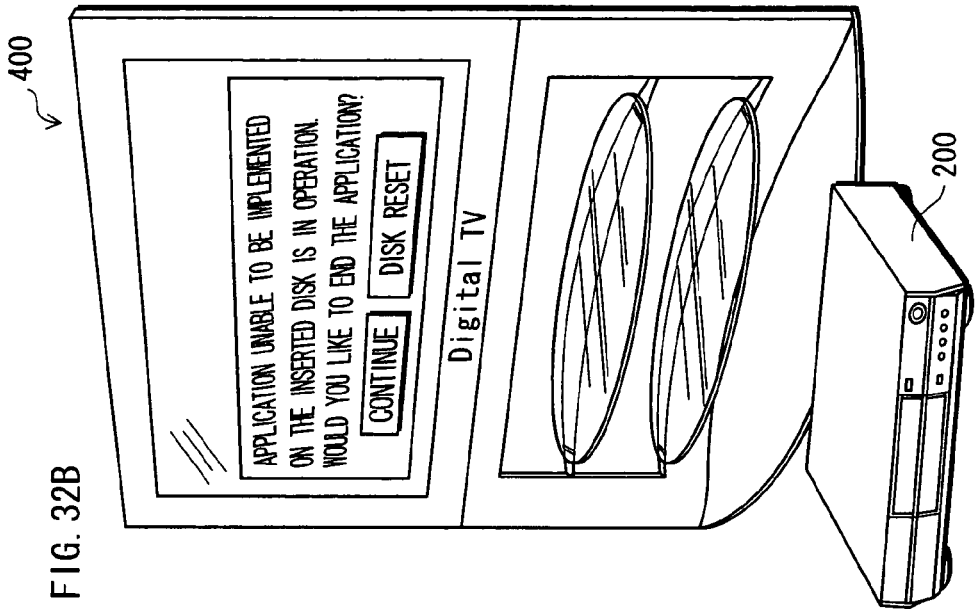
FIG. 32B is an example of a menu displayed in Step S8 of FIG. 31.
Figure 32A:
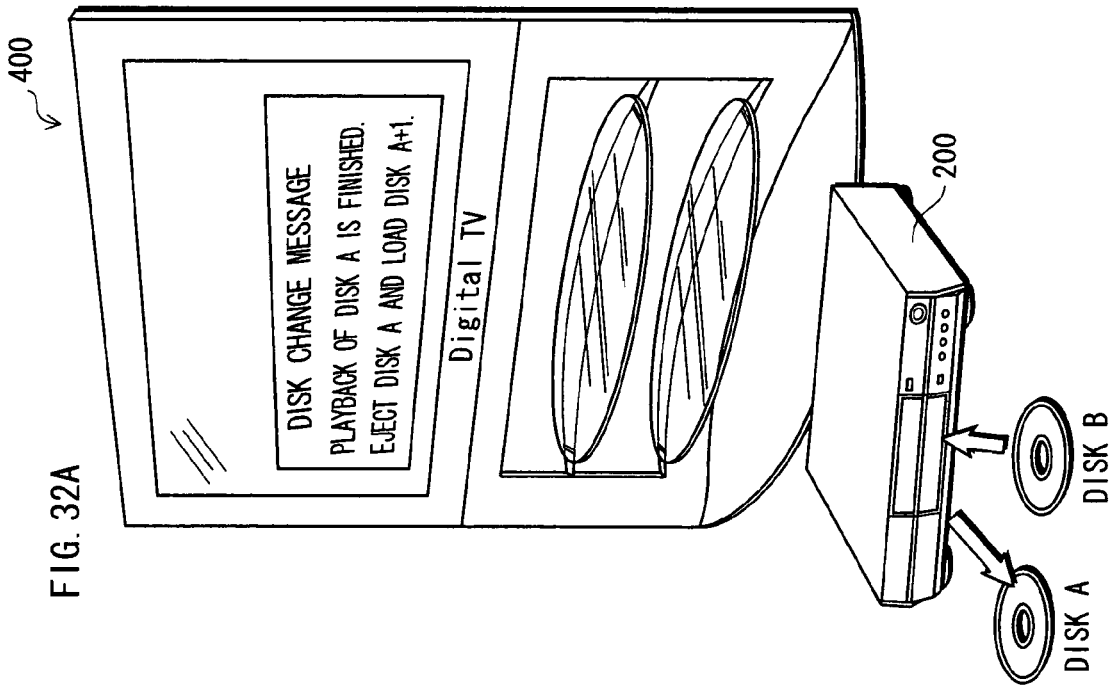
FIG. 32A is a display example of a message prompting for disc change.

In Step S8, the application manager 37 checks with the user, by displaying a predetermined menu, whether to end the application operating over the discs. FIG. 32A is a display example of a message prompting for disc change, and FIG. 32B is an example of a menu displayed in Step S8. The message of FIG. 32A indicates that playback of Disc A is finished and prompts the user to eject Disc A and load Disc A+1. The menu of FIG. 32B includes a message of "application unable to be executed on the loaded disc is in operation. Would you like to end the application?", a "CONTINUE button", and a "DISC RESET button".

The reason to display this menu is as follows.

In the case when the user mistakenly inserts a different disc other than Disc A+1, an application currently in operation would be ended when playback of the disc starts since the ID of the currently operating application is not written in the AMT of FirstPlay Title on the disc.

A disc-unboundary application is basically expected to stay in operation even if the disc is changed. It would be inconvenient if the application actually desired to be continued is ended due to insertion of a different disc by mistake by the user. Therefore, when a disc-unboundary application is not shown in the AMT of FirstPlay Title on a newly inserted disc although the disc-unboundary application is in operation, the application manager 37 displays the above-mentioned menu and checks with the user whether to end the currently executed disc-unboundary application, assuming it is highly likely that the user has inserted a different disc by mistake.

Step S9 is a judgment for determining which one of the CONTINUE button and DISC RESET button has been pressed. When the user presses the CONTINUE button for confirmation, desiring playback of another disc unrelated to Disc A, the application manager 37 ends the Unsigned application in operation (Step S10), sets FirstPlay Title of the new disc as the current Title (Step S11), and starts playback of the AutoPlay PlayList of the current Title from the beginning (Step S12).

When the user presses the "RESET DISC" button on the menu because he/she mistakenly inserted a different disc, the application manager 37 ejects the disc (Step S20) and moves to Step S6. In this case, the application is not ended and stays in operation.

Thus, when a disc other than an intended disc is loaded, the application manager 37 prevents a Title-unboundary application from being executed together with an unrelated disc, and leaves a choice of whether to change and reset a disc or to make the application stay in operation, which accordingly avoids confusion of the user.

FIG. 33 is a timing chart schematically showing a process performed by the application manager 37 when an unintended disc is loaded.

Level 1 in the figure shows a series of flow including ejection of Disc A, the period during which no disc is loaded, and loading of an unintended disc (Disc B).

Level 2 shows a message and a menu displayed along the flow of Level 1. The "message prompting for disc change" is displayed during the period when no disc is loaded, and the menu is displayed when an unintended disc is loaded. This menu is the one shown in FIG. 32B.

Level 3 illustrates a process performed when the CONTINUE button is pressed on the menu shown in Level 2. In this case, the application manager 37 ends the operation of the disc-unboundary application and starts playback of FirstPlay Title of a newly loaded disc.

Level 4 illustrates a process performed when the DISC RESET button is pressed on the menu shown in Level 2. In this case, the application manager 37 does not end the operation of the disc-unboundary application and waits for another disc to be loaded. FIG. 34 shows processes of the application manager 37 shown in FIG. 33 with respect to each case.

Figure 34A:
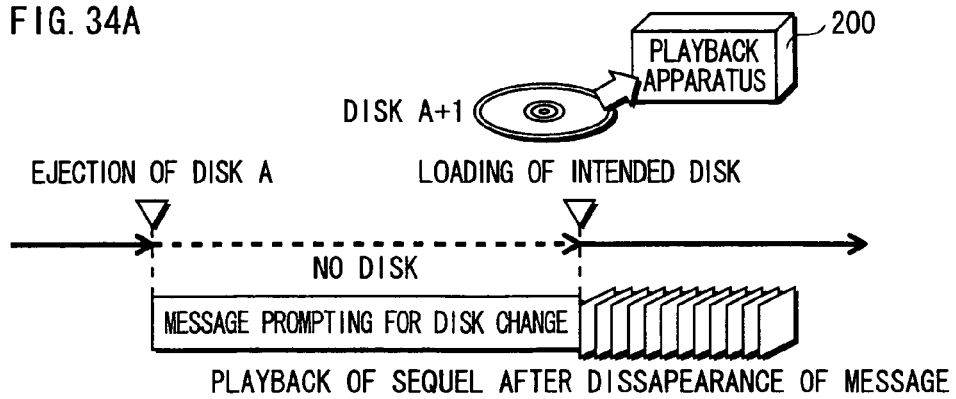
FIG. 34A shows a process performed when an intended disc is loaded.
Figure 34B:
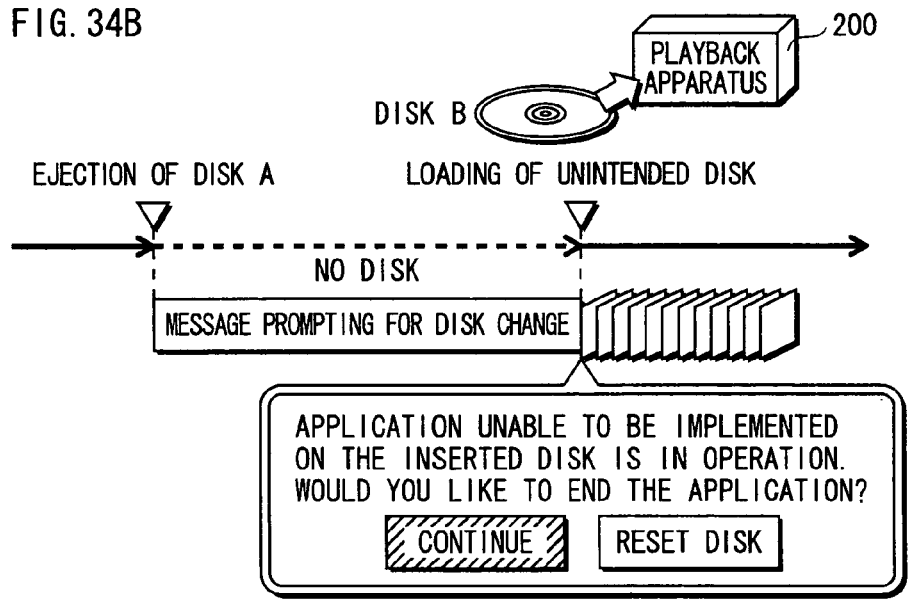
FIG. 34B shows a process performed by the application manager 37 when a disc different from the intended disc is loaded and the user desires playback of the disc.

FIG. 34A shows a process performed when an intended disc is loaded, and FIG. 34B shows a process performed by the application manager 37 when a disc different from the intended disc is loaded and the user desires playback of the disc. As shown in FIG. 34B, when a disc different from the intended disc is loaded, the menu shown in FIG. 32B is displayed. By pressing the CONTINUE button on the menu, playback of FirstPlay Title recorded on the disc starts.

Figure 34C:
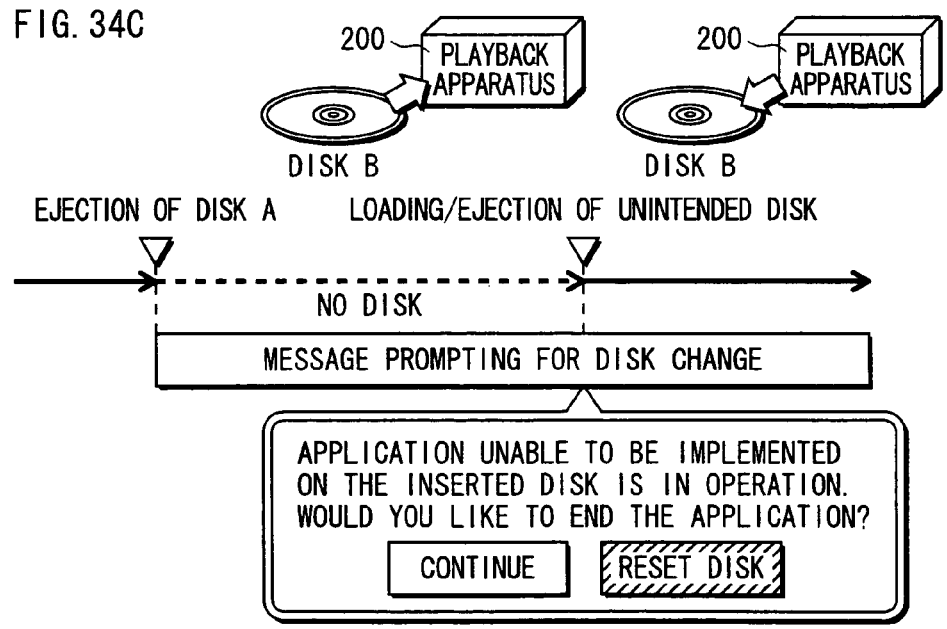
FIG. 34C shows a process performed by the application manager 37 when a disc different from the intended disc is loaded and the user does not desire playback of the disc.

FIG. 34C shows a process performed by the application manager 37 when a disc different from the intended disc is loaded and the user does not desire playback of the disc. As shown in FIG. 34C, when a disc different from the intended disc is loaded, the menu shown in FIG. 32B is displayed. By pressing the DISC RESET button on the menu, the disc is ejected.

Returning to FIG. 31, the explanation of each processing step is resumed.

When a loaded disc is the intended one, Step S7 is Yes, and the process moves to Step S13.

In Step S13, the application manager 37 sets FirstPlay Title of the new disc as the current Title (Step S13), and judges whether there is Unsigned application x in operation which is written in the AMT of the previous Title but not written in the AMT of the current Title (Step S14). If Unsigned application x is present, the application manager 37 ends the operation of Unsigned application x (Step S15).

Step S16 is a judgment of whether there is Unsigned application y in operation, which is written in both AMTs of the previous Title and the current Title. If Unsigned application y is present (Yes in Step S16), the application manager 37 instructs the function control unit 38 to change Unsigned application y to a Signed application (Step S17) and continues the operation of the application (Step S18).

Subsequently, in Step S19, the application manager 37 starts playback of AutoPlay PlayList of the current Title while skipping the beginning part—corresponding to warnings and the like—within the AutoPlay PlayList. The reason is as follows.

It is an established practice of playback of a movie recorded on a DVD-Video or another optical disc that copy inhibit warnings and the like are displayed when the disc is loaded, which is followed by previews of other discs, and a menu is then brought up. Playback of the movie starts only after playback of the movie is selected on the menu. In the case where the contents are stored over multiple discs, however, a sense of continuation will be lost if these warnings and menu are displayed each time a disc is changed. Nevertheless, such warnings and menu are usually inserted for each disc so as to be always played when playback is started with any disc of a BD-BOX.

Given this factor, the present embodiment performs "playback control unique to the time when Disc A is exchanged for Disc A+1" and skips the beginning part corresponding to warnings and the like when Disc A+1, which is the intended disc, is loaded while a disc-unboundary application stays in operation.

Figure 35:
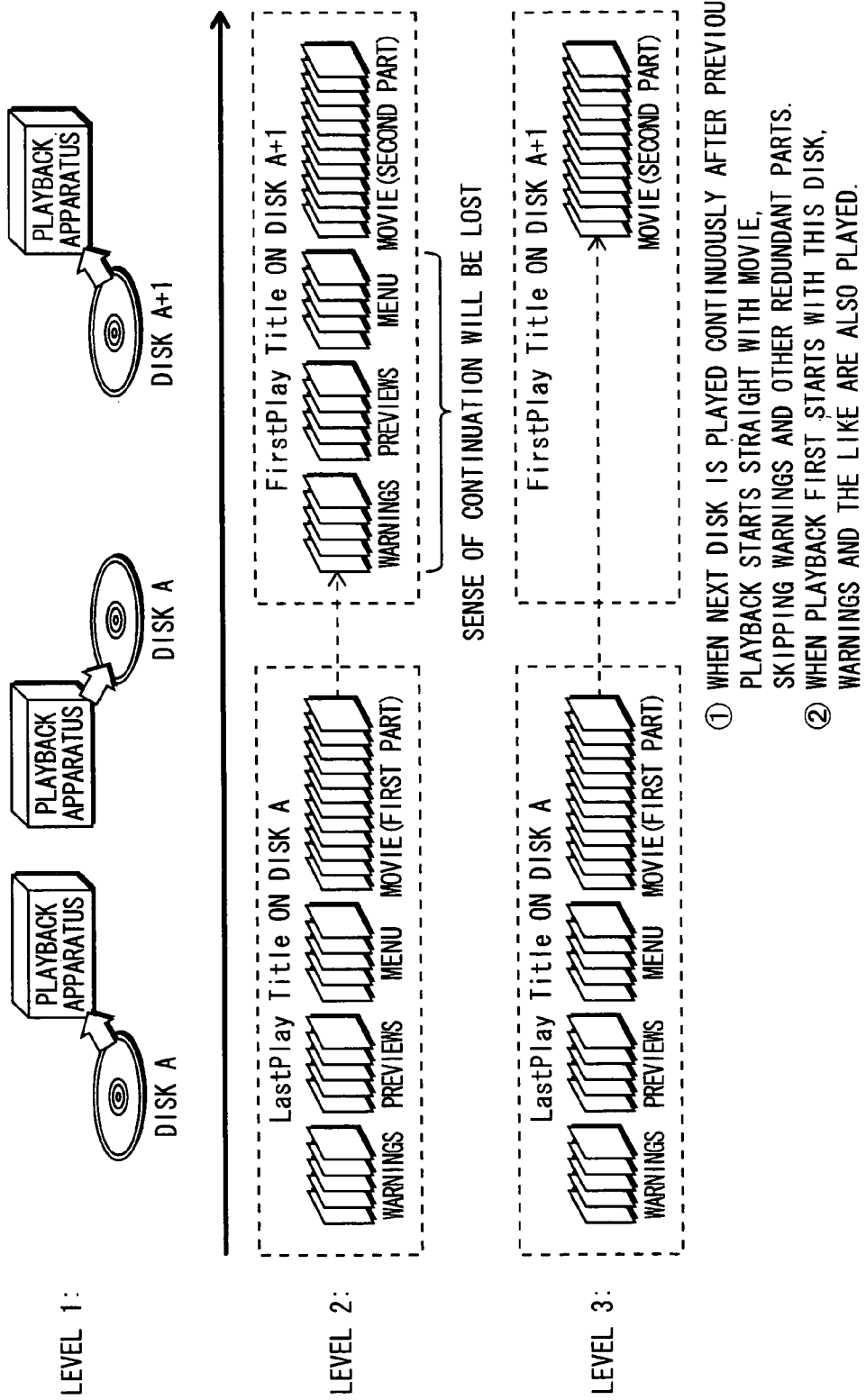
FIG. 35 comparatively shows the cases of normal playback and skip playback of FirstPlay Title of Disc A+1.

FIG. 35 comparatively shows the cases of normal playback and skip playback of FirstPlay. Title of Disc A+1. Level 1 of the figure illustrates a series of flow including: loading of Disc A; playback of Title on Disc A; ejection of Disc A; loading of Disc A+1; and playback of Title on Disc A+1. Level 2 shows the case where normal playback of FirstPlay Title on Disc A+1 is performed while Level 3 shows the case where the beginning part of FirstPlay Title on Disc A+1 is skipped. When Levels 2 and 3 are compared, it can be seen that, in Level 2, a movie is displayed after display of warnings and previews of other discs, and in Level 3, playback starts straight with the movie without displaying the warnings and previews. Thus, in the case where Disc A+1 is watched continuously after viewing of Disc A, the warnings and the like on FirstPlay Title of Disc A+1 are not played, which results in continuous playback without interruption. It is needless to say that, when playback starts with Disc A+1 without playback of Disc A, the above-mentioned warnings are played, and therefore the practice of movie playback can be maintained.

Thus concludes the description of the application manager 37.

Figure 36:
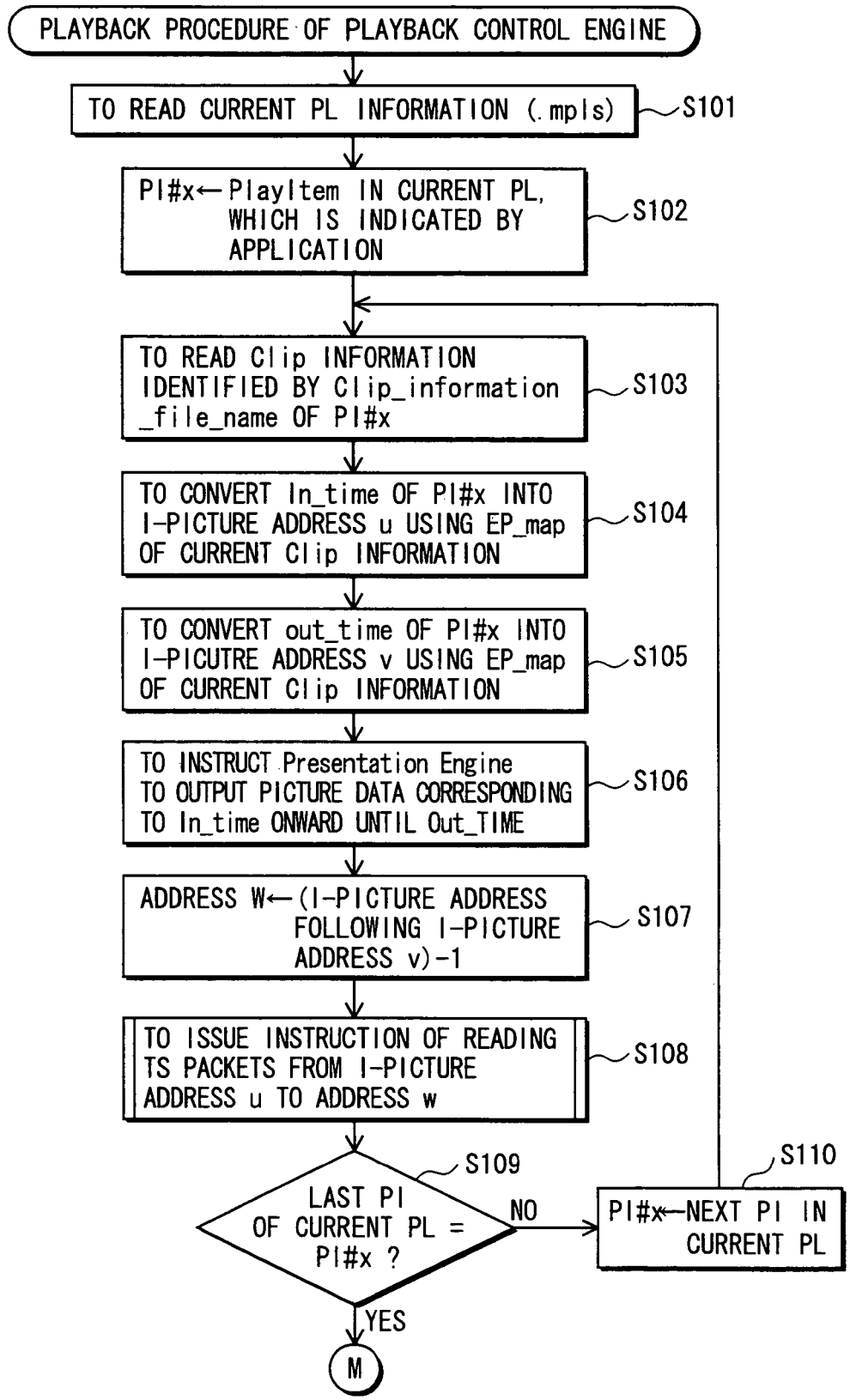
FIG. 36 is a flowchart showing a PlayList playback performed by the playback control engine 32.

The following explains a specific control procedure performed by the playback control engine 32 with reference to a flowchart shown in FIG. 36.

FIG. 36 is a flowchart showing PlayList playback procedure performed by the playback control engine 32. This playback procedure includes control over the presentation engine 31 (Step S106) and control over the BD-ROM drive 1 or the local storage 20 (Step S108). In the flowchart, a PlayItem being a process target is PlayItem#x. The flowchart shows the procedure in which the current PL information (.mpls) is read (Step S101) and subsequently Steps S102 to S110 are carried out. Here, Steps S102 to S110 make up a loop process where processing of Step S103 to S110 is repeated for each piece of the PI information included in the current PL information until Yes is obtained in Step S109. A PlayItem to be a process target in the loop processing is called PlayItem#x (PI#x). PlayItem#x is initialized in Step S102. The requirement for ending the loop process is that the last PlayItem of the current PlayList becomes PlayItem#x (Step S109). If PlayItem#x is not the last PlayItem, the next PlayItem in the current PlayList is set as PlayItem#x (Step S110).

Steps S103 to S110 are repeatedly carried out in the loop process: the playback control engine 32 reads Clip information identified by Clip_information_file_name of PlayItem#x into the scenario memory 22 (Step S103), converts In_time of PlayItem#x into I-picture address u using EP_map of the current Clip information (Step S104), and converts Out_time of PlayItem#x into I-picture address v using EP_map of the current Clip information (Step S105). In order to decode picture data corresponding to Out_time of PlayItem#x, picture data following after Out_time of PlayItem#x is necessary in addition to an I-picture located at I-picture address v. This is because picture data corresponding to Out_time of PlayItem#x may possibly refer to picture data in the future direction.

In an EP_map, an Access Unit, i.e. an address of an I-picture located at the beginning of the GOP, is shown in association with the playback time of the I-picture, as described above. Therefore, the end address of the GOP to which picture data corresponding to Out_time of PlayItem#x belongs can be determined by identifying, from among I-picture addresses shown in the EP_map, an I-picture address following I-picture address v and obtaining the address (I-picture address w) of an I-picture immediately before the identified I-picture address (Step S107). The playback control engine 32 instructs the BD-ROM drive 1 or local storage 20 to read TS packets from I-picture address u to the calculated I-picture address w (Step S108), and whereby picture data to which the picture data corresponding to Out_time of PlayItem#x refers is all read into the decoder.

Subsequently, the playback control engine 32 judges whether PlayItem#x is the last PI of the current PlayList (Step S109).

If PlayItem#x is not the last PI of the current PlayList, the playback control engine 32 sets the next PlayItem in the current PlayList as PlayItem#x (Step S110), and the process returns to Step S103. By repeating Steps S103 to S110 above, PIs constituting the PlayList is sequentially played.

In Step S102 of the flowchart, a PlayItem, within the current PlayList information, specified by the application manager 37 is set to PlayItem#x. Here, if the application manager 37 specifies not a PlayItem for the warnings and the like but a PlayItem for the beginning of the movie, PlayList playback starts while skipping display of the warnings and the like.

As has been described above, according to the present embodiment, it is possible to get an application to operate continuously over multiple discs. As a result, in the case where an application holds audio and subtitle language attributes selected by the user, the need to set these attributes once again is eliminated even if discs are changed. Since a newly loaded disc after disc change can be played without resetting of these attributes, the present embodiment achieves an advantageous effect that a series of movies and full-length movies can preferably be played.

Embodiment 2

The present embodiment is details about the Java™ application described in Embodiment 1. Specifically speaking, the Java™ application uses, as the activation periods, FirstPlay Titles of the second and follow-on BD-ROMs (Disc A+1 in Embodiment 1) of multiple BD-ROMs constituting the BD-BOX. When a FirstPlay Title is played and started, this Java™ application inquiries the application manager 37 about which one of the cases has taken place: "Disc A+1 is loaded after replacing Disc A" or "Disc A+1 is directly loaded without Disc A having been loaded". Subsequently, the Java™ application changes the playback control depending on the inquiry result.

The playback control carried out when "Disc A+1 is directly loaded" is that playback is performed in the order starting with the first piece of multiple pieces of PlayItem information constituting PlayList information written in a PlayList record table of a BD-J Object.

The playback control unique to the case where "Disc A is loaded after replacing Disc A" is that playback is started with a middle piece among multiple pieces of PlayItem information constituting PlayList information written in a PlayList record table of a BD-J Object (i.e. skip playback described in Embodiment 1).

In addition, when Disc A+1 is loaded after replacing Disc A, the Java™ application whose activation period is the FirstPlay Title may play different PlayList information from PlayList information having the AutoPlay attribute. Assume that the different PlayList information defines a playback path not including playback of warnings. This provides the user with comfortable continuous playback of multiple discs without warnings, as described in Embodiment 1.

As has been described above, according to the present embodiment, continuous playback over multiple BD-ROMs of a BD-BOX can be carried out without interruption by recording a Java™ application, which performs different processing depending on whether "Disc A+1 is loaded after replacing Disc A" or "Disc A+1 is directly loaded without Disc A being loaded", on one of multiple BD-ROMs in the BD-BOX as a Java™ application using FirstPlay Titles as its activation periods.

<Supplementary Notes>

The best modes for carrying out the invention, as far as known to the applicant at the time of filing the present application, have been described. However, further improvements or modifications can be made on the present invention in terms of the following technical topics. It should be noted here that whether or not to make such improvements or modifications is optional, and depends on the implementer of the invention.

<Management of Application ID>

In the case where the application manager 37 performs the above-mentioned signaling over discs, it is necessary that the application ID of Disc A+1 and that of a malicious program do not become the same by accident, for example, by managing application IDs with respect to each authoring site.

<Supplementary Process for Continuous Playback>

In order to perform continuous playback of two discs, it is desirable that, other than an application itself being started, attributes be stored and the stored attributes be referred from an application which starts when Disc A+1 is inserted.

<Method of Checking Whether to End Application>

When an unintended optical disc is loaded, the application manager 37 checks with the user, using the menu, whether to end an application. Instead, the continuation/end of the application operation can be determined by different methods—for example, asking whether playback of a loaded disc can be started.

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

Production of Program of Present Invention

The program of the present invention is an object program that can execute on a computer. The object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

The program of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

Use of Program of Present Invention

The program of the present invention can be used as follows.

(i) Used as Embedded Program

When the program of the present invention is used as an embedded program, the load module as the program is written into an instruction ROM, together with the Basic Input/Output System (BIOS) program and various pieces of middleware (operation systems). The program of the present invention is used as the control program of the read out apparatus 200 as the instruction ROM is embedded in the control unit and is executed by the CPU.

(ii) Used as Application

When the read out apparatus 200 is a hard-disc-embedded model, the Basic Input/Output System (BIOS) program is embedded in an instruction ROM, and various pieces of middleware (operation systems) are preinstalled in the hard disc. Also, a boot ROM for activating the system from the hard disc is provided in the read out apparatus 200.

In this case, only the load module is supplied to the read out apparatus 200 via a transportable recording medium and/or a network, and is installed in the hard disc as one application. This enables the read out apparatus 200 to perform the bootstrapping by the boot ROM to activate an operation system, and then causes the CPU to execute the installed load module as one application so that the program of the present application can be used.

When the read out apparatus 200 is a hard-disc-embedded model, the program of the present invention can be used as one application. Accordingly, it is possible to transfer, lend, or supply, via a network, the program of the present invention separately.

<Instruction ROM 21 and CPU 24>

Components such as the instruction ROM 21 and CPU 24 can be realized as one system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the read out apparatus 200.

The bear chip packaged in the system LSI includes a front-end unit, a back-end unit, and a digital processing unit. The front-end unit digitizes analog signals. The back-end unit converts digital data obtained through digital processes into the analog format and outputs the analog data.

The internal-structure components shown in the above-described embodiments are implemented in the digital processing unit.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

In regards with a specific implementation method, it is preferable to use the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the read out apparatus 200 described in each embodiment above.

It should be noted here that although the term LSI is used here, it may be called IC, LSI, super LSI, ultra LSI or the like, depending on the level of integration.

Further, part or all of the components of each reproduction apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

INDUSTRIAL APPLICABILITY

The readout apparatus of the present invention can be mass-produced based on the internal structures of them shown in the embodiments above. As such, the readout apparatus of the present invention has the industrial applicability.

The invention claimed is:

1. A readout apparatus comprising:
a selection unit operable to select one title from among a plurality of titles recorded on a 1st disc; and
an application management unit operable to execute one or more applications stored on the 1st disc based on a management table corresponding to the selected title, the management table being stored on the 1st disc the management table including one or more application identification references corresponding to each of the one or more applications, wherein
when the 1st disc is exchanged for a 2nd disc, the application management unit
(i) maintains execution of an application shown in a management table corresponding to a title selected last on the 1st disc if the application is shown in a management table corresponding to a title to be selected first on the 2nd disc, and
(ii) terminates execution of an application shown in the management table corresponding to the title selected last on the 1st disc if the application is not shown in the management table corresponding to the title to be selected first on the 2nd disc.

2. The readout apparatus of claim 1, wherein
the termination by the application management unit is carried out provided that, after the application management unit displays (i) a message informing that the application is still in operation after the 1st disc has been ejected and (ii) a menu questioning a user whether the application should be terminated, the user performs, on the menu, an operation indicating an affirmative answer to the question.

3. The readout apparatus of claim 2, wherein
the application management unit displays the menu after the 2nd disc is loaded.

4. The readout apparatus of claim 1, further comprising:
a function control unit operable to impose a restriction on a function of an application in operation when the 1st disc is ejected, wherein
the function control unit withdraws the restriction in a case where the application is shown both in the management table corresponding to the title selected last on the 1st disc and in the management table corresponding to the title to be selected first on the 2nd disc.

5. The readout apparatus of claim 1, wherein
the discs include a digital stream played back in correspondence with the selected title, and
an application shown in the management table corresponding to the title to be selected first on the 2nd disc has different playback controls on the digital stream according to whether the 2nd disc is loaded (i) without the 1st disc having been loaded or (ii) after replacing the 1st disc.

6. The readout apparatus of claim 5, wherein
the different playback controls include
(i) to play the digital stream in correspondence with the selected title from beginning thereof in a case where the 2nd disc is loaded without the 1st disc having been loaded, and
(ii) to play the digital stream in correspondence with the selected title while skipping the beginning in a case where the 2nd disc is loaded after replacing the 1st disc.

7. The readout apparatus of claim 5, wherein
the different playback controls include
(i) to play the digital stream using 1st playback path information in a case where the 2nd disc is loaded without the 1st disc having been loaded, and
(ii) to play the digital stream using 2nd playback path information in a case where the 2nd disc is loaded after replacing the 1st disc.

8. A non-transitory computer readable medium including a program stored thereon, the program causing a computer to execute the steps of:
(a) selecting one title from among a plurality of titles recorded on a 1st disc; and
(b) executing one or more applications stored on the 1st disc based on a management table corresponding to the selected title, the management table being stored on the 1st disc, the management table including one or more application identification references corresponding to each of the one or more applications, wherein
when the 1st disc is exchanged for a 2nd disc, the step (b)
(i) maintains execution of an application shown both in a management table corresponding to a title selected last on the 1st disc if the application is shown in a management table corresponding to a title to be selected first on the 2nd disc, and (ii) terminates execution of an application shown in the management table corresponding to the title selected last on the 1st disc if the application is not shown in the management table corresponding to the title to be selected first on the 2nd disc.

9. A readout method comprising the steps of:

(a) selecting one title from among a plurality of titles recorded on a 1st disc; and (b) executing one or more applications stored on the 1st disc based on a management table corresponding to the selected title, the management table being stored on the 1st disc, the management table including one or more application identification references corresponding to each of the one or more applications, wherein when the 1st disc is exchanged for a 2nd disc, the step (b)

(i) maintains execution of an application shown both in a management table, corresponding to a title selected last on the 1st disc if the application is shown in a management table corresponding to a title to be selected first on the 2nd disc, and (ii) terminates execution of an application shown in the management table corresponding to the title selected last on the 1st disc if the application is not shown in the management table corresponding to the title to be selected first on the 2nd disc.

10. A recording method comprising the steps of:

recording titles and a management table corresponding to each of the titles on a 1st disc; and recording titles and a management table corresponding to each of the titles on a 2nd disc; and wherein when the 1st disc is exchanged for the 2nd disc, a playback apparatus (i) maintains execution of an application shown both in a management table corresponding to a title selected last on the 1st disc if the application is in a management table corresponding to a title to be selected first on the 2nd disc, and (ii) terminates execution of an application shown in the management table corresponding to the title selected last on the 1st disc if the application is not shown in the management table corresponding to the title to be selected first on the 2nd disc.

* * * * *